United States Patent
Sato et al.

(10) Patent No.: US 6,229,102 B1
(45) Date of Patent: May 8, 2001

(54) PEN-SHAPED HANDWRITING INPUT APPARATUS USING ACCELEROMETERS AND GYROSCOPES AND AN ASSOCIATED OPERATIONAL DEVICE FOR DETERMINING PEN MOVEMENT

(75) Inventors: Yasuhiro Sato; Takao Inoue; Etsuko Fujisawa; Takashi Kitaguchi; Toshiyuki Furuta; Norihiko Murata; Mitsuru Shingyouchi, all of Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/141,903

(22) Filed: Aug. 28, 1998

Related U.S. Application Data

(62) Division of application No. 08/803,395, filed on Feb. 20, 1997, now Pat. No. 5,902,968.

(30) Foreign Application Priority Data

| Feb. 20, 1996 | (JP) | 8-055365 |
| Apr. 4, 1996 | (JP) | 8-106481 |
| May 27, 1996 | (JP) | 8-152868 |

(51) Int. Cl.[7] ............... G08C 21/00; G09G 5/00
(52) U.S. Cl. ........... 178/19.01; 178/19.03; 178/19.05; 345/179
(58) Field of Search ............... 345/156, 158, 345/169, 179; 178/19.01, 19.03, 19.04, 19.05; 382/119, 120, 181, 187, 189

(56) References Cited

U.S. PATENT DOCUMENTS

| 5,247,137 | 9/1993 | Epperson | 178/19.01 |
| 5,329,276 | 7/1994 | Hirabayashi | 345/157 |
| 5,440,326 | 8/1995 | Quinn | 345/157 |
| 5,453,758 | 9/1995 | Sato | 345/156 |
| 5,557,076 * | 9/1996 | Wieczorek et al. | 178/19.01 |
| 5,598,187 | 1/1997 | Ide et al. | 345/179 |

FOREIGN PATENT DOCUMENTS

| 6-67799 | 3/1994 | (JP) |
| 6-230886 | 8/1994 | (JP) |
| 7-84716 | 3/1995 | (JP) |
| 7-200127 | 8/1995 | (JP) |
| 7-294240 | 11/1995 | (JP) |
| 8-36462 | 2/1996 | (JP) |
| 8-507886 | 8/1996 | (JP) |
| 8-508354 | 9/1996 | (JP) |

* cited by examiner

*Primary Examiner*—Vijay Shankar
(74) *Attorney, Agent, or Firm*—Dickstein Shapiro Morin & Oshinsky, LLP

(57) ABSTRACT

A small-sized pen-shaped input apparatus precisely detects handwriting input. The apparatus compensates for the effects of the inclination of the pen-shaped input apparatus. An initial inclination angle calculating section calculates the initial value of the inclination angle of a pen shaft in a gravity coordinate system. The inclination angle variation calculating section calculates a variation value of the inclination angle of the pen shaft. A handwriting inclination angle calculating section calculates the inclination angle of the pen shaft when writing. A coordinates conversion calculating section converts the coordinate system of the acceleration from the pen shaft coordinate system to the gravity coordinate system. A movement amount calculating section calculates the movement direction and the movement distance of the pen's tip end. Finally, a handwriting detecting section detects a state of handwriting or non-handwriting.

38 Claims, 28 Drawing Sheets

Fig.16

Lxz=0.032(m)

| $f_{19}(/s^2)$ | | ACCELERATION (m/s²) |
|---|---|---|
| $-2\dot{\phi}\dot{\theta}\sin\phi$ | −6.60 | −0.1940 |
| $2\dot{\phi}\dot{\psi}\cos\phi\cos\theta$ | 11.31 | −0.3621 |
| $-\{(\dot{\psi})^2\cos\phi\sin^2\theta\}/2$ | −1.80 | −0.0576 |
| $\ddot{\theta}\cos\phi$ | 82.27 | 2.6327 |
| $\ddot{\psi}\sin\phi\cos\theta$ | 27.24 | 0.8716 |

Fig.17

Lyz=0.032(m)

| $f_{23}(/s^2)$ | | ACCELERATION (m/s²) |
|---|---|---|
| $-\{\dot{\theta}^2\sin(2\phi)\}/2$ | −3.73 | −0.1195 |
| $2\dot{\phi}\dot{\psi}\cos^2\phi\cos\theta$ | 14.71 | 0.4706 |
| $\{(\dot{\psi})^2\sin(2\phi)\cos^2\theta\}/2$ | 1.37 | 0.0439 |
| $-\ddot{\phi}$ | −56.80 | −1.8208 |
| $\ddot{\psi}\sin\theta$ | 37.58 | 1.2027 |

Lzz=0.151(m)

| $f_{33}(/s^2)$ | | ACCELERATION (m/s²) |
|---|---|---|
| $-(\dot{\theta})^2$ | −7.18 | −1.0845 |
| $-(\dot{\theta})^2\cos^2\phi$ | −12.14 | −1.8326 |
| $2\dot{\phi}\dot{\psi}\sin\theta$ | 5.07 | 0.7853 |
| $-\dot{\theta}\dot{\psi}\sin 2\phi\cos\theta$ | −4.52 | −0.6839 |
| $(\dot{\psi})^2(\cos\phi\cos\theta - 1)$ | −0.08 | −0.0122 |

EULERIAN ANGLES

COORDINATES OF THE PEN SHAFT

PEN-SHAPED HANDWRITING INPUT APPARATUS USING ACCELEROMETERS AND GYROSCOPES AND AN ASSOCIATED OPERATIONAL DEVICE FOR DETERMINING PEN MOVEMENT

This application is a divisional of application Ser. No. 08/803,395 filed Feb. 20, 1997, now U.S. Pat. No. 5,902,968, which is hereby incorporated by reference.

BACKGROUND OF THE INVENTION

1. Field of the Invention

The present invention relates to a pen-shaped input apparatus for inputting figures, symbols, characters and the like into a data processing device, such as a computer.

2. Description of the Related Art

Conventionally, a keyboard, mouse, digitizer, light pen, and tablet, etc. have been used as an input apparatus employed in a computer apparatus or the like. Such computer apparatus needs to be small-sized, and there is a growing need for a portable terminal instrument as the number of users increases year by year. Consequently, a small-size input apparatus is also required.

There is a limitation on making the keyboard small-sized from the viewpoint of the human interface, and a keyboard is not a practical input apparatus for a portable terminal instrument. Furthermore, although the mouse can be made in a small-size and used as a pointing device, it is not suitable for inputting figures and characters, etc. into a data processor.

For this reason, on many occasions, a pen-shaped input apparatus employing a tablet and pen have been adopted as the input apparatus for a portable terminal instrument. However, it is difficult to reduce the size of the tablet.

To overcome the problem of tablet size, tabletless input apparatuses have been developed such as, for instance, a pen-shaped computer input apparatus as disclosed in Japanese Laid-open Patent Publication No. 6-67799/1994, a data input apparatus as disclosed in Japanese Laid-open Patent Publication No. 7-84716/1995, a handwriting input apparatus as disclosed in Japanese Laid-open Patent Publication No. 7-200127/1995, and a pencil-shaped input apparatus as disclosed in Japanese Laid-open Patent Publication No. 6-230886/1994.

The pen-shaped computer input apparatus disclosed in Japanese Laid-open Patent Publication No. 6-67799/1994 senses the movement direction and the movement amount of the input apparatus by use of an acceleration sensor and then compensates for an influence exerted on the movement direction and the movement amount sensed by the acceleration sensor by the action of the pen-shaped computer input apparatus' rotation by use of a piezoelectric vibration gyroscope.

Furthermore, the data input apparatus disclosed in Japanese Laid-open Patent Publication No. 7-84716/1995 senses the movement direction and the movement amount of the apparatus on the basis of signals showing the polarity and the amplitude respectively transmitted from vibration gyroscopes perpendicularly disposed to each other.

Furthermore, the handwriting input apparatus disclosed in Japanese Laid-open Patent Publication No. 7-200127/1995 obtains a movement direction and a movement distance (amount) on the basis of the signals respectively transmitted from two acceleration sensors.

Furthermore, the pencil-shaped input apparatus disclosed in Japanese Laid-open Patent Publication No. 6-230886/1994 disposes a couple of acceleration sensors on different positions of the pen shaft, and obtains a movement direction and a movement distance of the pen's tip end. In this apparatus, the influence due to the mounting position of the acceleration sensors is compensated on the basis of the output from the couple of acceleration sensors.

And further, a position sensor disclosed in the published specification of Japanese Laid-open Patent Publication No. 7-294240/1995, which does not directly relate to the pen-shaped input apparatus is used, for instance, in a game machine for sensing the moving speed, position and attitude of the head portion of human body, and the position sensor comprises acceleration sensors for respectively sensing the accelerations in the X-axis direction, the Y-axis direction, and the Z-axis direction and gyroscopes for respectively sensing the angular velocities around the X axis, the Y axis, and the Z axis. This apparatus performs a strap-down type operational calculation on the basis of the accelerations and the angular velocities detected by those sensors and detects the moving speed, position, attitude, and direction of the head portion of the human body.

SUMMARY OF THE INVENTION

Since the pen-shaped computer input apparatus disclosed in Japanese Laid-open Patent Publication No. 6-67799/1994 compensates only for effects due to the rotation of the apparatus, it can not compensate for effects caused by dynamic inclination. At the time of performing an ordinary handwriting operation, the apparatus may be accompanied with a dynamic inclination and therefore the result of detection is not precise on some occasions.

Furthermore, since the data input apparatus disclosed in Japanese Laid-open Patent Publication No. 7-84716/1995 detects the rotational movement of the wrist and inputs the movement direction and the movement distance in accordance with the detected result, the data input apparatus is not suitable for inputting figures, and the like.

Furthermore, the handwriting input apparatus disclosed in Japanese Laid-open Patent Publication No. 7-200127/1995 does not comprise any compensation medium for compensating for the inclination and the rotation of the apparatus, and therefore the detection result is not precise on some occasions.

Furthermore, since the pencil-shaped input apparatus disclosed in Japanese Laid-open Patent Publication No. 6-230886/1994 does not take into consideration the fact that the component for the rotational angle of the apparatus is contained in the acceleration detected by the acceleration sensor, the detection error of the movement distance becomes large on some occasions.

Moreover, since the position sensor disclosed in Japanese Laid-open Patent Publication No. 7-294240/1995 specially detects the moving velocity, position, attitude, and direction of the head portion, although the sensor performs a complicated operational calculation, the movement direction and the movement distance on the handwriting surface has to be detected precisely using a simple operational calculating process because of the requirement of making the apparatus small-sized.

Furthermore, in the case of employing the position sensor as disclosed in Japanese Laid-open Patent Publication No. 7-294240/1995 the three acceleration sensors cannot be arranged at the pen's tip end, and therefore an error occurs due to the difference between the mounting positions of the pen's tip end and the acceleration sensor. Therefore, the handwriting input cannot be detected precisely on some occasions.

The present invention has been made in consideration of the foregoing problems.

Thus, one object of the present invention to overcome the problems mentioned above.

Another object of the present invention to eliminate the defects in the existing devices mentioned above.

Still another object of the present invention is to provide a small-sized pen-shaped input apparatus.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 15 is perspective view of a handwriting surface, wherein

FIG. 16 is an explanatory diagram for explaining an $f_{13}$-component;

FIG. 17 is an explanatory diagram for explaining an $f_{23}$-component;

FIG. 33 is graph showing the variation of the acceleration, wherein

FIG. 33b is another graph showing the variation thereof partly enlarged in the area encircled by the dotted line in FIG. 33a;

DETAILED DESCRIPTION OF THE INVENTION

A. Explanation of Coordinate Systems

Figure 34:
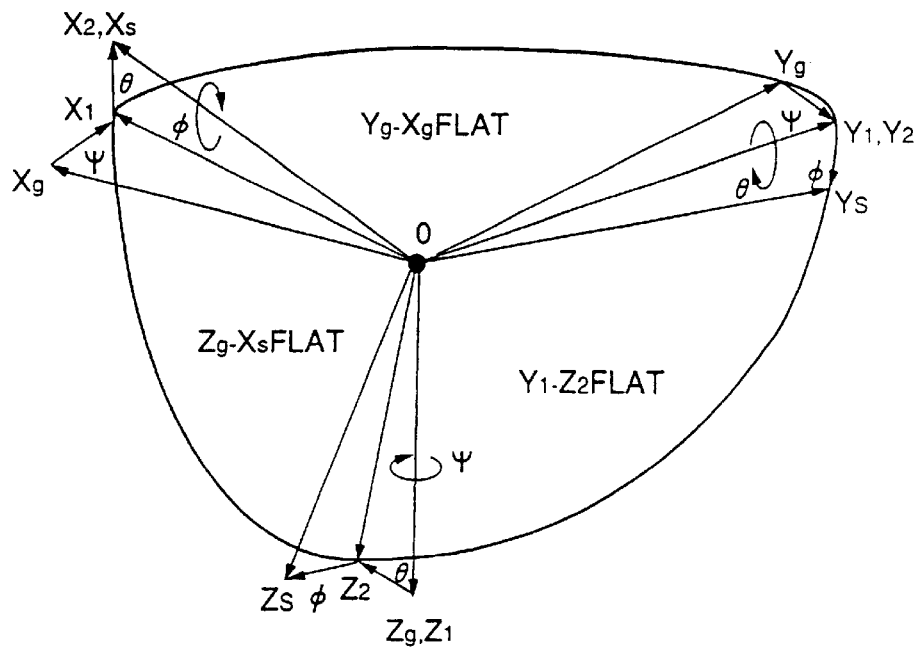
FIG. 34 is a diagram generally illustrating the Eulerian angles.

Prior to the explanation of the first through third embodiments, the concept of the gravity coordinate system and the pen shaft coordinate system is described here, particularly with respect to the frame of reference transformation, and the definition of "Eulerian" angles as to the pen motion, shown in FIG. 34.

The definition of two frames of reference are a laboratory frame (Xg, Yg, Zg) and a pen frame (Xs, Ys, Zs). The former relates to the gravity coordinate system while the latter relates to the pen shaft coordinate system. FIG. 34 shows the steps of converting the gravity coordinate system for the pen-shaped inputting system to the pen shaft coordinate system.

The definition of the Eulerian angles ($\psi,\theta,\phi$) can be respectively expressed by the following three matrix equations (1), (2), and (3):

$\psi$: rotating (Xg, Yg, Zg) around Zg, define the angle until Xg axis goes across the Zg-Xs flat. Then ($X_1$, $Y_1$, $Z_1$) is formed.

$$\begin{bmatrix} X_1 \\ Y_1 \\ Z_1 \end{bmatrix} = \begin{bmatrix} \cos\psi & \sin\psi & 0 \\ -\sin\psi & \cos\psi & 0 \\ 0 & 0 & 1 \end{bmatrix} \begin{bmatrix} Xg \\ Yg \\ Zg \end{bmatrix} \quad (1)$$

$\theta$: rotating around the $Y_1$ newly formed axis, define the angle until the $X_1$ axis is in accord with the Xs axis. Then ($X_2$, $Y_2$, $Z_2$) is formed.

$$\begin{bmatrix} X_2 \\ Y_2 \\ Z_2 \end{bmatrix} = \begin{bmatrix} \cos\theta & 0 & -\sin\theta \\ 0 & 1 & 0 \\ \sin\theta & 0 & \cos\theta \end{bmatrix} \begin{bmatrix} X_1 \\ Y_1 \\ Z_1 \end{bmatrix} \quad (2)$$

$\phi$: rotating around the $X_2$ axis, define the angle Xs and Zs according to each other. Then (Xs, Ys, Zs), that is the pen frame, is formed.

$$\begin{bmatrix} Xs \\ Ys \\ Zs \end{bmatrix} = \begin{bmatrix} 1 & 0 & 0 \\ 0 & \cos\phi & \sin\phi \\ 0 & -\sin\phi & \cos\phi \end{bmatrix} \begin{bmatrix} X_2 \\ Y_2 \\ Z_2 \end{bmatrix} \quad (3)$$

Figure 35:
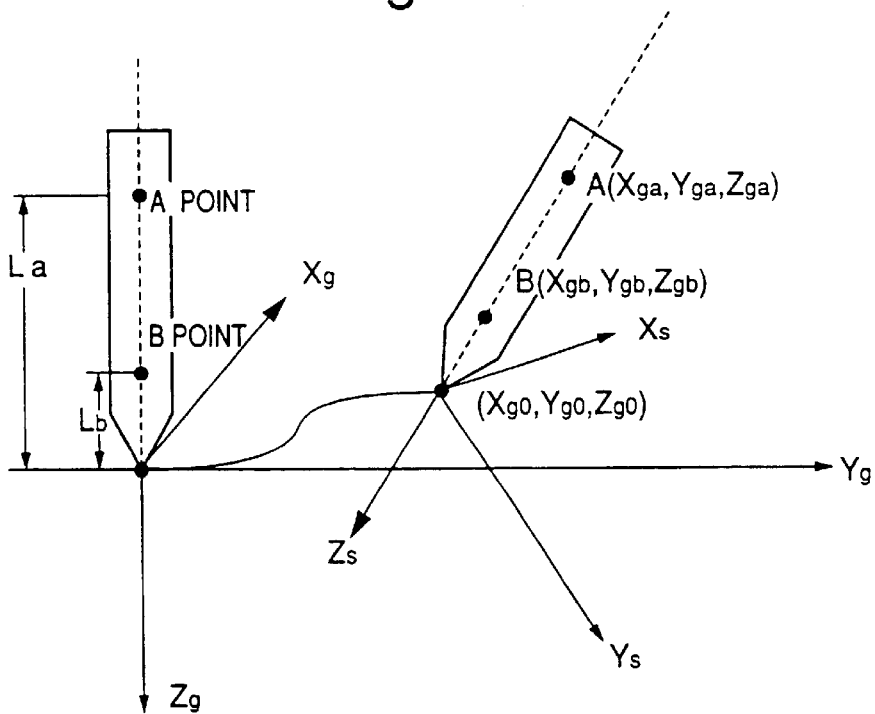
FIG. 35 is a diagram explaining the coordinates of the pen shaft.

FIG. 35 shows the coordinates of the pen shaft of the pen-shaped input apparatus in the case of putting the pen shaft vertically and on a fixed point and in the case of putting the pen shaft on an optional point as origin in a state of being inclined when the handwriting operation is performed.

The details of the relationship between the respective coordinates and the movement of the pen shaft are described hereinafter, referring to the first, second, and third embodiments according to the present invention.

B. Detailed Description of the First Embodiment and Its Modification.

The pen-shaped input apparatus of the first embodiment according to the present invention comprises three acceleration sensors, three gyroscopes and an operational calculating section. The three acceleration sensors respectively detect the accelerations in the X-axis, Y-axis, and Z-axis directions of the pen-shaft coordinate system around the Z axis of the pen shaft. The three gyroscopes respectively detect the angular velocity around the X axis, Y axis, and Z axis. The operational calculating section comprises an initial inclination angle calculating section, an inclination angle variation calculating section, a handwriting inclination angle calculating section, a coordinates conversion calculating section, and a movement amount calculating section.

The initial inclination angle calculating section calculates the initial value of the pen shaft inclination angle in the gravity coordinate system around a Z axis which extends in the gravity acceleration direction (vertically) on the basis of the accelerations detected by the three acceleration sensors when the pen shaped input apparatus is in a state of non-handwriting.

The inclination angle variation calculating section calculates the variation of the inclination angle of the pen shaft in the gravity coordinate system on the basis of the angular velocities detected by the three gyroscopes when the pen shaped input apparatus is in a state of handwriting.

The handwriting inclination angle calculating section calculates the inclination angle of the handwriting pen shaft in the gravity coordinate system on the basis of the initial value of the inclination angle calculated by the initial inclination angle calculating section and the variation of the inclination angle calculated by the inclination angle variation calculating section.

The coordinates conversion calculating section converts the acceleration in the pen shaft coordinate system detected by the acceleration sensor to the acceleration in the gravity coordinate system on the basis of the inclination angle of the handwriting pen shaft in the gravity coordinate system calculated by the handwriting inclination angle calculating section.

The movement amount calculating section calculates the movement direction and the movement distance of the pen's tip end on the basis of the acceleration converted by the coordinates conversion calculating section and thereby the movement direction and the movement distance of the tip end of the small-sized pen moving on the handwriting surface.

Furthermore, the movement distance of the pen's tip end calculated by the movement amount calculating section on the basis of the inclination to the gravity coordinate system on the handwriting surface is compensated to the movement distance on the handwriting surface, and thereby even when the handwriting surface is not horizontal, the movement direction and the movement distance of the pen's tip end can be detected precisely.

Furthermore, there are provided by-pass filters transmitting the high-frequency component of the signals of the three acceleration sensors and the three gyroscopes at frequencies above the neighborhood of 10 Hz. The actual frequencies of interest are frequencies caused by friction between the writing pen and writing surface which occur about 100 Hz. Other frequencies, caused by the movement of the writing implement which occur at or about 5 Hz are excluded by the 10 Hz cutoff. The beginning of handwriting is judged on the basis of the presence of the signal containing the high-frequency component at the beginning of any one of the signals from the three acceleration sensors and the three gyroscopes passing through the high-pass filters. In such manner, the start of the handwriting can be detected precisely. Likewise, when the high frequency component is absent from all the signals from the acceleration sensors and gyroscopes, for a threshold period of time, this indicates the ending of a handwriting operation.

Furthermore, there is provided an acceleration compensation section for calculating the value of the acceleration variation due to the inclination angle variation on the basis of the variation of the inclination angle in the gravity coordinate system of the handwriting pen shaft detected by the inclination angle variation and the position of mounting the acceleration sensor, and compensating the acceleration detected by the acceleration sensor, and the coordinates calculating section converts the acceleration compensated by the acceleration compensating section to the acceleration in the gravity coordinate system. In such manner, the influence due to the variation of the inclination angle during the time period of handwriting is eliminated.

Furthermore, the acceleration compensating section calculates a centrifugal force due to the variation of the inclination angle applied to the acceleration sensor on the basis of the speed variation of the inclination angle in the gravity coordinate system of the handwriting pen shaft detected by the inclination angle variation calculating section and the position of mounting the acceleration sensor. And then, the value of the acceleration variation due to the inclination angle variation is compensated on the basis of the above calculated centrifugal force, the acceleration detected by the acceleration sensor is compensated thereby, and the component of the centrifugal force due to the inclination angle variation of the acceleration detected by the acceleration sensor is compensated, and thereby the component of the centrifugal force accompanying the inclination angle variation of the acceleration detected by the acceleration sensor is also compensated.

Furthermore, the difference between the coordinates of the location of the acceleration sensors relative to the handwriting surface and the coordinates of the pen's tip end is compensated on the basis of the inclination angle in the gravity coordinate system of the handwriting detected by the handwriting inclination angle calculating section. In such manner, the entire input figure can be prevented from being deviated (shifted).

And further, the pen-shaped input apparatus comprises an apparatus main body and an inclination angle detecting apparatus for detecting the inclination angle of the pen shaft: in the gravity coordinate system. The apparatus main body comprises three acceleration sensors and an operational calculating section. The three acceleration sensors detect, respectively, the accelerations in the X-axis direction, the Y-axis direction, and the Z-axis direction of the pen shaft coordinates system in which the pen shaft is the Z axis.

The operational calculating section comprises a coordinates conversion calculating section and a movement amount calculating section. The coordinates conversion calculating section converts the acceleration obtained in accordance with the pen shaft coordinates system to an acceleration in the gravity coordinate system the on the basis of the inclination angle of the pen shaft in the gravity coordinate system as measured by the inclination angle detecting apparatus. The movement amount calculating section calculates the movement direction and the movement distance of the pen's tip end on the basis of the acceleration as converted by the coordinates conversion calculating section. In such manner, the construction of the apparatus main body can be simplified and the accuracy of detecting the inclination angle can be raised at the same time.

Moreover, the handwriting state may be judged in the pen-shaped input apparatus by use of an enable switch, etc. instead of on the basis of the presence of the high frequency components of the signals from the acceleration sensors and the gyroscopes. When the latter technique is used, the pen-shaped input apparatus uses a by-pass filter transmitting the high-frequency component of the signals from the acceleration sensors and the gyroscopes above the neighborhood of a frequency near 10 Hz. As noted, the actual frequencies of interest are about 10 Hz. Since the high-frequency component of the signals from the acceleration sensors, etc. is generated by the action of the friction between the pen's tip end and the handwriting surface and the frequency thereof is above the neighborhood of 10 Hz, the pen-shaped input apparatus judges, as "handwriting", the time period when the above-mentioned high-frequency component is detected in any one of the signals from the three acceleration sensors and the three gyroscopes. In such manner, operational errors can be prevented and the start of the handwriting can be detected precisely. The end of the handwriting can be detected when the high frequency component is no longer present in any of the signals from the acceleration sensors and gyroscopes for a threshold period of time.

And further, the pen-shaped input apparatus may be divided into a main body and the inclination angle detecting apparatus for detecting the inclination angle between the handwriting surface and the apparatus main body disposed just above the handwriting surface.

Figure 1:
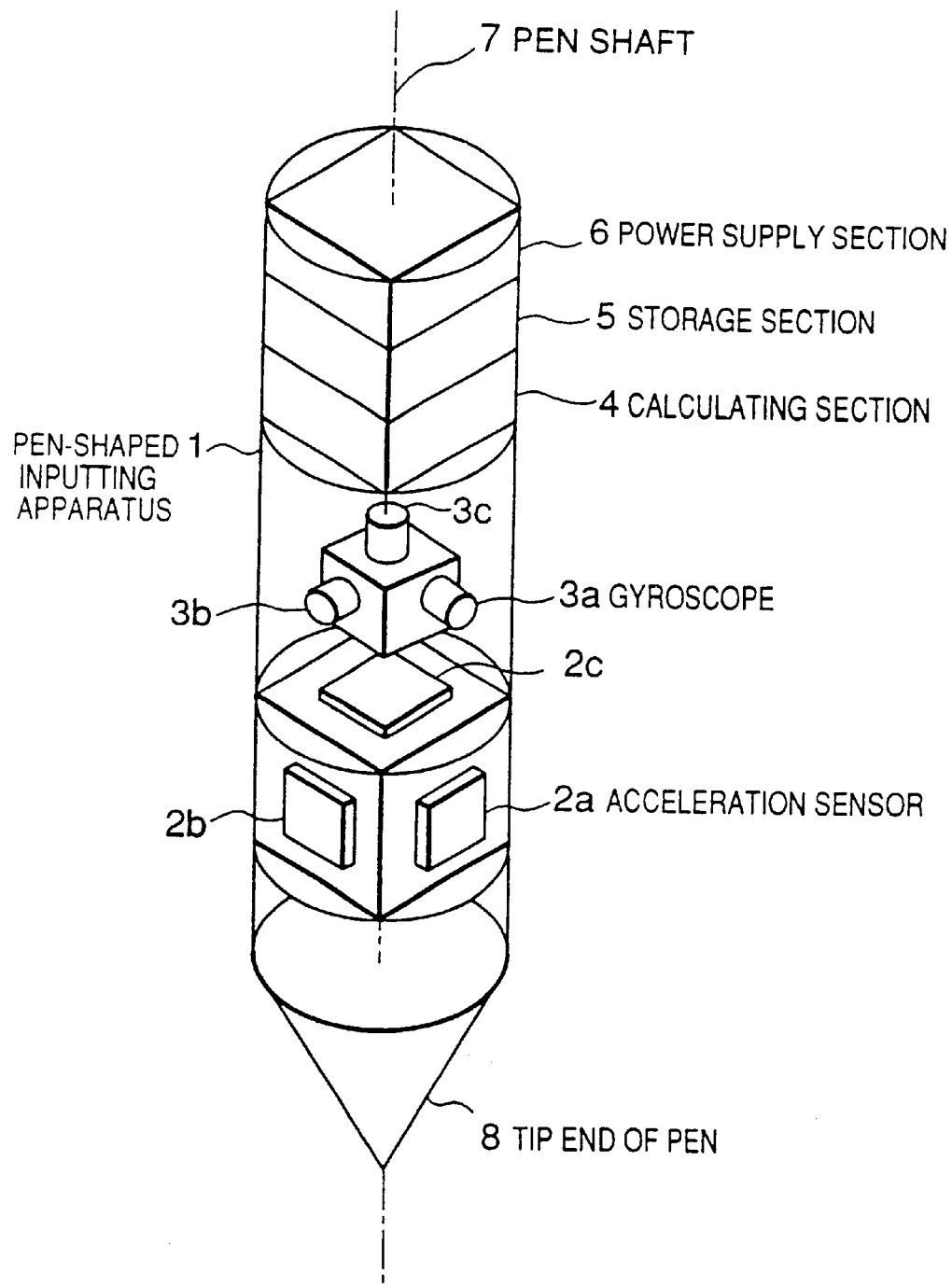
FIG. 1 is a structural view showing a first embodiment according to the present invention.

FIG. 1 is a structural view showing a pen-shaped input apparatus of a first embodiment according to the present invention. As shown in FIG. 1, the pen-shaped input apparatus 1 comprises acceleration sensors 2a, 2b, and 2c, gyroscopes 3a, 3b, and 3c, an operational calculating section 4, a memorizing section 5, and a power supply section 6.

The acceleration sensors 2a, 2b, and 2c are respectively disposed in the directions of Xs axis, Ys axis, and Zs axis, all of which are intersected perpendicularly to each other, wherein the pen shaft coincides with the Zs axis, and the sensors 2a, 2b, and 2c detect, respectively, the accelerations in the Xs-axis, Ys-axis, and Zs-axis directions at the pen's tip end 8. A piezo-electric type sensor or an electrostatic capacitance type sensor may be used as the acceleration sensors 2a, 2b, and 2c as well as a piezo-electric resistance type sensor. The gyroscopes 3a, 3b, and 3c respectively detect the angular velocities around the Xs axis, the Ys axis, and the Zs axis.

In the following description, the coordinate system of the pen shaft 7 coinciding with the Zs axis is called the pen shaft coordinate system, and the two axes both intersected perpendicularly to the pen shaft 7 and to each other are respectively called the Xs axis and the Ys axis.

And further, the coordinate system having a Zg axis extending in the gravity acceleration direction (vertically) is called the gravity coordinates system and the two axes intersected perpendicularly to the Zg axis and to each other are respectively called the Xg axis and the Yg axis. Furthermore, the angles formed between the Xs axis and the Ys axis, between the Zs axis and the Xg axis, and between the Yg axis and Zg axis are respectively specified as $\theta$, $\phi$, and $\psi$.

Figure 2:
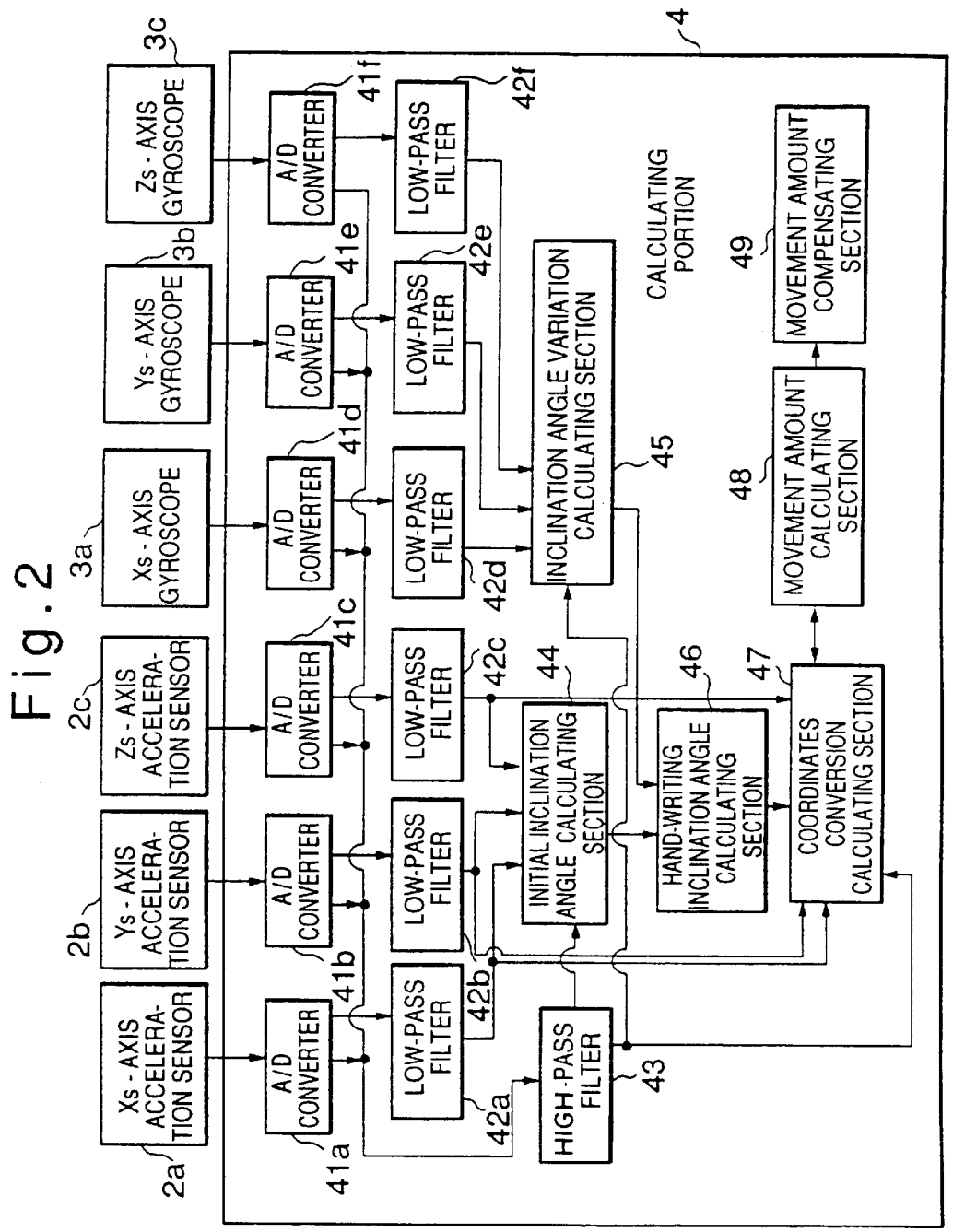
FIG. 2 is a block diagram showing the circuit of an operational calculating section of the first embodiment.

As shown in FIG. 2, the operational calculating section 4 comprises A/D converters 41a–41f, low-pass filters 42a–42f, a high-pass filter 43, an initial inclination angle calculating section 44, an inclination angle variation calculating section 45, a handwriting inclination calculating section 46, a coordinates conversion calculating section 47, and a movement amount calculating section 48.

The A/D converters 41a–41f respectively convert the analog signals from the acceleration sensors 2a, 2b, and 2c, and the gyroscopes 3a, 3b, and 3c to digital signals. The low-pass filters 42a–42f intercept the high-frequency component of the signals from the acceleration sensors 2a, 2b, and 2c and the gyroscopes 3a, 3b, and 3c caused by the action of the friction force between the pen's tip end 8 and the handwriting surface. The high-pass filter 43 extracts, for instance, the high-frequency component, above the neighborhood of 10 Hz, of the signals from the acceleration sensors 2a, 2b, and 2c and the gyroscopes 3a, 3b, and 3c caused by the action of the friction force. This high frequency component, when present, indicates the beginning of a writing condition. Before the high frequency component occurs, its absence indicates that a handwriting operation has not yet begun. In addition, once the high frequency component appears, its later absence from the acceleration sensor and gyroscope signals for a threshold period indicates that a writing condition has ended.

The initial inclination angle calculating section 44 calculates the initial values $\theta_0$, $\phi_0$, and $\psi_0$ of the inclination angles in the gravity coordinate system of the pen shaft 8 on the basis of the acceleration in the pen shaft coordinate system detected by the three acceleration sensors 2a, 2b, and 2c in a state of non-handwriting.

The inclination angle variation calculating section 45 calculates the variations $\Delta\theta$, $\Delta\phi$, and $\Delta\psi$ of the inclination angle in the gravity coordinate system of the pen shaft 8 on the basis of the angular velocity detected by the three gyroscopes 3a, 3b, and 3c in a state of handwriting. The handwriting inclination angle calculating section 46 obtains the inclination angles $\theta$, $\phi$, and $\psi$ in the gravity coordinate system of the handwriting pen shaft 8 on the basis of the initial values $\theta_0$, $\phi_0$, and $\psi_0$ of the inclination angle in the gravity coordinate system of the pen shaft 8 calculated by the initial inclination angle calculating section 44, and the variations $\Delta\theta_0$, $\Delta\phi$, and $\Delta\psi$ of the inclination angle in the gravity coordinate system of the pen shaft 8 calculated by the inclination angle variation calculating section 45. The coordinates conversion calculating section 47 converts the acceleration in the pen shaft coordinate system detected by the acceleration sensors 2a, 2b, and 2c to the acceleration in the gravity coordinate system on the basis of the inclination angles $\theta$, $\phi$, and $\psi$ in the gravity coordinate of the handwriting pen shaft 8 detected by the handwriting inclination angle calculated by the handwriting inclination angle calculating section 46.

The movement amount calculating section 48 calculates the movement direction and the movement distance of the pen's tip end 8 on the basis of the acceleration in the gravity coordinate system thus converted by the coordinates conversion calculating section 47 and the section 48 stores the calculated values in the storage section 5.

In such manner, the high-frequency signals caused by the action of the friction force between the pen's tip end 8 and the handwriting surface are detected respectively, and thereby a judgment can be made on whether the input apparatus is in the state of "handwriting" or "not-handwriting". Therefore, it is possible to detect easily and precisely the state of handwriting or not-handwriting.

The initial inclination angle calculating section 44 respectively inputs the signals from the acceleration sensor 2a for the Xs axis, the acceleration sensor 2b for the Ys axis, and the acceleration sensor 2c for the Zs axis when it does not receive the signal showing the state of "handwriting" from the by-pass filter, and calculates the initial values $\theta_0$, $\phi_0$, and $\psi_0$ of the inclination angles in the gravity coordinate system of the pen shaft 8 (Step S1).

Hereupon, the calculation of the afore-mentioned inclination angle is described hereinafter. The conversion from the gravity coordinates system to the pen shaft coordinates system can be performed in accordance with the following equation:

$$\begin{pmatrix} Xs \\ Ys \\ Zs \end{pmatrix} = \begin{pmatrix} \cos\theta\cos\psi & \cos\theta\sin\psi & -\sin\theta \\ \sin\phi\sin\theta\cos\psi - \cos\phi\sin\psi & \sin\phi\sin\theta\sin\psi + \cos\phi\cos\psi & \sin\phi\cos\theta \\ \cos\phi\sin\theta\cos\psi - \sin\phi\sin\psi & \cos\phi\sin\theta\sin\psi + \sin\phi\cos\psi & \cos\phi\cos\theta \end{pmatrix} \begin{pmatrix} Xg \\ Yg \\ Zg \end{pmatrix} \quad (4)$$

The equation (equation 4) can be changed from the conversion formula of the pen shaft coordinate system to that of the gravity coordinate system, and thereby the following equation (equation 5) can be obtained.

$$\begin{pmatrix} Xg \\ Yg \\ Zg \end{pmatrix} = \begin{pmatrix} \cos\theta\cos\psi & \sin\phi\sin\theta\cos\psi + \cos\phi\sin\psi & \cos\phi\sin\theta\cos\psi + \sin\phi\sin\psi \\ \cos\theta\sin\psi & \sin\phi\sin\theta\sin\psi + \cos\phi\cos\psi & \cos\phi\sin\theta\sin\psi + \sin\phi\cos\psi \\ -\sin\theta & \sin\phi\cos\theta & \cos\phi\cos\theta \end{pmatrix} \begin{pmatrix} Xs \\ Ys \\ Zs \end{pmatrix} \quad (5)$$

Figure 3:
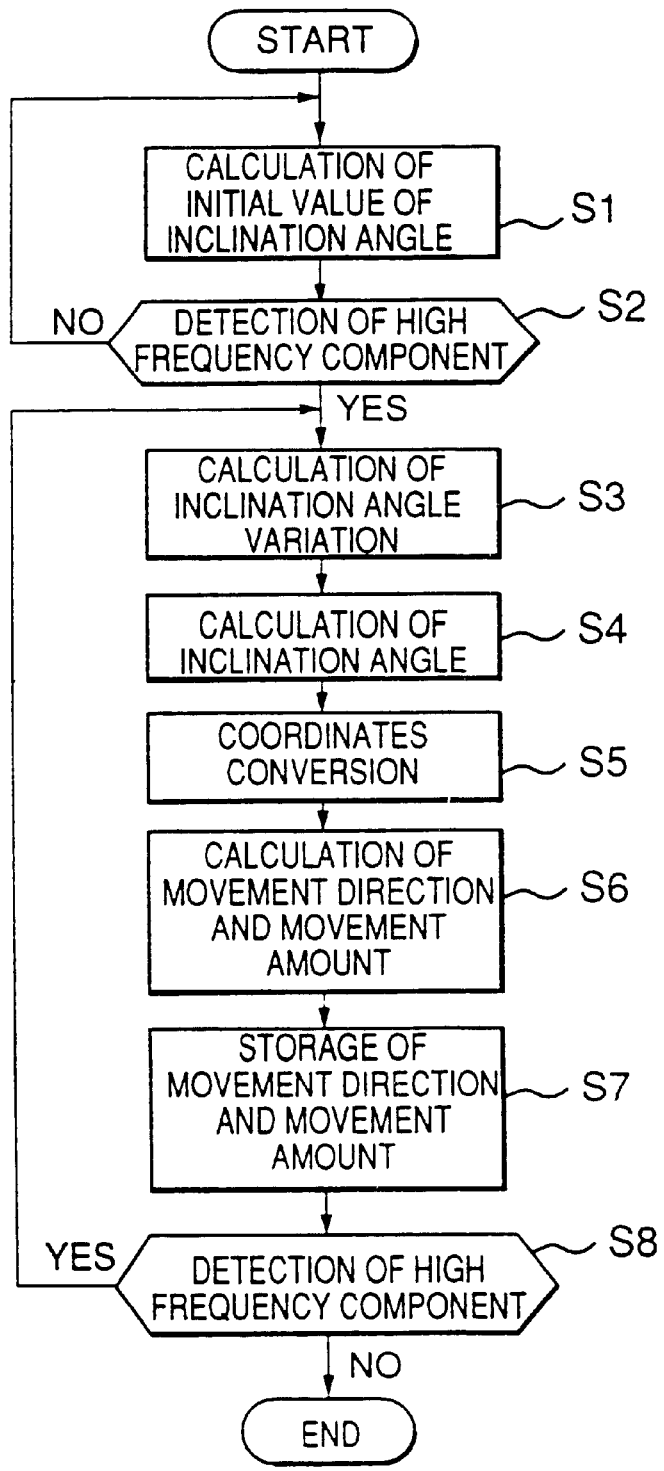
FIG. 3 is a flow chart showing the operation of a pen-shaped input apparatus of the first embodiment.

The operation of the pen-shaped input apparatus 1 constructed as mentioned above is described referring to the flow chart of FIG. 3.

The acceleration sensors 2a, 2b, and 2c respectively detect the accelerations in the Xs direction, the Ys direction, and the Zs direction. The high-pass filter 43 extracts the high-frequency component of the signals from the acceleration sensors 2a, 2b, and 2c and the gyroscopes 3a, 3b, and 3c inputted through the A/D converters 41a–41f, all of which exceed the neighborhood of 10 Hz.

The above equation (equation 5) is approximated with a first-order (linear) approximation formula and converted to the acceleration vector equation, and thereby the following two equations (equations 6a,6b) can be obtained. Hereupon, it is assumed that the acceleration vectors detected by the acceleration sensors 2a, 2b, and 2c in the pen shaft coordinate system are, respectively, Axs, Ays, and Azs, while the acceleration vectors detected by the acceleration sensors 2a, 2b, and 2c in the gravity coordinate system are Axg, Ayg, and Azg.

$$\begin{pmatrix} Axs \\ Ays \\ Azs \end{pmatrix} = \begin{pmatrix} \cos\theta\cos\psi & \cos\theta\sin\psi & -\sin\theta \\ \sin\phi\sin\theta\cos\psi - \cos\phi\sin\psi & \sin\phi\sin\theta\sin\psi + \cos\phi\cos\psi & \sin\phi\cos\theta \\ \cos\phi\sin\theta\cos\psi - \sin\phi\sin\psi & \cos\phi\sin\theta\sin\psi + \sin\phi\cos\psi & \cos\phi\cos\theta \end{pmatrix} \begin{pmatrix} Axg \\ Ayg \\ Azg \end{pmatrix} \quad (6a)$$

$$\begin{pmatrix} Axg \\ Ayg \\ Azg \end{pmatrix} = \begin{pmatrix} \cos\theta\cos\psi & \sin\phi\sin\theta\cos\psi + \cos\phi\sin\psi & \cos\phi\sin\theta\cos\psi + \sin\phi\sin\psi \\ \cos\theta\sin\psi & \sin\phi\sin\theta\sin\psi + \cos\phi\cos\psi & \cos\phi\sin\theta\sin\psi + \sin\phi\cos\psi \\ -\sin\theta & \sin\phi\cos\theta & \cos\phi\cos\theta \end{pmatrix} \begin{pmatrix} Axs \\ Ays \\ Azs \end{pmatrix} \quad (6b)$$

The acceleration vectors Axs, Ays, and Azs and the inclination angles θ, φ, and ψ are respectively substituted for the above-mentioned tentative approximation formula, and thereby acceleration vectors Axg, Ayg, and Azg can be obtained on the handwriting surface.

On the other hand, the acceleration in the static state is expressed by the following equation (equation 7).

$$\begin{pmatrix} Axg \\ Ayg \\ Azg \end{pmatrix} = \begin{pmatrix} 0 \\ 0 \\ -g \end{pmatrix} \quad (7)$$

The equation 7 is substituted for the equations 6a, 6b, and thereby the following equation (equation 8) can be obtained.

$$\begin{pmatrix} Axs \\ Ays \\ Azs \end{pmatrix} = \begin{pmatrix} (g)\sin(\theta 0) \\ -(g)\cos(\theta 0)\sin(\phi 0) \\ -(g)\cos(\theta 0)\cos(\phi 0) \end{pmatrix} \quad (8)$$

The inclination angles $\theta_0$, $\phi_0$, and $\psi_0$ in the gravity coordinates system of the pen shaft 8 put in the static state can be obtained (calculated) from the above equation (equation 8).

Hereupon, since three equations can be established for the inclination angles $\theta_0$ and $\phi_0$ in the static state, the gravity acceleration "g" can be treated as an absolute value, and absolute values of the inclination angles $\theta_0$ and $\phi_0$ in the static state can be calculated without defining the value of "g". Furthermore, it may be allowed also to calculate the value of the gravity acceleration "g", judge whether the operational calculation is good or bad in accordance with the variation of the value of the gravity acceleration "g" thus calculated, and issue an alarm signal, for instance, in case that the calculated value varies largely.

When the inclination angle calculating section 45 receives the signal showing "handwriting" from the by-pass filter 43 (step S2), the variations Δθ, Δφ, and Δψ of the inclination angles in the gravity coordinates system of the en shaft 8 are calculated on the basis of the angular velocities detected by the three gyroscopes 3a, 3b, and 3c (Step S3).

Assuming that the rotational angular velocities of the (angular) axes Xs, Ys, and Zs in the pen coordinates are P, Q, and R, the relationship between the rotational angular velocities P, Q, and R and the inclination angle variations Δψ, Δθ, and Δφ can be obtained (calculated) in accordance with the following equations (equations 9).

66 φ=P+Qsinφtanθ+Rcosφtanθ

Δθ=Qcosφ−Rsinφ

Δφ=Qsinφcosθ+Rcosφsecθ  (9)

As mentioned above, the handwriting inclination angle calculating section 46 obtains (calculates) the inclination angles θ, φ, and ψ of the handwriting pen shaft on the basis of the initial values $\theta_0$, $\phi_0$, and $\psi_0$ of the inclinations of the pen shaft 8 calculated by the initial inclination angle calculating section 44 and the inclination angle variations Δθ, Δφ, and Δψ of the pen shaft 8 calculated by the inclination angle variation calculating section 45 (Step S4).

The coordinates conversion calculating section 47 converts the accelerations Axs, Ays, and Azs of the pen shaft 8 calculated by the acceleration sensors 2a, 2b, and 2c to the accelerations Axg, Ayg, and Azg in the gravity coordinate system on the basis of the inclination angle during handwriting detected by the handwriting inclination angle calculating section 46 (Step S5).

Hereupon, the conversion formula which has been already explained is employed in order to convert the accelerations Axs, Ays, and Azs in the pen shaft coordinates system to the accelerations Axg, Ayg, and Azg in the gravity coordinate system.

The movement amount calculating section 48 calculates the movement direction and the movement distance of the pen's tip end 8 on the basis of the acceleration of the pen's tip end 8 converted by the coordinates conversion calculating section 47 (Step S6), and stores the values thus calculated in the storage section 5 (Step S7).

The pen-shaped input apparatus 1 repeats the above-mentioned operations (Steps S3–S7) during the time period of outputting the signal showing that the high-pass filter 43 is put in the operation of the handwriting, and inputs the figure, etc. (Step S8). In such manner, the figure, etc. can be inputted precisely by compensating the influence exerted on the pen-shaped input apparatus 1 by the inclination angle in the gravity coordinate system.

Hereupon, although it is assumed that the axis Zg extending in the gravity acceleration direction intersects perpendicularly to the handwriting surface in the above-mentioned embodiment (first embodiment), if the handwriting surface is not horizontal, an error may occur in the above detection result on some occasions.

Figure 4:
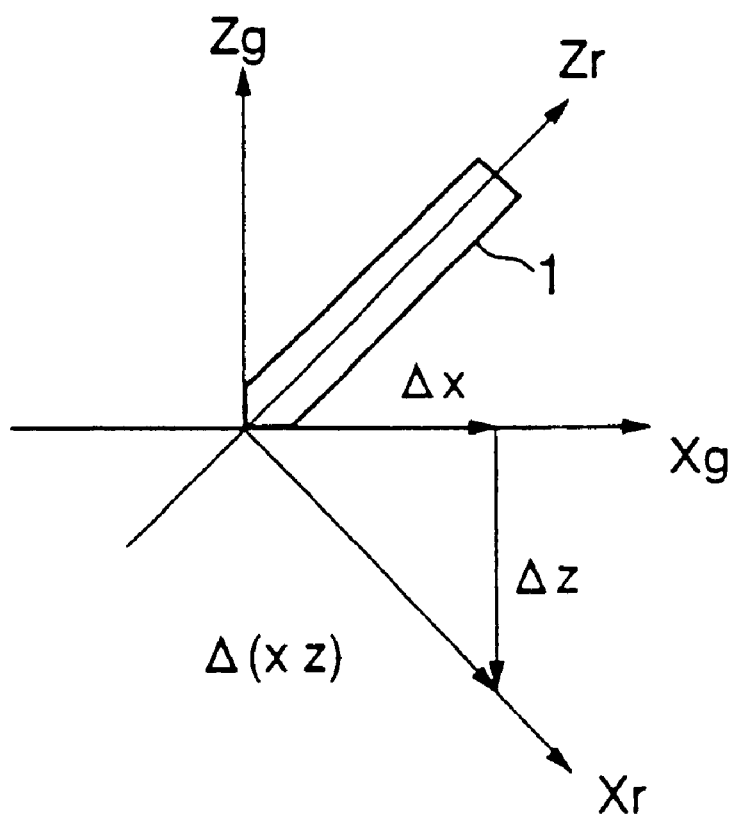
FIG. 4 is a side view of the pen-shaped input apparatus in which the handwriting surface is not horizontal.

For instance, assuming that the axis perpendicular to the handwriting surface is Zr and the axes intersecting perpendicularly to each other on the handwriting surface perpendicular to Zr are, respectively, Xr and Yr as shown in FIG. 4, the coordinate system established by Xr, Yr, and Zr is defined as the handwriting surface coordinates system. Assuming that the angle formed by the Xr axis and the Xg axis is q and the deviations (displacements) in the Xg-axis direction and the Zg-axis direction are, respectively, Dx and Dz, the relationship therebetween satisfies the following equation:

θ=arctan (Az/Ax)  (10)

And further, the value of Δ(xz) can be obtained by the following two equations:

Δ(xz)=(Δx)cosθ, and  (11)

Δ(xz)=(Δz)sinθ  (12)

The movement amount compensating section 49 performs the above operational calculation, wherein it may be allowed to compensate the movement distance in case that the handwriting surface is not horizontal.

Figure 5:
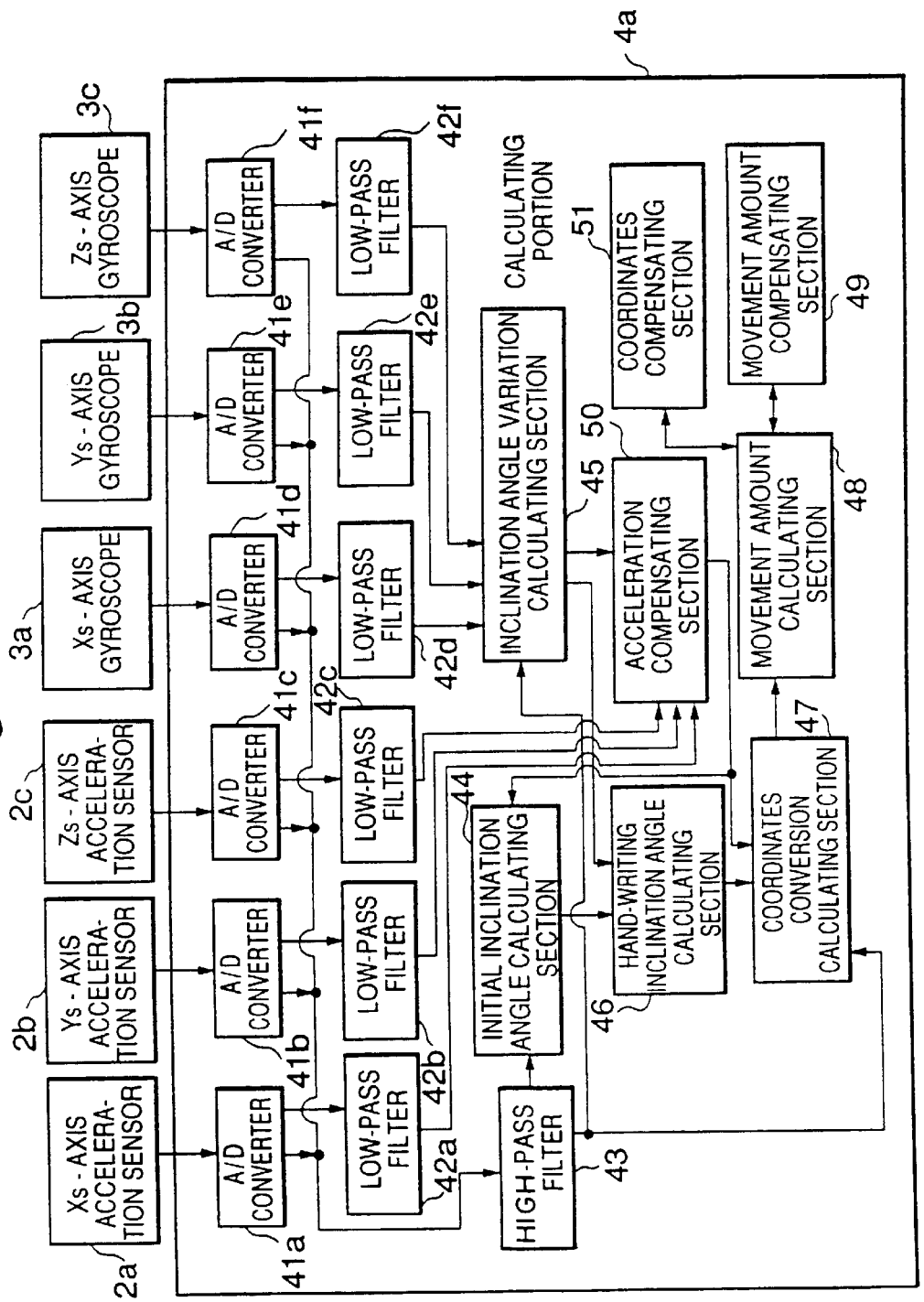
FIG. 5 is a block diagram showing the circuit of the operational calculating section which includes an acceleration compensating section.
Figure 6:
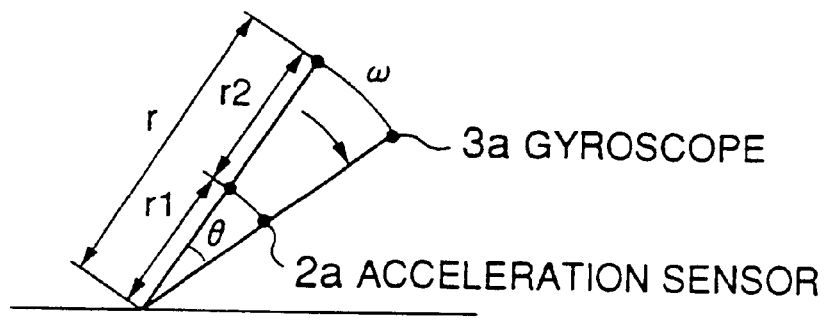
FIG. 6 is an explanatory diagram showing the variation of an inclination angle of the pen-shaped input apparatus.

And further, when the inclination angle of the pen-shaped input apparatus 1 varies during handwriting, the acceleration caused by the inclination angle variation of the pen-shaped input apparatus 1 to the accelerations applied to the acceleration sensors 2a, 2b, and 2c varies as the result thereof. An acceleration compensating section 50 may also be provided for calculating the variation value of the acceleration caused by the inclination angle variation on the basis of the variation value of the inclination angle during handwriting detected by the handwriting inclination angle calculating section 46 and the mounting position of the acceleration sensors 2a, 2b, and 2c, as shown in FIG. 5. For instance, consider the case of rotating the pen-shaped input apparatus by q (radian) in the direction of arrow B around the pen's tip end, as shown in FIG. 6.

The acceleration sensor 2 is located on the position separated by a distance r1 from the pen's tip end 8. Assuming that the rotational angular velocity detected by the gyroscope 3 is w (radian), the acceleration a1 applied to the acceleration sensor 2 caused by the inclination thereof turns out to be $$(a1) = (r1) \times \frac{dw(t)}{dt}.$$

The acceleration compensating section 50 can obtain (calculate) the actual acceleration by subtracting the acceleration a1 applied to the acceleration sensor 2 caused by the above-mentioned inclination from the acceleration detected by the acceleration sensor 2.

Furthermore, when the inclination angle of the pen-shaped input apparatus 1 varies during handwriting, the centrifugal force occurring at this time exerts an influence on the accelerations detected by the acceleration sensors 2a, 2b, and 2c, on some occasions. On those occasions, it may be allowed to compensate the influence exerted on the accelerations detected by the acceleration sensors 2a, 2b, and 2c due to the above-mentioned centrifugal force by use of the acceleration compensating section 50. For instance, assuming that the acceleration sensor 2c for detecting the acceleration in the Zs-shaft direction is located at the position apart by r1 from the pen's tip end, the acceleration caused by the centrifugal force turns out to be $-(r1) \times w^2$. The acceleration compensation section 50 subtracts the acceleration caused by the centrifugal force from the acceleration detected by the acceleration sensor 2c and thereby compensates the detection error. Moreover, although the acceleration in the Zs direction is thus compensated in the above embodiment (first embodiment), the accelerations in the Xs axis and the Ys axis can be compensated also in a similar way.

Figure 7:
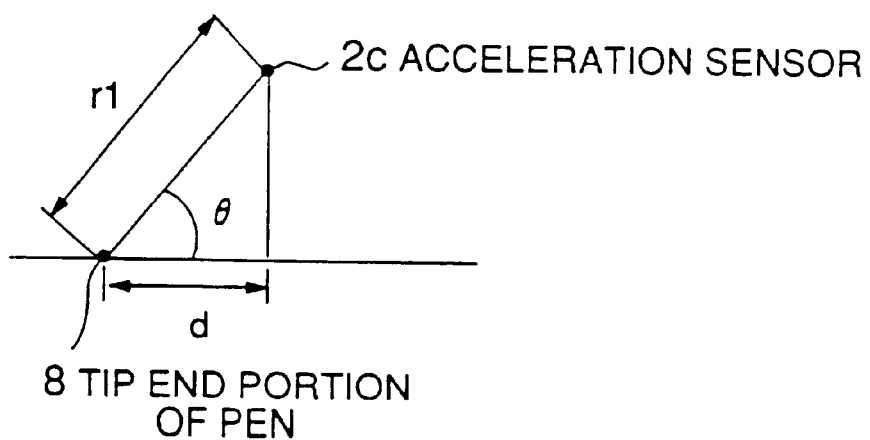
FIG. 7 is an explanatory diagram showing the coordinates difference in case that the coordinate system of the pen shaft does not coincide with the coordinate system of the handwriting surface.

Furthermore, when the pen shaft coordinates system does not coincide with the handwriting surface coordinates system as shown in FIG. 7, the coordinates of the origin at the pen's tip end 8 deviates by d and thereby the entire handwritten figure gets out of position on some occasions. It may be also allowed to obtain (calculate) the deviation value $d=(r1) \times \cos\theta$ by use of the coordinates compensating section 51 and thereby compensate the origin coordinates thereof.

C. Modification of First Embodiment

Figure 8:
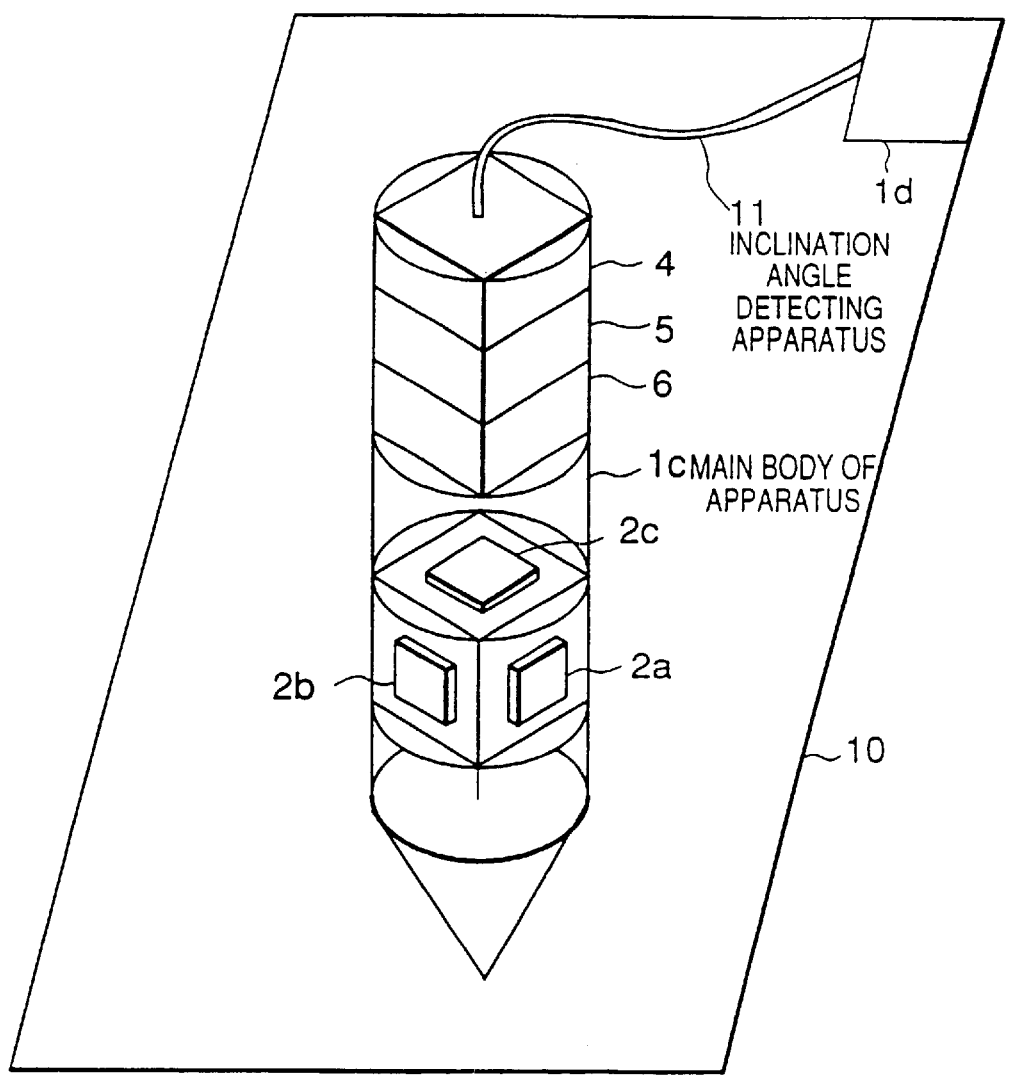
FIG. 8 is a perspective view of another pen-shaped input apparatus which is a modification of the first embodiment according to the present invention.

Next, a modification of the first embodiment is described below. In the modification, shown in FIG. 8, the pen-shaped input apparatus 1b is divided into the apparatus main body 1c and the inclination angle detecting apparatus 1d and both sections are connected to each other by a communication cable 11, and the inclination angle formed between the apparatus main body 1c and the handwriting surface 10 is detected by the inclination angle detecting apparatus 1d mounted on the handwriting surface 10.

Figure 9:
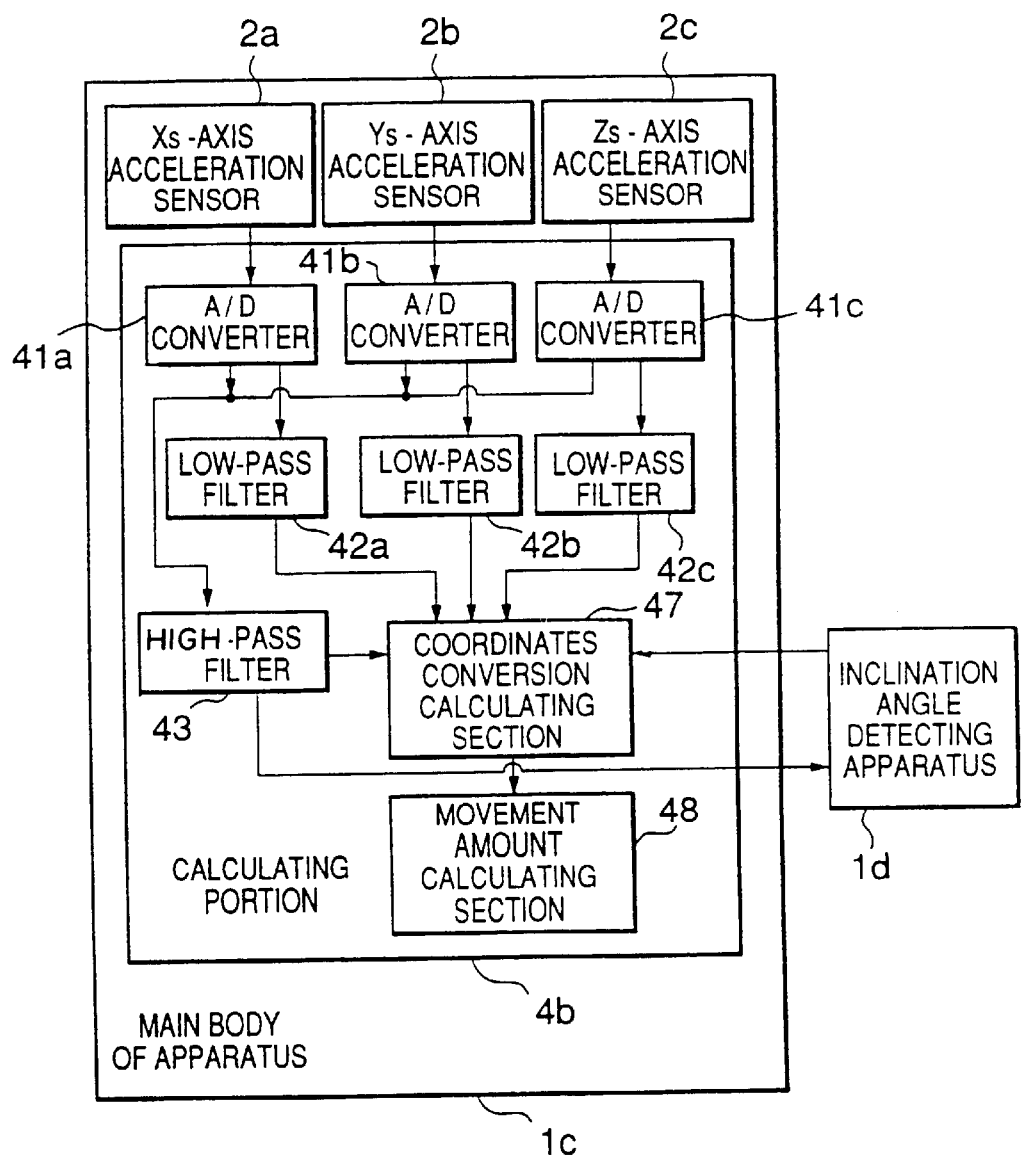
FIG. 9 is a block diagram of an operational calculating section of the pen-shaped input apparatus of the modification.

As shown in FIG. 9, the apparatus main body 1c comprises three acceleration sensors 2a, 2b, and 2c and an operational calculating section 4b. The three acceleration sensors 2a, 2b, and 2c respectively detect, as described above, the accelerations in the Xs axis, the Ys axis, and the Zs axis. The operational calculating section 4b comprises a coordinates conversion calculating section 47 and a movement amount calculating section 48. The coordinates conversion calculating section 47 converts the acceleration in the pen shaft coordinate system detected by the acceleration sensors 2a, 2b, and 2c to the acceleration in the handwriting surface coordinate system on the basis of the inclination angle in the handwriting surface coordinate system of the handwriting pen shaft 8 detected by the inclination angle detecting apparatus 1d.

The movement amount calculating section 48 calculates the movement direction and the movement distance of the pen's tip end 8 on the basis of the acceleration thus converted by the coordinates conversion calculating section. In such structure, the construction of the apparatus main body 1c can be simplified and the accuracy of detecting the inclination angle can be raised.

Regarding the above-mentioned first and modified embodiments, the following advantageous functional effects are acheived. As is apparent from the foregoing description of the accelerations in the X-axis direction, the Y-axis direction, and the Z-axis direction in the case of assuming that the pen shaft is the Z axis are respectively converted to acceleration(s) in the gravity coordinate system, and then the movement direction and the movement distance of the pen's tip end are calculated on the basis of the acceleration thus converted. Consequently, the movement direction and the movement distance of the tip end of the pen moving on the handwriting surface can be detected precisely with a small-sized apparatus.

Furthermore, since the movement distance of the pen's tip end is compensated to the movement distance on the handwriting surface on the basis of the angle formed between the handwriting plane surface and the horizontal plane surface, the movement direction and the movement distance of the pen's tip end can be detected precisely even in case that the handwriting surface is not horizontal.

Furthermore, the high-frequency component of the signal from the acceleration sensors and the gyroscopes above the neighborhood of 10 Hz is transmitted, and the start and end of the handwriting are judged on the basis of the high-frequency component thus transmitted. Consequently, the start and end of the handwriting can be detected precisely.

Furthermore, the variation value of the acceleration due to the variation of the inclination angle is calculated on the basis of the variation value of the inclination angle during handwriting and the mounting position of the acceleration sensor and the acceleration detected by the acceleration sensor is compensated. Consequently, the acceleration can be detected precisely.

Furthermore, the centrifugal force caused by the variation of the inclination angle is calculated on the basis of the variation value of the inclination angle during the handwriting and the mounting position of the acceleration sensor and further the variation value of the acceleration due to the variation of the inclination angle on the basis of the calculated centrifugal force, and then the component of the centrifugal force accompanying the variation of the inclination angle of the acceleration detected by the acceleration sensor is compensated. Consequently, the acceleration can be more precisely detected.

Furthermore, the error (difference) between the coordinates of the acceleration on the handwriting plane surface and the coordinates of the pen's tip end is compensated on the basis of the inclination angle during the handwriting and the mounting position of the acceleration sensor. Consequently, the occurrence of the deviation (getting out of position) of the entire inputting figure can be prevented.

And further, since the inclination angle formed between the apparatus main body and the handwriting surface is detected on the handwriting surface, the construction of the apparatus main body can be simplified and the accuracy of detecting the inclination angle can be raised.

D. Detailed Description of the Second Embodiment

The pen-shaped input apparatus of the second embodiment according to the present invention comprises three acceleration sensors, three gyroscopes and an operational calculating section. The three acceleration sensors respectively output the signals showing the accelerations in the Xs-axis, Ys-axis, and Zs-axis directions of the pen-shaped coordinate system (Xs, Ys, Zs) around the Zs axis of the pen shaft. The three gyroscopes respectively output the signals showing the rotational angular velocity around the Xs axis, Ys axis, and Zs axis.

The operational calculating section comprises an initial inclination angle calculating section, an inclination angle variation calculating section, a handwriting inclination angle calculating section, an acceleration compensating section, a coordinates conversion calculating section, and a movement amount calculating section.

The initial inclination angle calculating section calculates the initial value of the pen shaft inclination angle in the gravity coordinate system (Xg, Yg, Zg) around the Zg axis extending in the gravity acceleration direction on the basis of the acceleration detected by the three acceleration sensors when the input apparatus is in a state of non-handwriting.

The inclination angle variation calculating section calculates the variation of the inclination angle of the pen shaft in the gravity coordinate system (Xg, Yg, Zg) on the basis of the rotational angular velocity detected by the three gyroscopes when the input apparatus is in a state of handwriting.

The handwriting inclination angle calculating section calculates the inclination angle of the handwriting pen shaft in the gravity coordinates system (Xg, Yg, Zg) on the basis of the initial value of the inclination angle calculated by the initial inclination angle calculating section and the variation of the inclination angle calculated by the inclination angle variation calculating section.

The acceleration compensating section compensates the acceleration sensed at the mounting positions of the three acceleration sensors in the pen shaft coordinates system (Xs, Ys, Zs) to acceleration at the pen's tip end, on the basis of the mounting positions of the three acceleration sensors, the rotational angular velocity detected by the three gyroscopes, the inclination angle variation of the pen shaft calculated by the inclination angle variation calculating section, and the inclination angle of the handwriting pen shaft calculated by the handwriting inclination angle calculating section.

The coordinates conversion calculating section converts the acceleration in the pen shaft coordinate system (Xs, Ys, Zs), compensated by the acceleration compensating section, to the acceleration in the gravity coordinate system (Xg, Yg, Zg), on the basis of the inclination angle in the gravity coordinate system (Xg, Yg, Zg) of the handwriting pen shaft detected by the handwriting inclination angle calculating section. The movement amount calculating section calculates the movement direction and the movement distance of the pen's tip end on the basis of the acceleration converted by the coordinates conversion calculating section.

Consequently, the influence exerted by the inclination angle of the apparatus and the mounting position of the acceleration sensors can be compensated, and thereby the handwriting input operation can be performed more precisely and simply.

The acceleration sensor of the Xs-axis direction is disposed on the position of Ys=0, the acceleration sensor of the Ys-axis direction is disposed on the position of Xs=0, and the acceleration sensor of the Zs-axis direction is disposed on the Zs axis, in order to simplify the calculation of the operational calculating section.

Furthermore, the respective acceleration sensors are arranged on the positions near the Zs axis, in order to reduce the amount of the calculation and thereby shorten the calculating time.

Furthermore, the pen-shaped input apparatus comprises a high-pass filter for transmitting the high-frequency component of the signals from the three acceleration sensors and the three gyroscopes generated by the action of the friction between the pen's tip end and the handwriting surface, judges the start of handwriting on the basis of any of the signals from the three acceleration sensors and the three gyroscopes passing through the high-pass filters which contain the high-frequency component, e.g. 100 Hz, for the first time, and judges the end of handwriting on the basis of the disappearance, after some predetermined threshold time period of all high frequency component signals from the three acceleration sensors and the three gyroscopes. In such manner, the prehandwriting condition as well as the handwriting start and the handwriting end can be detected with a simple construction.

Furthermore, the pen-shaped input apparatus comprises a handwriting orbit extracting section and a fitting section. The handwriting orbit extracting section extracts the orbit of the pen's tip end from the start of handwriting to the end thereof in accordance with the movement direction and the movement distance of the pen's tip end calculated by the movement amount calculating section. The fitting section transfers the image of the orbit of the pen's tip end extracted by the handwriting orbit extracting section onto the handwriting surface, and thereby compensates the influence due to the inclination of the handwriting surface.

And further, the movement amount calculating section calculates the movement distances in the Xg direction and the Yg direction, and the handwriting orbit extracting section extracts the orbit of the pen's tip end from the start of handwriting to the end thereof in accordance with the movement distances in the Xg direction and the Yg direction of the pen's tip end calculated by the movement amount calculating section. In such manner, the influence due to the inclination of the handwriting surface can be accommodated with a simple construction.

The pen-shaped input apparatus of the second embodiment is capable of inputting characters, symbols, and figures, etc. into a computer apparatus or the like. The pen-shaped input apparatus of the second embodiment detects the accelerations in the Xs-axis direction, the Ys-axis direction, and the Zs-axis direction of the pen shaft coordinate system having the pen shaft as the Zs axis, and thereby the movement direction and the movement distance of the pen's tip end on the basis of the acceleration thus detected in the Xs-axis direction, the Ys-axis direction, and the Zs-axis direction. The -error due to the mounting position of the acceleration sensors and other errors due to the inclination of the apparatus are included in the accelerations detected by the acceleration sensors.

Figure 10:
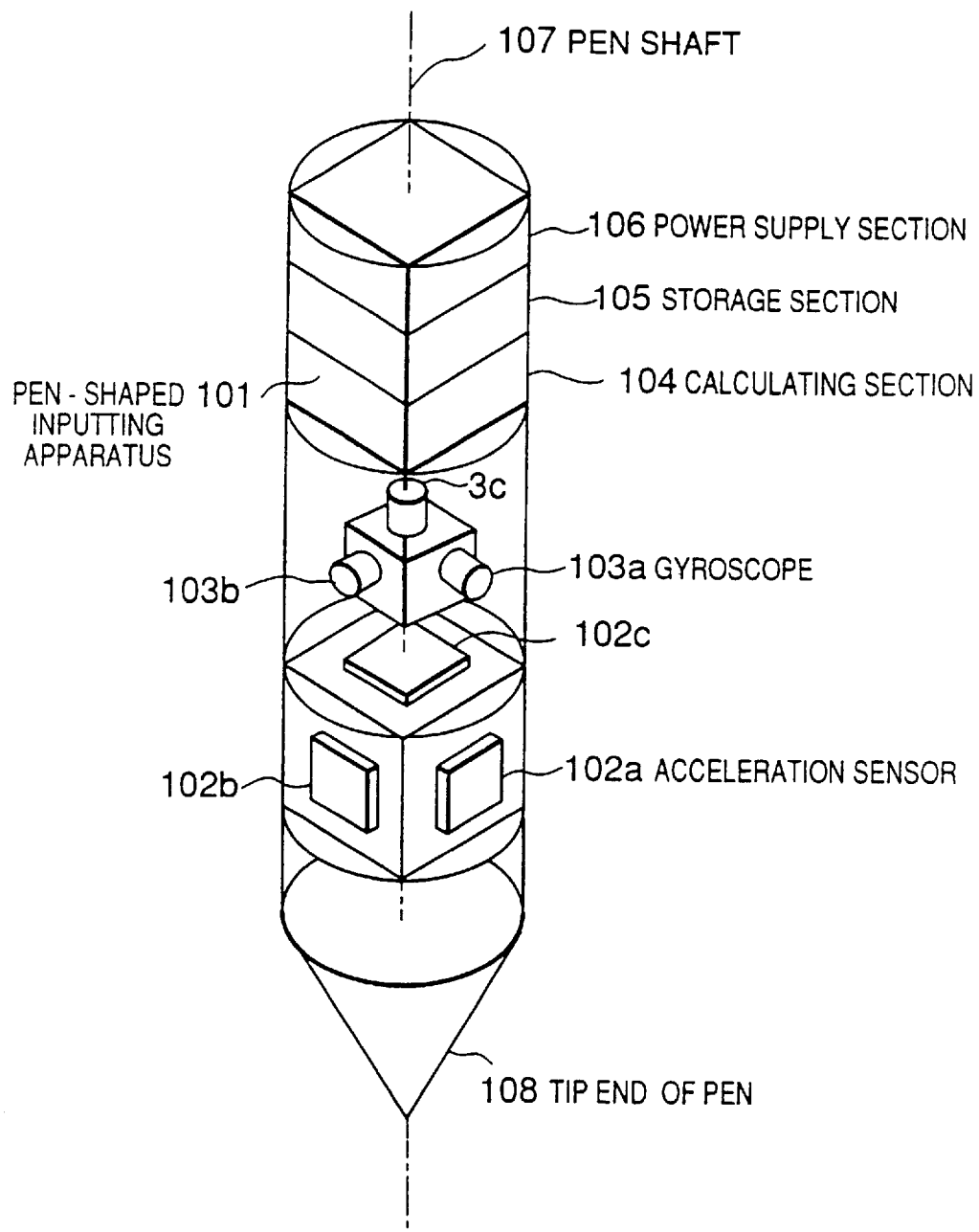
FIG. 10 is a structural view showing a second embodiment according to the present invention.

FIG. 10 is a structure view showing the second embodiment according to the present invention.

As shown in FIG. 10, the above pen-shaped input apparatus 101 comprises acceleration sensors 102a, 102b, and 102c, gyroscopes 103a, 103b, and 103c, an operational calculating section 104, a storage section 105, and a power supply section 106.

The acceleration sensors 102a, 102b, and 102c are respectively arranged near the Zs axis in the directions of the Xs axis, the Ys axis, and the Zs axis, on the assumption that the pen shaft 107 is the Zs axis, respectively detect the accelerations in the directions of the Xs axis, the Ys axis, and the Zs axis, and respectively output the signals showing the detected accelerations. A piezoelectric voltage system, electrostatic capacitance system, or piezoelectric resistance system may be used as the acceleration sensors 102a, 102b, and 102c. The gyroscopes 103a, 103b, and 103c respectively detect the rotational angular velocities around the Xs axis, the Ys axis, and the Zs axis and respectively output the signals showing the detected rotational angular velocities.

As in the first embodiment, the coordinate system of pen shaft 107 as the Zs axis is called the pen shaft coordinate system (Xg, Yg, Zg), and the two axes perpendicular to the Zs axis and to each other are respectively called the Xs axis and the Ys axis. And further, the coordinate system of the axis extending in the gravity acceleration direction as the Zg axis is called the gravity coordinate system (Xg, Yg, Zg), and the two axes perpendicular to the Zg axis and to each other are respectively called the Xg axis and the Yg axis. Furthermore, the angles formed between the Xs axis and the Ys axis, between the Zs axis and the Xg axis, and between the Yg axis and the Zg axis are respectively called $\phi$, $\theta$, and $\psi$.

Figure 11:
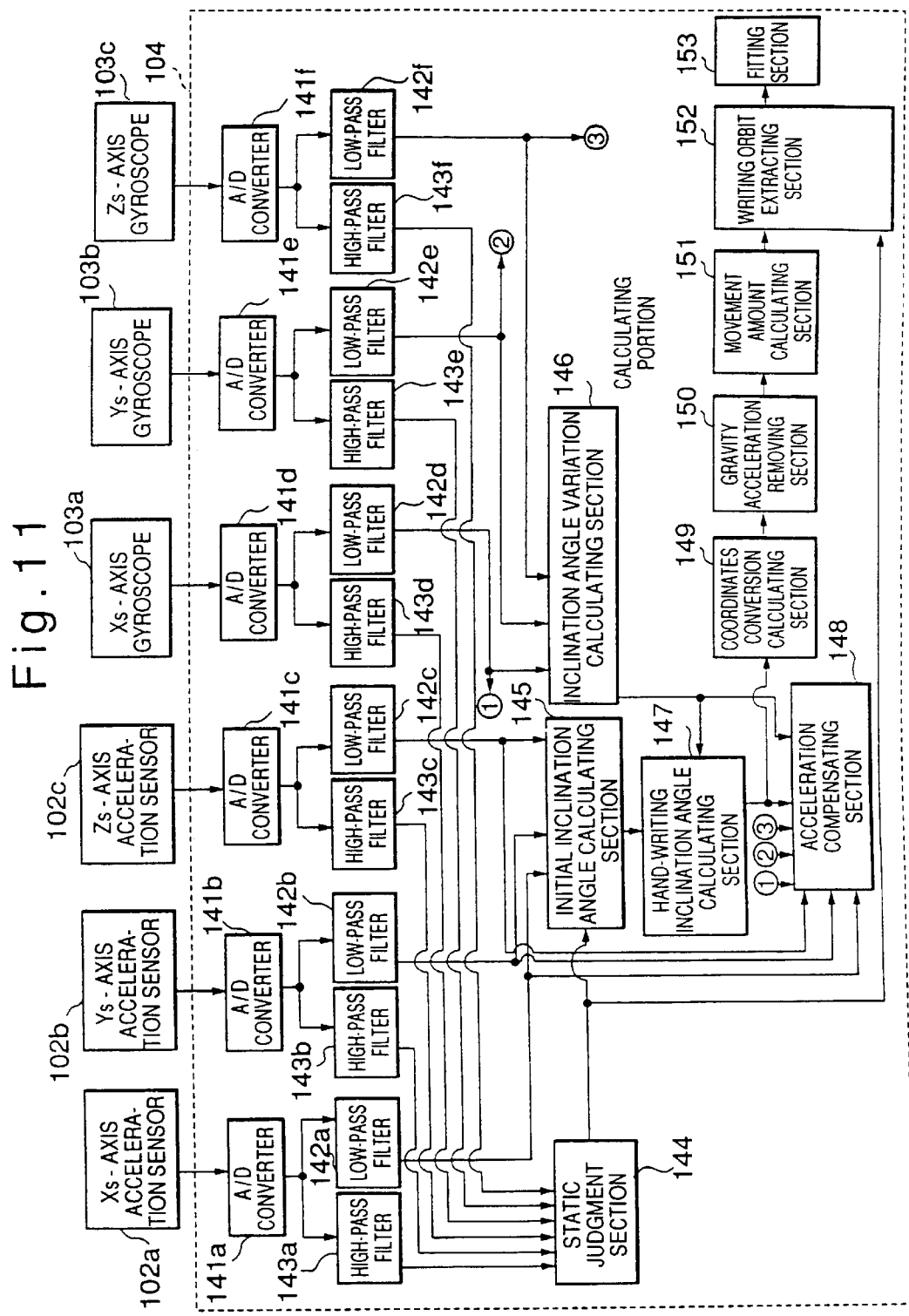
FIG. 11 is a block diagram showing the circuit of an operational calculating section of the second embodiment.

As shown in FIG. 11, the operational calculating section 104 for the second embodiment comprises A/D converters 141a–141f, low-pass filters 142a–142f, high-pass filters 143a–143f, a static (state) judgment section 144, an initial inclination angle calculating section 145, an inclination angle variation calculating section 146, a handwriting inclination angle calculating section 147, an acceleration compensating section 148, a coordinates conversion calculating section 149, a gravity acceleration removing section 150, a movement amount calculating section 151, a handwriting orbit extracting section 152, and a fitting section 153.

The A/D converters 141a–141f convert, respectively, the analog signals from the acceleration sensors 102a, 102b, and 102c and the gyroscopes 103a, 103b, and 103c to digital signals. The low-pass filters 142a–142f intercept the high-frequency component of the signals from the acceleration sensors 102a, 102b, and 102c and from the gyroscopes 103a, 103b, and 103c caused by the frictional force between the pen's tip end 108 and the surface to be handwritten. The high-pass filters 143a–143f extract the high-frequency component of the signals from the acceleration sensors 102a, 102b, and 102c and from the gyroscopes 103a, 103b, and 103c, for instance, at frequencies above the neighborhood of 10 Hz caused by the frictional force.

The static state judgment section 144 judges the beginning of a handwriting operation when any one of the signals from the three acceleration sensors 102a, 102b, and 102c and the three gyroscopes 103a, 103b, and 103c respectively pass through the high-pass filters 143a–143f which contain the high-frequency component, for the first time, and judges the end of a handwriting operation when there are no longer any signals from the three acceleration sensors 102a, 102b, and 102c and the three gyroscopes 103a, 103b, and 103c which pass through the same high-pass filters 143a–143f after some predetermined threshold time period.

Figure 12:
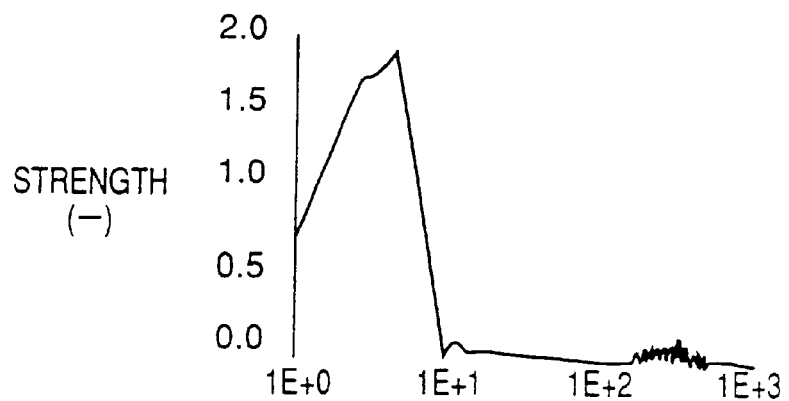
FIG. 12 is a diagram showing a waveform of an acceleration signal.

For instance, the pen's tip end 108 is constructed with the core of the pencil, and the waveform of the acceleration signal when handwriting on the paper occurs is shown in FIG. 12. As shown in FIG. 12, the handwriting acceleration component due to pencil movement appears in the part of comparatively low frequency equal to or lower than the center frequency 10 Hz, while the component caused by the friction between the pen's tip end 108 and the writing surface appears in the part of comparatively high frequency, e.g. 100 Hz, equal to or higher than 10 Hz. In such situation, the high-pass filters 143a–143f respectively extract the components of the frequency above 10 Hz, and the static state judgment section 144 compares the signals thus extracted by the high-pass filters 143a–143f with a previously determined threshold value, and thereby judges whether the pen-shaped input apparatus performs a handwriting operation.

Hereupon, depending on the direction of the handwriting, since a difference appears in the components caused by the pen's tip end 108 and the surface to be handwritten respectively detected by the acceleration sensors 102a, 102b, and 102c and the gyroscopes 103a, 103b, and 103c, the static state judgment section 144 judges the start of handwriting on the basis of the presence of any one of the signals containing the high-frequency component for the first time, and the same judges the end of handwriting when the last of any one of the signals containing the high-frequency component is no longer present for a threshold period.

The initial inclination angle calculating section 145 calculates the initial values $\phi_0 \theta_0$, and $\psi_0$ of the inclination angle in the gravity coordinate system (Xg, Yg, Zg) of the pen shaft 107 on the basis of the accelerations in the pen shaft coordinate system (Xs, Ys, Zs) detected by the three acceleration sensors 102a, 102b, and 102c in a state of non-handwriting.

The inclination angle variation calculating section 146 calculates the variations $\Delta\phi$, $\Delta\theta$, and $\Delta\psi$ of the inclination angles in the gravity coordinate system (Xg, Yg, Zg) of the pen shaft 107 on the basis of the rotational angular velocities detected by the three gyroscopes 103a, 103b, and 103c in a state of handwriting.

The handwriting inclination angle calculating section 147 obtains the inclination angles $\phi$, $\theta$, and $\psi$ in the gravity coordinate system (Xg, Yg, Zg) of the pen shaft 108 during the handwriting on the basis of the initial values $\phi_0$, $\theta_0$, and $\psi_0$ of the inclination angles in the gravity coordinate system (Xg, Yg, Zg) of the pen shaft 107 calculated by the initial inclination angle calculating section 145 and the variations $\Delta\phi$, $\Delta\theta$, and $\Delta\psi$ of the inclination angles in the gravity coordinate system (Xg, Yg, Zg) of the pen shaft 107 calculated by the inclination angle variation calculating section 141.

The acceleration compensating section 148 compensates the accelerations on the mounting position of the three acceleration sensors 102a, 102b, and 102c in the pen shaft coordinate system (Xs, Ys, Zs) to the accelerations of the pen's tip end 108 on the basis of the mounting position of the three acceleration sensors 102a, 102b, and 102c, the rotational angular velocities detected by the three gyroscopes 103a, 103b, and 103c, the inclination angle variation of the pen shaft 107 calculated by the inclination angle variation calculating section 146, and the inclination angle of the pen shaft 107 during handwriting calculated by the handwriting inclination angle calculating section 147.

The coordinates conversion calculating section 149 converts the acceleration in the pen shaft coordinate system (Xs, Ys, Zs) compensated by the acceleration compensating section 148 to the acceleration in the gravity coordinate system (Xg, Yg, Zg) on the basis of the inclination angles $\phi$, $\theta$, and $\psi$ in the gravity coordinates system (Xg, Yg, Zg) of the pen shaft 107 during handwriting detected by the handwriting incination angle calculating section 147.

The gravity acceleration removing section 150 removes the gravity acceleration component from the acceleration converted by the coordinates conversion calculating section 149.

The movement amount calculating section 151 calculates the movement direction and the movement distance of the pen's tip end 108 on the basis of the acceleration, from which the gravity acceleration removing section 150 removes the gravity acceleration component.

The handwriting orbit extracting section 152 extracts the orbit of the pen's tip end 108 from the start of handwriting to the end of handwriting in accordance with the movement direction and the movement distance of the pen's tip end 108 calculated by the movement amount section 151.

The fitting section 153 image-transfers the orbit of the pen's tip end 108 extracted by the handwriting orbit extracting section 152 and stored in the storage section 105 to the surface to be handwritten.

Now, the operational calculation of the calculating section 104 is described hereinafter. Coordinate converting equations for converting the gravity coordinate system (Xg, Yg, Zg) to the pen shaft coordinate system (Xs, Ys, Zs) are as follows:

$$\begin{pmatrix} Xs \\ Ys \\ Zs \end{pmatrix} = E(\phi, \theta, \psi) \begin{pmatrix} Xg \\ Yg \\ Zg \end{pmatrix} \quad (13)$$

$$E(\phi, \theta, \psi) = \begin{pmatrix} a_{11} & a_{12} & a_{13} \\ a_{21} & a_{22} & a_{23} \\ a_{31} & a_{32} & a_{33} \end{pmatrix}$$

$a_{11} = \cos\theta\cos\psi$ $a_{21} = \sin\phi\sin\theta\cos\psi - \cos\phi\sin\psi$ $a_{31} = \cos\phi\sin\theta\cos\psi + \sin\phi\sin\psi$ $a_{12} = \cos\theta\sin\psi$ $a_{22} = \sin\phi\sin\theta\sin\psi + \cos\phi\cos\psi$ $a_{32} = \cos\phi\sin\theta\sin\psi - \sin\phi\cos\psi$ $a_{13} = -\sin\theta$ $a_{23} = \sin\phi\cos\theta$ $a_{33} = \cos\phi\cos\theta$ If the above equation (equation 13) is converted by the coordinates conversion formula from the pen shaft coordinate system (Xs, Ys, Zs) to the gravity coordinate system (Xg, Yg, Zg), the following equation (equation 14) can be obtained.

$$\begin{pmatrix} Xg \\ Yg \\ Zg \end{pmatrix} = E^{-1}(\phi, \theta, \psi) \begin{pmatrix} Xs \\ Ys \\ Zs \end{pmatrix} \quad (14)$$

$$E^{-1}(\phi, \theta, \psi) = \begin{pmatrix} a_{11} & a_{21} & a_{31} \\ a_{12} & a_{22} & a_{32} \\ a_{13} & a_{23} & a_{33} \end{pmatrix}$$

Figure 13:
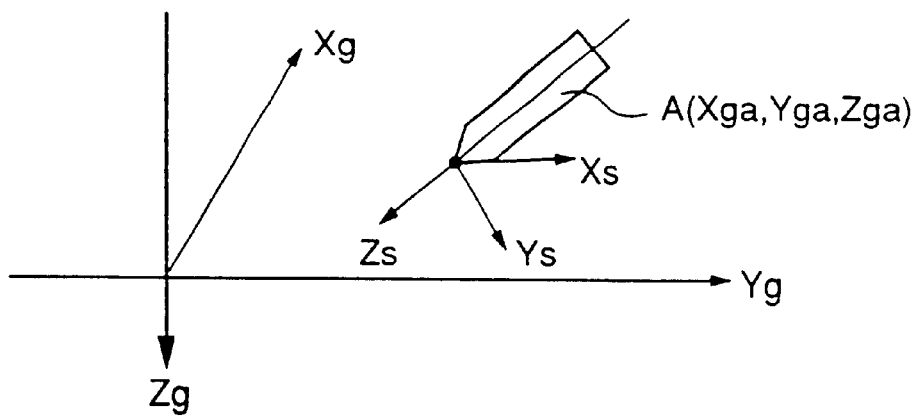
FIG. 13 is a side view of a pen-shaped input apparatus of the second embodiment showing one point on the pen-shaped input apparatus.

Here, the coordinates (Xga, Yga, Zga) in the gravity coordinate system (Xg, Yg, Zg) at a point A shown in FIG. 13 can be expressed by the following equation (equation 15) including the coordinates (Xgo, Ygo, Zgo) in the gravity coordinates system (Xg, Yg, Zg) of the pen's tip end 108, the coordinates (Lx, Ly, Lz) in the pen shaft coordinates system (Xs, Ys, Zs) at the point A,. and the inclination angles $\phi, \theta,$ and $\psi$.

$$\begin{pmatrix} Xga \\ Yga \\ Zga \end{pmatrix} = \begin{pmatrix} Xgo \\ Ygo \\ Zgo \end{pmatrix} + E^{-1}(\phi, \theta, \psi) \begin{pmatrix} Lx \\ Ly \\ Lz \end{pmatrix} \quad (15)$$

The above equation (equation 15) differentiated two times by time represents the accelerations (Axg, Ayg, Azg) in the gravity coordinates system (Xg, Yg, Zg) of the point A (Xga, Yga, Zga). Here, since the inclination angles $\phi, \theta,$ and $\psi$ are also functions of the time, the following equations (equation 16) can be obtained.

$$\begin{pmatrix} Axga \\ Ayga \\ Azga \end{pmatrix} = \begin{pmatrix} \ddot{X}ga \\ \ddot{Y}ga \\ \ddot{Z}ga \end{pmatrix} = \begin{pmatrix} \ddot{X}go \\ \ddot{Y}go \\ \ddot{Z}go \end{pmatrix} + \frac{d^2}{dt^2}(E^{-1})\begin{pmatrix} Lx \\ Ly \\ Lz \end{pmatrix} \quad (16)$$

where $\ddot{X}ga = \frac{d^2}{dt^2}(Xga) \quad \ddot{X}go = \frac{d^2}{dt^2}(Xgo)$ $\ddot{Y}ga = \frac{d^2}{dt^2}(Yga) \quad \ddot{Y}go = \frac{d^2}{dt^2}(Ygo)$ $\ddot{Z}ga = \frac{d^2}{dt^2}(Zga) \quad \ddot{Z}go = \frac{d^2}{dt^2}(Zgo)$ Furthermore, the force of gravity is exerted in the Zg-axis direction in the gravity coordinate system (Xg, Yg, Zg) regardless of the movement of the pen's tip end 108, and then, if the gravity acceleration g is added to the above equation (equation 16), the following equation (equation 17) can be obtained.

$$\begin{pmatrix} Axga \\ Ayga \\ Azga \end{pmatrix} = \begin{pmatrix} \ddot{X}ga \\ \ddot{Y}ga \\ \ddot{Z}ga \end{pmatrix} = \begin{pmatrix} \ddot{X}go \\ \ddot{Y}go \\ \ddot{Z}go \end{pmatrix} + \frac{d^2}{dt^2}(E^{-1})\begin{pmatrix} Lx \\ Ly \\ Lz \end{pmatrix} - \begin{pmatrix} 0 \\ 0 \\ g \end{pmatrix} \quad (17)$$

Assuming that the acceleration sensors 102a, 102b, and 102c are arranged at the point A, the accelerations (Axsa, Aysa, Azsa) detected by the acceleration sensors 102a, 102b, and 102c can be expressed by the following equations (equations 18a, 18b).

$$\begin{pmatrix} Axsa \\ Aysa \\ Azsa \end{pmatrix} = \begin{pmatrix} \ddot{X}sa \\ \ddot{Y}sa \\ \ddot{Z}sa \end{pmatrix} = E(\phi, \theta, \psi)\begin{pmatrix} \ddot{X}ga \\ \ddot{Y}ga \\ \ddot{Z}ga \end{pmatrix} \quad (18a)$$

$$= E\begin{pmatrix} \ddot{X}go \\ \ddot{Y}go \\ \ddot{Z}go \end{pmatrix} + E\frac{d^2}{dt^2}(E^{-1})\begin{pmatrix} Lx \\ Ly \\ Lz \end{pmatrix} - E\begin{pmatrix} 0 \\ 0 \\ g \end{pmatrix} \quad (18b)$$

$\ddot{X}sa = \frac{d^2}{dt^2}(Xsa)$ $\ddot{Y}sa = \frac{d^2}{dt^2}(Ysa)$ $\ddot{Z}sa = \frac{d^2}{dt^2}(Zsa)$ Next, assuming that the acceleration sensors 102a, 102b, and 102c are arranged respectively at the points B, C, and D, and the coordinates in the pen shaft coordinate system (Xs, Ys, Zs) at the points B, C, and D are, respectively, B (Lxx, Lxy, Lxz), C (Lyx, Lyy, Lyz), and D (Lzx, Lzy, Lzz), the second term of the equations 18 is replaced by the following equation (equation 19).

$$E\frac{d^2}{dt^2}(E^{-1}) = \begin{pmatrix} f_{11} & f_{12} & f_{13} \\ f_{21} & f_{22} & f_{23} \\ f_{31} & f_{32} & f_{33} \end{pmatrix} \quad (19)$$

where

-continued $$f_{11} = -\ddot{\theta} - \dot{\psi}^2\cos^2\theta$$

$$f_{12} = 2\dot{\phi}\dot{\theta}\cos\phi + 2\dot{\phi}\dot{\psi}\sin\phi\cos\theta - \frac{\dot{\psi}^2\sin\phi\sin(2\theta)}{2} +$$
$$\ddot{\theta}\sin\phi - \ddot{\psi}\cos\phi\cos\theta$$

$$f_{13} = -2\dot{\phi}\dot{\theta}\sin\phi + 2\dot{\phi}\dot{\psi}\cos\phi\cos\theta - \frac{\dot{\psi}^2\cos\phi\sin(2\theta)}{2} +$$
$$\ddot{\theta}\cos\phi - \ddot{\psi}\sin\phi\cos\theta$$

$$f_{21} = -2\dot{\phi}\dot{\psi}\cos\phi\sin\theta - \frac{\dot{\psi}^2\sin\phi\sin(2\theta)}{2} - \ddot{\theta}\sin\phi + \ddot{\psi}\cos\phi\cos\theta$$

$$f_{22} = -\dot{\phi}^2 + 2\dot{\phi}\dot{\psi}\sin\theta - \dot{\theta}^2\sin^2\phi + \dot{\theta}\dot{\psi}\sin(2\phi)\cos\theta +$$
$$\dot{\psi}^2(\sin^2\phi\cos^2\theta - 1)$$

$$f_{23} = -\frac{\dot{\theta}^2\sin(2\phi)}{2} + 2\dot{\theta}\dot{\psi}\cos^2\phi\cos\theta + \frac{\dot{\psi}^2\sin(2\phi)\sin^2\theta}{2} -$$
$$\ddot{\phi} + \ddot{\psi}\sin\theta$$

$$f_{31} = 2\dot{\theta}\dot{\psi}\sin\phi\sin\theta - \frac{\dot{\psi}^2\cos\phi\sin(2\theta)}{2} - \ddot{\theta}\cos\phi - \ddot{\psi}\sin\phi\cos\theta$$

$$f_{32} = -\frac{\dot{\theta}^2\sin(2\phi)}{2} - 2\dot{\theta}\dot{\psi}\sin^2\phi\cos\theta + \frac{\dot{\psi}^2\sin(2\phi)\cos^2\theta}{2} +$$
$$\ddot{\phi} - \ddot{\psi}\sin\theta$$

$$f_{33} = -\dot{\phi}^2 - \dot{\theta}^2\cos^2\phi + 2\dot{\phi}\dot{\psi}\sin\theta - \dot{\theta}\dot{\psi}\sin(2\phi)\cos\theta +$$
$$\dot{\psi}^2(\cos^2\phi\cos^2\theta - 1)$$

$$\dot{\phi} = \frac{d}{dt}\phi \quad \ddot{\phi} = \frac{d^2}{dt^2}\phi$$
$$\dot{\theta} = \frac{d}{dt}\theta \quad \ddot{\theta} = \frac{d^2}{dt^2}\theta$$
$$\dot{\psi} = \frac{d}{dt}\psi \quad \ddot{\psi} = \frac{d^2}{dt^2}\psi$$

From the above equation (equation 19), the accelerations (Axs, Ays, Azs) detected by the respective acceleration sensors 102a, 102b, and 102c can be expressed by the following equation (equation 20).

$$\begin{pmatrix}Axs\\Ays\\Azs\end{pmatrix} = \begin{pmatrix}Axsa\\Aysb\\Azsc\end{pmatrix} = \begin{pmatrix}\ddot{X}sa\\\ddot{Y}sb\\\ddot{Z}sc\end{pmatrix}$$

$$= E\begin{pmatrix}\ddot{X}so\\\ddot{Y}so\\\ddot{Z}so\end{pmatrix} + \begin{pmatrix}f_{11}Lxx + f_{12}Lxy + f_{13}Lxz\\f_{21}Lyx + f_{22}Lyy + f_{23}Lyz\\f_{31}Lzx + f_{32}Lzy + f_{33}Lzz\end{pmatrix} - E\begin{pmatrix}0\\0\\g\end{pmatrix} \quad (20)$$

The acceleration compensating section 148 performs the operational calculation of the second term of the above equations (equation 20) and compensates the accelerations (Axs, Ays, Azs) detected by the respective acceleration sensors 102a, 102b, and 102c. And further, after the coordinates conversion calculating section 149 performs the coordinates conversion of the compensated acceleration, the gravity acceleration removing section 150 removes the gravity acceleration component, and thereby the acceleration (Axgo, Aygo, Azgo) of the pen's tip end 108 can be obtained.

Here, the accelerations (Axgo, Aygo, Azgo) in the gravity coordinates system (Xg, Yg, Zg) of the pen's tip end 108 can be expressed by the following equation (equation 21) obtained by differentiating two times the movement distances (Xgo, Ygo, Zgo) in the gravity coordinate system (Xg, Yg, Zg).

$$\begin{pmatrix}Axgo\\Aygo\\Azgo\end{pmatrix} = \begin{pmatrix}\ddot{X}go\\\ddot{Y}go\\\ddot{Z}go\end{pmatrix} \quad (21)$$

$$= E^{-1}\left\{\begin{pmatrix}\ddot{X}s\\\ddot{Y}s\\\ddot{Z}s\end{pmatrix} - \begin{pmatrix}f_{11}Lxx + f_{12}Lxy + f_{13}Lxz\\f_{21}Lyx + f_{22}Lyy + f_{23}Lyz\\f_{31}Lzx + f_{32}Lzy + f_{33}Lzz\end{pmatrix}\right\} + \begin{pmatrix}0\\0\\g\end{pmatrix}$$

where $$\ddot{X}s = \frac{d^2}{dt^2}(Xs) \quad \ddot{Y}s = \frac{d^2}{dt^2}(Ys) \quad \ddot{Z}s = \frac{d^2}{dt^2}(Zs)$$

The movement amount calculating section 151 integrates two times the thus calculated accelerations (Axgo, Aygo, Azgo) in the gravity coordinate system (Xg, Yg, Zg) of the pen's tip end 108 and thereby obtains the orbit of the pen's tip end 108.

Next, the initial values ($\phi_0$, $\theta_0$, $\psi_0$) of the inclination angle are explained. Since only the gravity accelerations are exerted in a static state, the accelerations (Axs, Ays, Azs) in the pen shaft coordinate system (Xs, Ys, Zs) can be obtained with the equation of differentiating two times the movement distances (Xs, Ys, Zs). The equation (equation 22) is as follows:

$$\begin{pmatrix}\ddot{X}s\\\ddot{Y}s\\\ddot{Z}s\end{pmatrix} = -E\begin{pmatrix}0\\0\\g\end{pmatrix} = \begin{pmatrix}g\sin\theta0\\-g\cos\theta0\sin\phi0\\-g\cos\theta0\cos\phi0\end{pmatrix} \quad (22)$$

As mentioned above, in a static state, the accelerations (Axs, Ays, Azs) in the pen shaft coordinate system (Xs, Ys, Zs) detected by the acceleration sensors 102a, 102b, and 102c is not affected depending on the mounting position of the acceleration sensor. Here, since three equations can be established for the two unknown figures $\phi_0$ and $\theta_0$, the gravity acceleration g can be also treated as the unknown figure. Furthermore, it is possible also to calculate the value of the gravity acceleration g and judge whether the calculation is good or bad on the basis of the variation of the value calculated adding the function of monitoring. Furthermore, the relationship between the rotational angular velocities (P, Q, R) of the angle axis of the pen shaft coordinates system (Xs, Ys, Zs) and the variation of the inclined angular velocities ($\dot{\phi}$, $\dot{\theta}$, $\dot{\psi}$) can be expressed by the following equations (equations 23a, 23b, 23c):

$$\dot{\phi} = P + Q\sin\phi\tan\theta + R\cos\phi\tan\theta \quad (23a)$$

$$\dot{\theta} = Q\cos\phi - R\sin\psi \quad (23b)$$

$$\dot{\psi} = Q\sin\phi\sec\theta + R\cos\phi\sec\theta \quad (23c)$$

Here, it is possible also to express the accelerations (Axgo, Aygo, Azgo) of the pen's tip end 108 capable of being obtained with the equation of differentiating the movement distances (Xgo, Ygo, Zgo) in the gravity coordinates system (Xg, Yg, Zg) of the pen's tip end 108 by the following equations (equation 24a, 24b).

$$\begin{pmatrix} \ddot{X}go \\ \ddot{Y}go \\ \ddot{Z}go \end{pmatrix} = E^{-1} \begin{pmatrix} \ddot{X}s \\ \ddot{Y}s \\ \ddot{Z}s \end{pmatrix} + \begin{pmatrix} e_{11}Lxx + e_{12}Lxy + e_{13}Lxz \\ e_{21}Lyx + e_{22}Lyy + e_{23}Lyz \\ e_{31}Lzx + e_{32}Lzy + e_{33}Lzz \end{pmatrix} + \begin{pmatrix} 0 \\ 0 \\ g \end{pmatrix} \quad (24a)$$

$$\frac{d^2}{dt^2}(E^{-1}) = \begin{pmatrix} e_{11} & e_{12} & e_{13} \\ e_{21} & e_{22} & e_{23} \\ e_{31} & e_{32} & e_{33} \end{pmatrix} \quad (24b)$$

Figure 14:
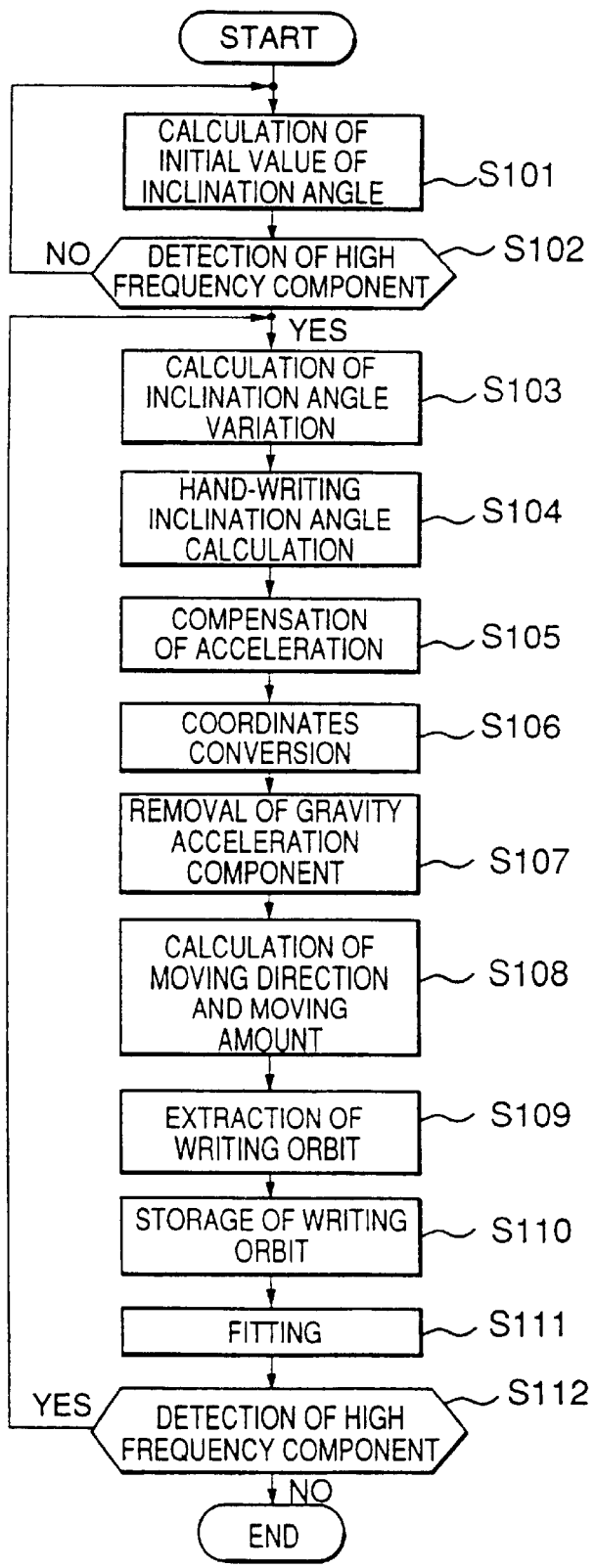
FIG. 14 is a flow chart showing the operation of the pen-shaped input apparatus.

The operation of the pen-shaped input apparatus 101 is explained hereinafter referring to the flow chart in FIG. 14.

The acceleration sensors 102a, 102b, and 102c respectively detect the accelerations in the Xs direction, the Ys direction, and the Zs direction. The high-pass filters 143a–143f extract the high-frequency component above the neighborhood of 10 Hz of the signals from the acceleration sensors 102a, 102b, and 102c and the gyroscopes 103a, 103b, and 103c respectively inputted through the A/D converters 141a–141f. The static state judgment section 144 outputs the signal showing whether the handwriting is being performed on the basis of the signals from the high-pass filters 143a–143f. In such manner, since the high-frequency signals are caused by the frictional force between the pen's tip end 108 and the writing surface, it is easy to precisely detect when handwriting has started by detecting these high-frequency signals and when it has ended by detecting the absence of the high frequency signals for some threshold time period.

The initial inclination angle calculating section 145 inputs the signals from the acceleration sensor 102a of the Xs axis, the acceleration sensor 102b of the Ys axis, and the acceleration sensor 102c when the section 145 does not receive any signal showing that a "handwriting" operation is in effect and calculates the initial values $\phi_0$, $\theta_0$, and $\psi_0$ of the inclination angle in the gravity coordinate system of the pen shaft 107 (Step S101).

When the inclination angle variation calculating section 146 receives the signal showing a "handwriting" operation from the static state judgment section 144 (Step S102), the section 146 calculates the variations $\Delta\phi, \Delta\theta$, and $\Delta\psi$ of the inclination angle in the gravity coordinates system (Xg, Yg, Zg) of the pen shaft 107 on the basis of the rotational angular velocity detected by the three gyroscopes 103a, 103b, and 103c (Step S103).

The handwriting inclination angle calculating section 147, as mentioned above, obtains the inclination angles $(\phi, \theta, \psi)$ of the handwriting pen shaft 107 (Step S104) on the basis of the initial values $\phi_0$, $\theta_0$, and $\psi_0$ of the inclination angle of the pen shaft 107 calculated by the initial inclination angle calculating section 145 and the variations of the inclination angles $(\phi, \theta, \psi)$ of the pen shaft 108 calculated by the inclination angle variation calculating section 145.

The acceleration compensating section 148 compensates the accelerations (Axso, Ayso, Azso) of the pen shaft (Xs, Ys, Zs) detected by the three acceleration sensors 102a, 102b, and 102c to the accelerations (Axso, Ayso, Azso) at the pen's tip end 108 (Step S105) on the basis of the coordinates (Lxx, Lxy, Lxz), (Lyx, Lyy, Lyz), and (Lzx, Lzy, Lzz) of the mounting position of the three acceleration sensors 102a, 102b, and 102c, the variations of the inclination angles $(\phi, \theta, \psi)$ of the pen shaft 7 calculated by the inclination angle variation calculating section 146, and the inclination angles $(\phi, \theta, \psi)$ of the handwriting pen shaft 107 calculated by the handwriting inclination angle calculating section 147.

The coordinates conversion calculating section 149 converts the accelerations (Axso, Ayso, and Azso) compensated by the acceleration compensating section 148 to the accelerations (Axgo, Aygo, Azgo) in the gravity coordinate system (Xg, Yg, Zg) (Step S106) on the basis of the handwriting inclination angles $(\phi, \theta, \psi)$ detected by the handwriting inclination angle calculating section 147.

In such manner, since the mounting position of the acceleration sensors 102a, 102b, and 102c and the influence due to the inclination are compensated, it is possible to detect precisely the acceleration in the gravity coordinate system (Xg, Yg, Zg) at the pen's tip end 108.

The gravity acceleration removing section 150 removes the gravity acceleration component from the accelerations (Axgo, Aygo, Azgo) converted by the coordinates conversion calculating section 149 (Step S107).

The movement amount calculating section 151 calculates the movement direction and the movement distance of the pen's tip end 108 (Step S108) by integrating twice the accelerations (Axgo, Aygo, Azgo) at the pen's tip end 108 after a gravity acceleration component is removed by the gravity acceleration removing section 150.

In such manner, since the integration is performed after compensating the accelerations (Axs, Ays, Azs) detected by the acceleration sensors 102a, 102b, and 102c, it may be possible to reduce the error caused by the result of the integration.

The handwriting orbit extracting section 152 extracts the orbit of the pen's tip end 108 from the start of the handwriting to the end thereof from the movement direction and the movement distance of the pen's tip end 108 calculated by the movement amount calculating section 151 and memorizes the extracted orbit in the storage section 105 (Steps S109, S110).

The fitting section 153 specifies the surface to be handwritten from the orbit of the pen's tip end 108 extracted by the handwriting orbit extracting section 152, for instance, by use of the minimum squaring method, and transfers the image of the orbit of the pen's tip end 108 onto the surface to be handwritten (Step S111).

Figure 15A:
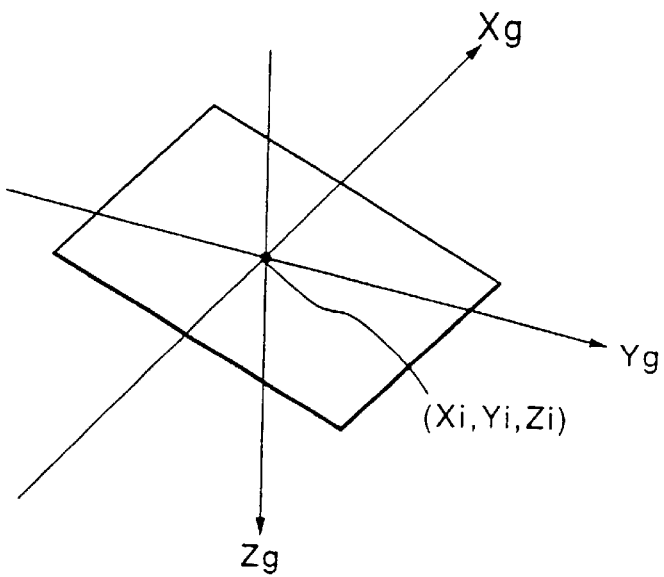
FIG. 15a shows three-dimensional data of the handwriting orbit.
Figure 15B:
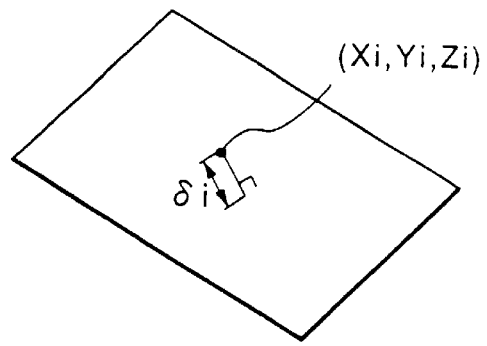
FIG. 15b shows an error thereof.

For instance, if the three-dimensional data (Xi, Yi, Zi) of the handwriting orbit as shown in FIG. 15a are put into the equation; aX+bY+cZ+d=0, an equation; aXi+bYi+cZi+d=$\delta$i can be obtained, and the surface to be handwritten (a, b, c, d) is specified so as to minimize the squaring sum of the error $\Sigma(\delta i)^2$. Here, as shown in FIG. 15b, the error di becomes the shortest distance between the coordinates (Xi, Yi, Zi) and the surface to be handwritten. In such manner, it is possible to input precisely the movement distance on the handwriting surface of the pen's tip end 108 even when the handwriting surface is inclined, by transferring the orbit of the pen's tip end 108 onto the handwriting surface.

The pen-shaped input apparatus 101 repeats the above-mentioned operations (Steps S103–S111) until the static state judgment section 144 does not detect the high-frequency component from the acceleration sensors 102a, 102b, and 102c or the gyroscopes 103a, 103b, and 103c (Step S112)after a threshold period of time, and thereby precisely inputs characters and figures, etc. into a computer or the like.

Moreover, in the above second embodiment, although the coordinates of the acceleration sensors 102a, 102b, and 102c are (Lxx, Lxy, Lxz), in case that the Xs-axis direction acceleration sensor 102a is disposed on the position of Ys=0, Ys-axis direction acceleration sensor 102b is disposed on the position of Xs=0, and the Zs-axis direction acceleration sensor 102c is disposed on the Zs axis, the coordinates of the acceleration sensors 102a, 102b, and 102c become (Lxx, 0, Lxz), (0, Lyy, Lyz), and (0, 0, Lzz).

The accelerations (Axgo, Aygo, Azgo) which can be obtained by differentiating twice the movement distances (Xgo, Ygo, Zgo) in the gravity coordinate system (Xg, Yg, Zg) of the pen's tip end 108 can be expressed by the following equation (equation 25), and it may be possible to reduce the compensation calculating amount of the acceleration detected by the acceleration sensors 102*a*, 102*b*, and 102*c*.

$$\begin{pmatrix} \ddot{X}go \\ \ddot{Y}go \\ \ddot{Z}go \end{pmatrix} = E^{-1} \left\{ \begin{pmatrix} \ddot{X}s \\ \ddot{Y}s \\ \ddot{Z}s \end{pmatrix} - \begin{pmatrix} f_{11}Lxx + f_{13}Lxz \\ f_{22}Lyy + f_{23}Lyz \\ f_{33}Lzz \end{pmatrix} \right\} + \begin{pmatrix} 0 \\ 0 \\ g \end{pmatrix} \quad (25)$$

Here, when the Xs-axis direction acceleration sensor 102*a* is disposed on the position of Xs=0, the Ys-axis direction acceleration sensor 102*b* is disposed on the position of Ys=0, and the Zs-axis direction acceleration sensor 102*c* is disposed on the Zs axis, the coordinates of the acceleration sensors 102*a*, 102*b*, and 102*c* become (0, Lxy, Lxz), (Lyx, 0, Lyz), and (0, 0, Lzz), and the accelerations (Axgo, Aygo, Azgo) which can be obtained with the equation of differentiating twice the movement distances (Xg, Yg, Zg) in the gravity coordinate system (Xg, Yg, Zg) of the pen's tip end 108 can be expressed by the following equation (equation 26):

$$\begin{pmatrix} \ddot{X}go \\ \ddot{Y}go \\ \ddot{Z}go \end{pmatrix} = E^{-1} \left\{ \begin{pmatrix} \ddot{X}s \\ \ddot{Y}s \\ \ddot{Z}s \end{pmatrix} - \begin{pmatrix} f_{12}Lxy + f_{13}Lxz \\ f_{21}Lyx + f_{23}Lyz \\ f_{33}Lzz \end{pmatrix} \right\} + \begin{pmatrix} 0 \\ 0 \\ g \end{pmatrix} \quad (26)$$

And further, if the respective sensors 102*a*, 102*b*, and 102*c* are arranged on the Zs axis, (all of) Lxx, Lxy, Lyx, Lyy, Lzx, and Lzy become 0 (zero). Therefore, the coordinates of the acceleration sensors 102*a*, 102*b*, and 102*c* turn out to be (0, 0, Lxz), (0, 0, Lyz), and (0, 0, Lzz), and the accelerations (Axgo, Aygo, Azgo) which can be obtained with the equation of differentiating twice the movement distance (Xgo, Ygo, Zgo) in the gravity coordinates system (Xg, Yg, Zg) of the pen's tip end 108 can be expressed by the following equation (equation 27), and further it may be possible to reduce the compensation calculating amount of the acceleration.

$$\begin{pmatrix} \ddot{X}go \\ \ddot{Y}go \\ \ddot{Z}go \end{pmatrix} = E^{-1} \left\{ \begin{pmatrix} \ddot{X}s \\ \ddot{Y}s \\ \ddot{Z}s \end{pmatrix} - \begin{pmatrix} f_{13}Lxz \\ f_{23}Lyz \\ f_{33}Lzz \end{pmatrix} \right\} + \begin{pmatrix} 0 \\ 0 \\ g \end{pmatrix} \quad (27)$$

Figures 18, 19:
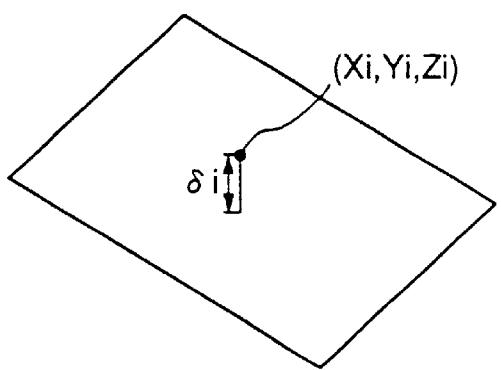
FIG. 18 is an explanatory diagram for explaining an $f_{33}$-component.
FIG. 19 is a perspective view of a handwriting surface where the shortest distance between the pen-shaped input apparatus and the surface to be handwritten is made in the direction of Zg axis.

And further, as shown in FIGS. 16 through 18, since the specified element of the compensation term has a large acceleration component, it may be allowed to calculate the accelerations (Axgo, Aygo, Azgo) in the gravity coordinate system (Xg, Yg, Zg) of the pen's tip end 108 with the following equation (equation 28) by use of only the specified element. Thereby, the time of the calculation can be further shortened.

For instance, Lxx $(d^2\theta/dt^2)$ cos$\phi$ is employed as the compensation element of the Xs-axis direction acceleration, Lyz $\{(d^2\psi/dt^2) \sin(\phi-\theta)\}$ is employed as the compensation element of the Ys-axis direction acceleration, and −Lzz $\{(d\phi/dt)^2+(d\theta/dt)^2 \cos^2\phi\}$ is employed as the compensation element of the Zs-axis direction acceleration.

$$\begin{pmatrix} \ddot{X}go \\ \ddot{Y}go \\ \ddot{Z}go \end{pmatrix} = E^{-1} \left\{ \begin{pmatrix} \ddot{X}s \\ \ddot{Y}s \\ \ddot{Z}s \end{pmatrix} - \begin{pmatrix} Lxz\dot{\theta}\cos\phi \\ Lyz(\ddot{\psi}\sin\theta - \ddot{\phi}) \\ -Lzz(\dot{\phi} + \dot{\theta}^2\cos^2\phi) \end{pmatrix} \right\} + \begin{pmatrix} 0 \\ 0 \\ g \end{pmatrix} \quad (28)$$

Furthermore, in this second embodiment, the fitting section 153 makes shortest the distance between the coordinates (Xi, Yi, Zi) and transfers the image of the orbit of the pen's tip end 108 onto the handwriting surface. However, for instance as shown in FIG. 19, it may be allowed also to make shortest the distance between the coordinates (Xi, Yi, Zi) and the handwriting surface in the Zg-axis direction.

For instance, the equation showing the handwriting surface is $(a_1 X+(b_1)Y+Z+d_1=0$, and the three-dimensional data (Xi, Yi, Zi) of the handwriting orbit are put into (substituted for) the above equation, and thereby an equation; $(a_1)\times(Xi)+(b_1)\times(Yi)+(Zi)+(d_1)=\sigma i$ can be obtained. And then, the handwriting surface $(a_1, b_1, d_1)$ is specified so as to make minimum the squaring sum $\Sigma(\sigma i)^2$ of the above error.

In such manner, the calculating time can be shortened by decreasing the parameter by one. On this occasion, although an error occurs when the handwriting surface is vertical, in the using status of the ordinary pen-shaped input apparatus 101, the handwriting surface is scarcely made vertical.

Furthermore, it may be allowed that the movement amount calculating section 151 calculates only the movement distances in the Xg direction and the Yg direction of the pen's tip end on the basis of the acceleration converted by the coordinates conversion calculating section 149, the handwriting orbit extracting section 102 extracts the orbit of the pen's tip end from the start of handwriting to the end thereof in accordance with the movement distances in the Xg direction and the Yg direction of the pen's tip end 108 calculated by the movement amount calculating section 151, and thereby the influence due to the inclination of the handwriting surface is compensated with a simple structure. On this occasion, it is not necessary to provide the gravity acceleration removing section 150 and the fitting section 153. Furthermore, the calculation time expensed in those sections can be shortened, and further the general calculation time can be largely shortened because it is not necessary to perform the movement amount calculating process in the Zg direction by the movement amount calculating section 151.

As is apparent from the foregoing description, in the second embodiment according to the present invention, since the inclination angle of the handwriting pen shaft is calculated on the basis of the initial value of the inclination angle of the pen shaft and the inclination angle variation of the pen shaft, the accelerations detected by the three acceleration sensors are compensated to the acceleration at the pen's tip end on the basis of the mounting positions of the three acceleration sensors, the inclination angle variation of the pen shaft, and the inclination angle of the handwriting pen shaft, the compensated acceleration in the pen shaft coordinate system is converted to the acceleration in the gravity coordinate system on the basis of the inclination angle of the handwriting pen shaft, and the movement direction and the movement distance of the pen's tip end are calculated on the basis of the converted acceleration, it may be possible to precisely detect the movement direction and the movement distance of the pen's tip end moving on the handwriting surface with a small-sized apparatus.

Furthermore, since the acceleration sensor of the Xs-axis direction is disposed on the position of Ys=0, the acceleration sensor of the Ys-axis direction is disposed on the position of Xs=0, and the acceleration sensor of the Zs-axis direction is disposed on the Zs axis, the calculating process can be simplified and the calculating time can be shortened.

Furthermore, since the respective sensors are arranged on the places near the Zs axis, the calculating amount can be further reduced and thereby the operating time can be shortened.

Furthermore, since the signals from the acceleration sensors and the gyroscopes judge the beginning of handwriting and the end thereof on the basis of the high-frequency component caused by the friction between the pen's tip end and the handwriting surface, the beginning of handwriting and the end thereof can be precisely detected with a simple construction.

Furthermore, since the orbit of the pen's tip end from the start of handwriting to the end thereof is extracted and the extracted orbit image of the pen's tip end is transferred onto the handwriting surface, the influence due to the inclination of the handwriting surface can be compensated.

Furthermore, since the movement distances in the Xg direction and the Yg direction of the pen's tip end from the start of handwriting to the end thereof are extracted, the influence due to the inclination of the handwriting surface can be compensated for a short period of time and with a simple calculating construction.

E. Detailed Description of the Third Embodiment

The pen-shaped input apparatus relating to the third embodiment of the present invention comprises three acceleration sensors, three gyroscopes, and an operational calculating section. The three acceleration sensors respectively detect the accelerations in the Xs-axis direction, Ys-axis direction, and Zs-axis direction of the pen-shaft coordinates system (Xs, Ys, Zs) having a pen shaft as Zs axis. The three gyroscopes respectively detect the rotational angular velocities around the Xs axis, the Ys axis, and the Zs axis. The operational calculating section comprises a handwriting detecting section, an initial rotational angle calculating section, a rotational angle variation calculating section, a handwriting rotational angle calculating section, a coordinates conversion calculating section, and a movement amount calculating section.

The handwriting detecting section detects whether the pen's tip end is brought into contact with the handwriting surface and thereby detects whether the pen-shaped input apparatus is in the handwriting state or in the non-handwriting state.

Furthermore, the initial rotational angle calculating section calculates the initial value of the rotational angle of the pen shaft in the gravity coordinates system (Xg, Yg, Zg) having a shaft extending in the gravity acceleration direction as the Zg axis, on the basis of the acceleration detected by the three acceleration sensors when the handwriting detecting section detects the non-handwriting state.

The rotational angle variation calculating section calculates the variation of the rotational angle in the gravity coordinate system (Xg, Yg, Zg) of the pen shaft, on the basis of the rotational angular velocity detected by the three gyroscopes, when the handwriting section detects the handwriting state.

The handwriting rotational angular velocity calculating section calculates the rotational angle in the gravity coordinate system (Xg, Yg, Zg)of the handwriting pen shaft, on the basis of the initial value of the rotational angle calculated by the initial rotational angle calculating section and the rotational angle variation calculated by the rotational angle variation calculating section.

The coordinate conversion calculating section converts the acceleration in the pen shaft coordinate system (Xs, Ys, Zs) detected by the acceleration sensors to the acceleration in the gravity coordinate system (Xg, Yg, Zg), on the basis of the rotational angle in the gravity coordinate system (Xg, Yg, Zg) of the handwriting calculated by the handwriting rotational angle calculating section.

The movement amount calculating section calculates the movement direction and the movement distance at the pen's tip end, on the basis of the acceleration converted by the coordinates conversion calculating section.

And further, the handwriting detecting section detects whether the pen's tip end is brought into contact with the handwriting surface, on the basis of the high-frequency component of the signals from the three acceleration sensors.

And further, the handwriting detecting section includes a pressure sensor for detecting the stress applied to the pen's tip end from the handwriting surface, and detects whether the pen's tip end contacts the surface by detecting the stress from the handwriting surface by use of the pressure sensor.

Furthermore, the initial rotational angle calculating section performs several times the process of calculating the rotational angle of the pen shaft in the gravity coordinate system (Xg, Yg, Zg), on the basis of the acceleration detected by the three acceleration sensors, when the handwriting detecting section, and the initial rotational angle calculating section obtains the initial value of the rotational angle of the pen shaft when the pen's tip end comes into contact with the handwriting surface, by averaging the result of the calculation. Thereby, the initial value of the rotation of the pen shaft can be calculated precisely.

Furthermore, the initial rotational angle calculating section comprises an acceleration variation amount detecting section, a variation amount comparing section, and an alarming section. The acceleration variation amount detecting section detects the variation amount of the accelerations detected by the three acceleration sensors. The variation amount comparing section compares the variation amount of the acceleration detected by the acceleration variation amount detecting section with a predetermined threshold value. The alarming section outputs an alarm signal when the variation amount of the acceleration detected by the acceleration variation amount detecting section exceeds the predetermined threshold value, and notifies the probability of the occurrence of the error detection to the user.

Furthermore, the above-mentioned initial rotational angle calculating section performs several times the process of calculating the rotational angle of the pen shaft in the gravity coordinate system (Xg, Yg, Zg), on the basis of the accelerations detected by the three acceleration sensors in a state of non-handwriting state excluding the acceleration(s), the variation of which is judged by the variation amount comparing section to exceed the predetermined threshold value, averages the result of the calculation, and obtains the initial value of the rotational angle of the pen shaft when the pen's tip end comes into contact with the handwriting surface by averaging the result of the calculation. In such manner, the occurrence of the detection error due to an abnormal value can be prevented.

The pen-shaped input apparatus of the third embodiment of the present invention can also input characters, symbols, and figures, etc. into a computer or the like. The pen-shaped input apparatus of the third embodiment detects the accelerations in the X-axis direction, the Y-axis direction, and the Z-axis direction of the pen shaft coordinate system having the pen shaft in a state of non-handwriting state as the Z axis, and obtains the initial value of the rotational angle of the pen shaft in the gravity coordinate system at the time of bringing the pen's tip end into contact with the handwriting surface having a shaft extending in the gravity acceleration direction in accordance with the detected acceleration. And further, the pen-shaped input apparatus detects the rotational angular velocities around the X axis, the Y axis, and Z axis in the handwriting pen shaft coordinate system, and calculates the variation of the rotational angle in the gravity coordinate system of the pen shaft. Thereby, the rotational angle in the gravity coordinate system of the handwriting pen shaft is obtained, the acceleration in the pen shaft coordinates system is converted to the acceleration in the gravity coordinates system, and the movement direction and the movement distance can be detected precisely.

The handwriting detecting section includes, for instance, high-pass filters and OR gates. The high-pass filters respectively extract the high-frequency component of the signals from the respective acceleration sensors. The OR gates take logical sum of the high-frequency component of the signals from the respective acceleration sensors transmitted through the respective high-pass filters, and detects the contacting state of the pen's tip end with the handwriting surface in case that any one or more of the accelerations detected by the respective acceleration sensors contain(s) the high-frequency component. This means that the high-frequency component of the signals from the acceleration sensors is sensed to determine when there is a writing based on the signal generated by the action of the friction between the pen's tip end and the handwriting surface.

Figure 20:
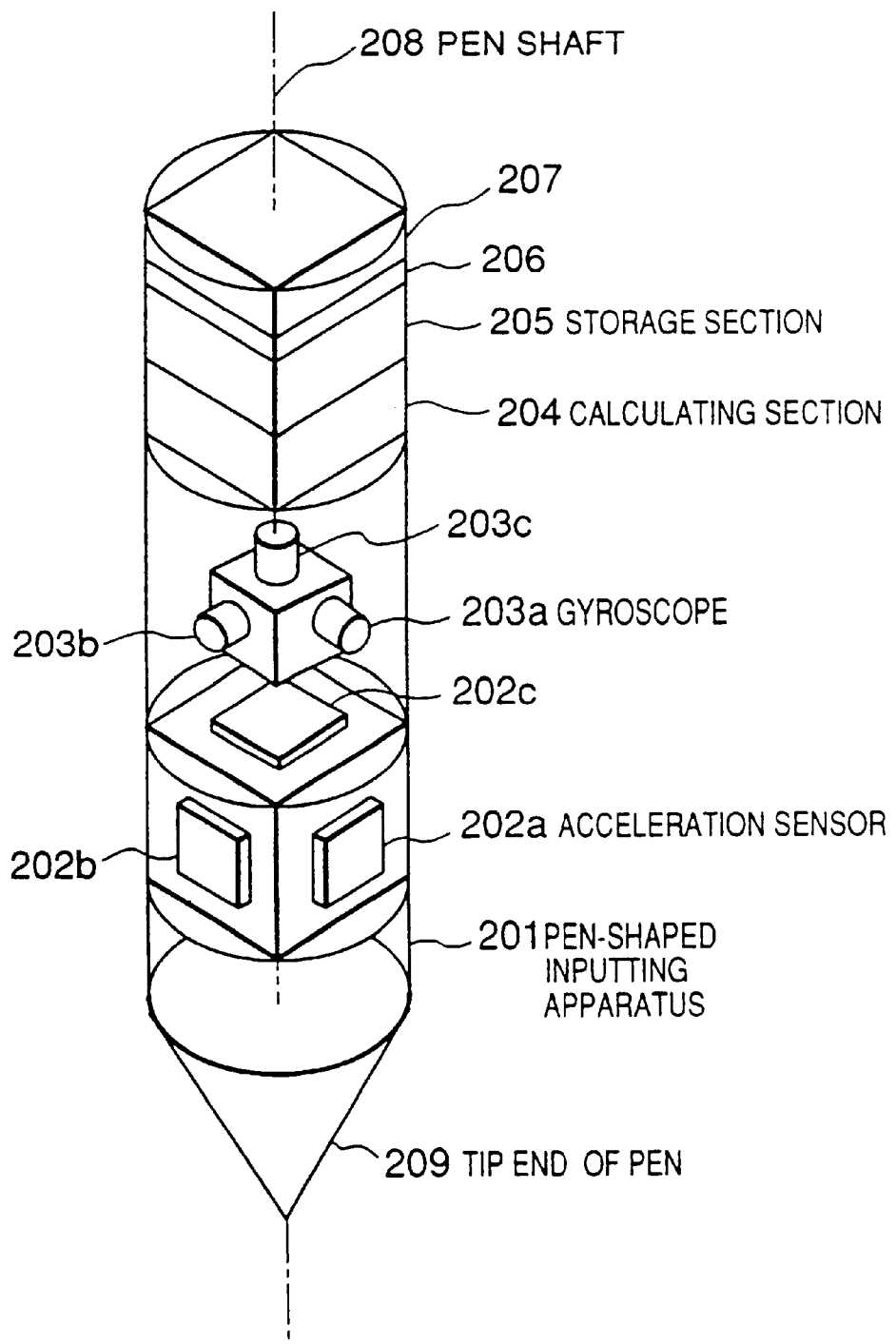
FIG. 20 is a structural view showing a third embodiment according to the present invention.

FIG. 20 is a structural view showing a pen-shaped input apparatus of the third embodiment according to the present invention. As shown in FIG. 20, the pen-shaped input apparatus 201 comprises acceleration sensors 202a, 202b, and 202c, gyroscopes 203a, 203b, and 203c, an operational calculating section 204, a storage section 205, a communicating section 206, and a power supply section 207.

The acceleration sensors 202a, 202b, and 202c are respectively disposed in the Xs-axis direction, the Ys-axis direction, and the Zs-axis direction in case that the pen shaft 208 is the Zs shaft. The Xs axis and the Ys axis intersect perpendicularly to the Zs axis and to each other, and detect the acceleration in the X-axis, Y-axis, and Z-axis directions at the pen's tip end 209. A piezoelectric sensor, an electrostatic capacitance sensor, or a piezo-resistance sensor can be used as the acceleration sensors 202a, 202b, and 202c.

The gyroscopes 203a, 203b, and 203c respectively detect the rotational angular velocity around the Xs axis, the Ys axis, and the Zs axis.

The coordinate system having a pen shaft as the Zs axis is called a "pen shaft coordinate system", and the two axes intersecting perpendicularly to the pen shaft 208 and to each other are explained as the Xs axis and the Ys axis. And further, the coordinate system having an axis extending in the gravity acceleration direction as Zg axis is called a "gravity coordinate system", and the two axes intersecting perpendicularly to Zg axis and to each other are called, respectively, Xg axis and Yg axis. The angles formed between the Xs axis and the Ys axis, between the Zs axis and the Xg axis, and between the Yg axis and the Zg axis are, respectively, $\theta, \phi$ and $\psi$.

Furthermore, in the following description, "inputting" signifies a series of operations of inputting characters, symbols and figures, etc., and includes both the case where the pen's tip end is brought into direct contact with the handwriting surface and the case where the pen's tip end is separated from the handwriting surface. On the other hand, "handwriting" signifies only the former case.

Figure 21:
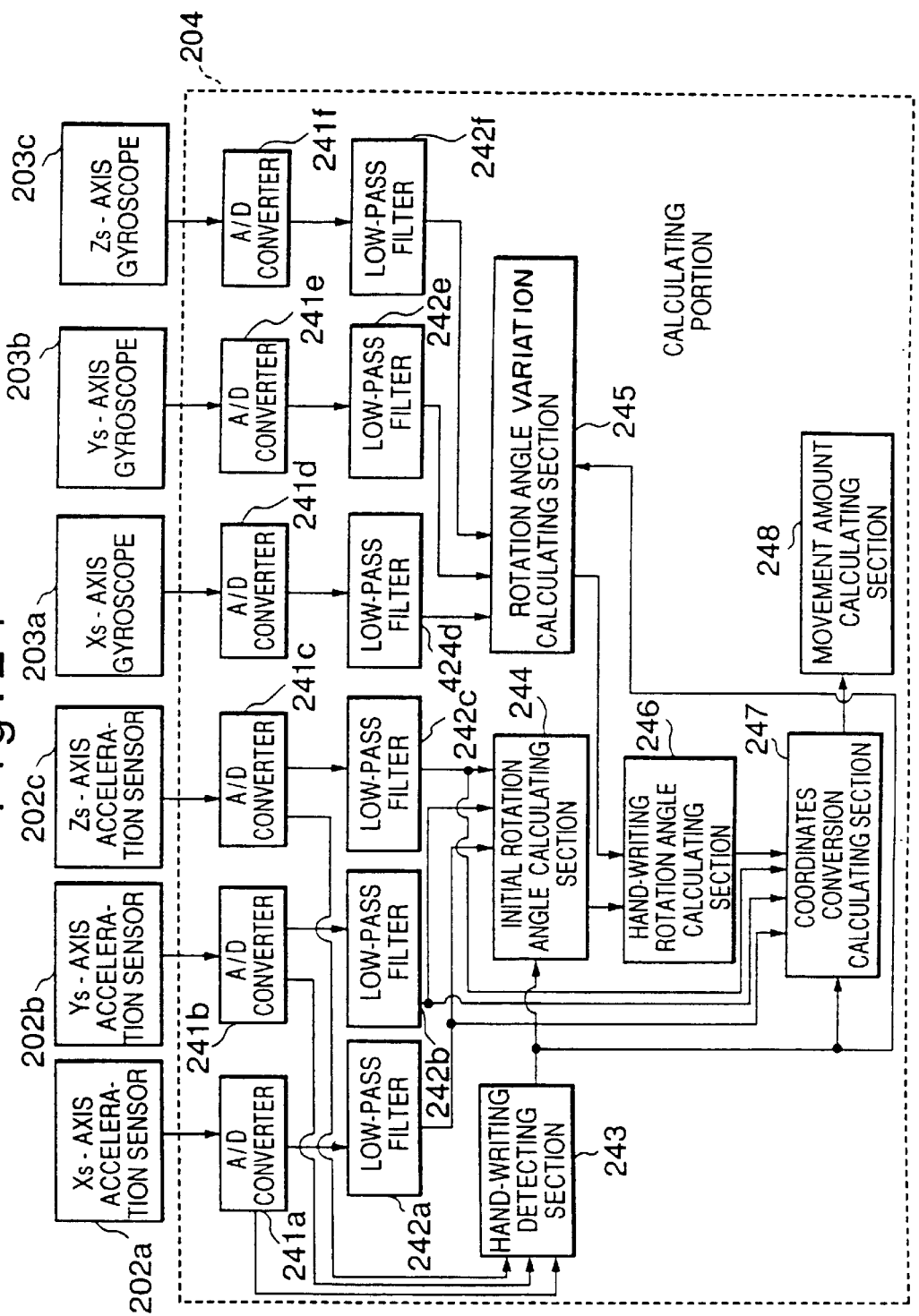
FIG. 21 is a block diagram showing the circuit of an operational calculating section of the third embodiment.

As shown in FIG. 21, the operational calculating section 204 comprises A/D converters 241a–241f, low-pass filters 242a–242f, a handwriting detecting section 243, an initial rotational angle calculating section 244, a rotational angle variation calculating section 245, a handwriting rotational angle calculating section 246, a coordinates conversion calculating section 247, and a movement amount calculating section 248. The A/D converters 241a–241f respectively convert the analog signals from the acceleration sensors 202a, 202b, and 202c and the gyroscopes 203a, 203b, and 203c to digital signals. The low-pass filters 242a–242f intercept the high-frequency component of the signals from the acceleration sensors 202a, 202b, and 202c and the gyroscopes 203a, 203b, and 203c all generated by the action of the frictional force between the pen's tip end 209 and the handwriting surface.

Figure 22:
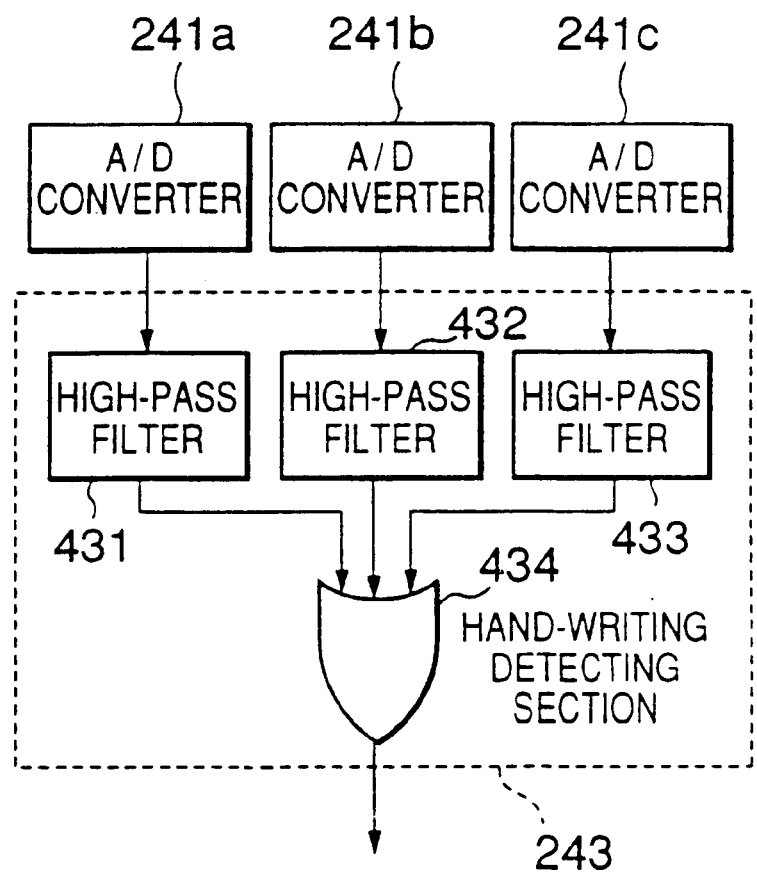
FIG. 22 is a block diagram showing the structure of the handwriting detecting section.

The handwriting detecting section 243 comprises, for instance, as shown in FIG. 22, high-pass filters 431, 432, and 433 and an OR gate 434. The high-pass filters 431, 432, and 433 extract the high-frequency component of the signals from the acceleration sensors 202a, 202b, and 202c generated by the action of the friction, for instance, frequencies above 10 Hz. Here, the high-frequency component of the signals from the acceleration sensors 202a, 202b, and 202c is generated by the action of the friction between the pen's tip end 209 and the handwriting surface, and exceeds the frequency near 10 Hz. Therefore, the signal containing this high-frequency component signifies the state of "handwriting".

The OR gate 434 takes the logical sum of the high-frequency component of the signals from the respective acceleration sensors 202a, 202b, and 202c transmitted through the high-pass filters 431, 432, and 433, and outputs the signal showing the state of "handwriting or not". Here, since the OR gate 434 takes the logical sum of the high-frequency component of the signals from the acceleration sensors 202a, 202b, and 202c, the "High" signal showing the state of "handwriting" is outputted in case that any one or more of the signals from the acceleration sensors 202a, 202b, and 202c contain(s) the high-frequency component.

The initial rotational angle calculating section 244 calculates the initial values $\theta_0, \phi_0$, and $\psi_0$ of the rotational angle in the gravity coordinates system of the pen shaft 209 at the beginning of handwriting, on the basis of the acceleration in the pen shaft coordinates system detected by the three acceleration sensors 202a, 202b, and 202c in a state of non-handwriting.

The rotational angle variation calculating section 245 calculates the rotational angle variations $\Delta\theta, \Delta\phi$, and $\Delta\psi$ in the gravity coordinate system of the pen shaft 209, on the basis of the rotational angular velocity detected by the three gyroscopes 203a, 203b, and 203c in a state of handwriting.

The handwriting rotational angle calculating section 246 obtains the rotational angles $\theta, \phi$, and $\psi$ in the gravity coordinates system of the handwriting pen shaft 209, on the basis of the initial values $\theta_0, \phi_0$, and $\psi_0$ of the rotational angle in the gravity coordinates system of the pen shaft 209 calculated by the initial rotational angle calculating section 204 and the variations $\Delta\theta, \Delta\phi$, and $\Delta\psi$ of the rotational angle in the gravity coordinate system of the pen shaft 209 calculated by the rotational angle variation calculating section 245.

The coordinates conversion calculating section 247 converts the acceleration in the pen shaft coordinates system detected by the acceleration sensors 202a, 202b, and 202c to the acceleration in the gravity coordinate system, on the basis of the rotational angles $\theta, \phi$, and $\psi$ in the gravity coordinate system of the handwriting pen shaft 209 detected by the handwriting rotational angle calculating section 246.

The movement amount calculating section 248 calculates the movement direction and the movement distance of the pen's tip end 209, on the basis of the acceleration in the gravity coordinate system converted by the coordinates conversion calculating section 247, and stores the above calculated values in the storage section 205.

Figure 23:
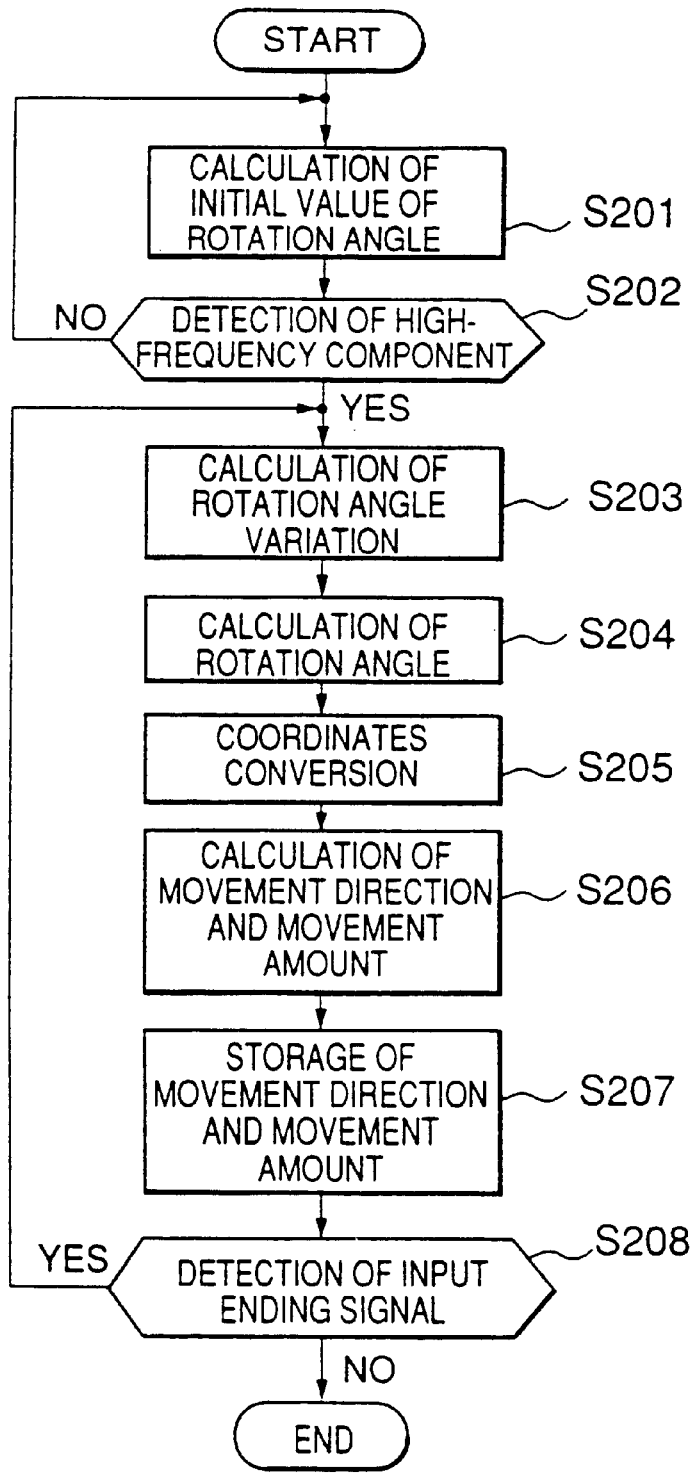
FIG. 23 is a flow chart showing the operation of the pen-shaped input apparatus.

The operation of the pen-shaped input apparatus 201 having the above-mentioned structure is described hereinafter referring to the flow chart shown in FIG. 23.

The acceleration sensors 202a, 202b, and 202c respectively detect the accelerations in the Xs direction, the Ys direction, and the Zs direction in accordance with the movement of the pen's tip end 209.

The handwriting detecting section 243 extracts the high-frequency component of the signals from the acceleration sensors 202a, 202b, and 202c inputted through the A/D converters 241a–241f, for instance, exceeding the frequency near 10 Hz, and outputs the signal showing the state of "handwriting" or "non-handwriting."

Hereupon, in case that the high-frequency component above the frequency near 10 Hz is contained in one or more of the signals from the acceleration sensors 202a, 202b, and 202c, the state is "handwriting". Namely, the high-frequency component of the signals from the acceleration sensors 202a, 202b, and 202c is generated by the action of the frictional force between the pen's tip end 209 and the handwriting surface, and neighbors the frequency near 10 Hz. In such manner, the apparatus detects the high-frequency signal generated by the action of the frictional force between the pen's tip end 209 and the handwriting surface, and judges the state of "handwriting" or "non-handwriting."

When the handwriting detecting section 243 detects the state of non-handwriting, the initial rotational angle calculating section 244 performs the operation of inputting the signals from the acceleration sensor 202a for the Xs axis, the acceleration sensor 202b for the Ys axis, and the acceleration sensor 202c for the Zs axis, and calculates the initial values $\theta_0$, $\phi_0$, and $\psi_0$ of the rotational angle in the gravity coordinate system of the pen shaft 208 at the time of starting the operation of handwriting (Step S201).

Next, a method of calculating the rotational angle is described hereinafter. The conversion from the gravity coordinate system to the pen shaft coordinate system can be performed by use of the following equation (equation 29).

$$\begin{pmatrix} Xs \\ Ys \\ Zs \end{pmatrix} = \begin{pmatrix} as1 & as2 & as3 \\ bs1 & bs2 & bs3 \\ cs1 & cs2 & cs3 \end{pmatrix} \begin{pmatrix} Xg \\ Yg \\ Zg \end{pmatrix} \quad (29)$$

$as1 = \cos\theta\cos\psi$ $as2 = \cos\theta\sin\psi$ $as3 = -\sin\theta$ $bs1 = \sin\phi\sin\theta\cos\psi - \cos\phi\sin\psi$ $bs2 = \sin\phi\sin\theta\sin\psi + \cos\phi\cos\psi$ $bs3 = \sin\phi\cos\theta$ $cs1 = \cos\phi\sin\theta\cos\psi + \sin\phi\sin\psi$ $cs2 = \cos\phi\sin\theta\sin\psi - \sin\phi\cos\psi$ $cs3 = \cos\phi\cos\theta$ If the above equations are transformed to the converting equations from the pen shaft coordinate system to the gravity coordinate system, the following equation (equation 30) can be obtained.

$$\begin{pmatrix} Xg \\ Yg \\ Zg \end{pmatrix} = \begin{pmatrix} ag1 & ag2 & ag3 \\ bg1 & bg2 & bg3 \\ cg1 & cg2 & cg3 \end{pmatrix} \begin{pmatrix} Xs \\ Ys \\ Zs \end{pmatrix} \quad (30)$$

$ag1 = \cos\theta\cos\psi$ $ag2 = \sin\phi\sin\theta\cos\psi - \cos\phi\sin\psi$ $ag3 = \cos\phi\sin\theta\cos\psi + \sin\phi\sin\psi$ $bg1 = \cos\theta\sin\psi$ $bg2 = \sin\phi\sin\theta\sin\psi + \cos\phi\cos\psi$ $bg3 = \cos\phi\sin\theta\sin\psi - \sin\phi\cos\psi$ $cg1 = -\sin\theta$ $cg2 = \sin\phi\cos\theta$ $cg3 = \cos\phi\cos\theta$ The above equations are approximated by the first-order approximation formula, and thereby converting equations of the acceleration vectors can be obtained. Moreover, assume that Axs, Ays, and Azs are respectively the acceleration vectors detected by the acceleration sensors 202a, 202b, and 202c in the pen shaft coordinate system, and Axg, Ayg, and Azg are respectively the acceleration vectors detected by the acceleration sensors 202a, 202b, and 202c in the gravity coordinate system, then the following equations (equations 31a, 31b) apply.

$$\begin{pmatrix} Axs \\ Ays \\ Azs \end{pmatrix} = \begin{pmatrix} as1 & as2 & as3 \\ bs1 & bs2 & bs3 \\ cs1 & cs2 & cs3 \end{pmatrix} \begin{pmatrix} Axg \\ Ayg \\ Azg \end{pmatrix} \quad (31a)$$

$$\begin{pmatrix} Axg \\ Ayg \\ Azg \end{pmatrix} = \begin{pmatrix} ag1 & ag2 & ag3 \\ bg1 & bg2 & bg3 \\ cg1 & cg2 & cg3 \end{pmatrix} \begin{pmatrix} Axs \\ Ays \\ Azs \end{pmatrix} \quad (31b)$$

If the acceleration vectors Axs, Ays, and Azs and the rotational angles $\theta$, $\phi$, and $\psi$ are substituted for the above-mentioned first-order approximation formula, the acceleration vectors Axg, Ayg, and Azg on the handwriting surface can be obtained.

On the other hand, the acceleration in a static state can be expressed by the following equation (equation 32).

$$\begin{pmatrix} Axg \\ Ayg \\ Azg \end{pmatrix} = \begin{pmatrix} 0 \\ 0 \\ -g \end{pmatrix} \quad (32)$$

If the acceleration in this static state is substituted for the afore-mentioned coordinates conversion formula, the rotational angles $\theta_0$ and $\phi_0$ in the gravity coordinate system of the pen shaft 208 in the static state at the time of starting the handwriting can be obtained as mentioned below.

$$\begin{pmatrix} Axs \\ Ays \\ Azs \end{pmatrix} = \begin{pmatrix} (g)\sin(\theta 0) \\ -(g)\cos(\theta 0)\sin(\phi 0) \\ -(g)\cos(\theta 0)\cos(\phi 0) \end{pmatrix} \quad (33)$$

Here, since the rotational angle $\psi_0$ is the angle formed between the Zs axis and the Zg axis, the Xg axis can be taken in the inclination direction of the Xs axis by resetting the rotational angle $\psi_0$ to zero. Or otherwise, it may be allowed also to optionally decide the rotational angle $\psi_0$ in accordance with the method of putting the pen-shaped input apparatus 201 on the handwriting surface and the method of gripping the pen-shaped input apparatus 201.

And further, since three equations can be established for the rotational angles $\theta_0$ and $\phi_0$ in the static state, those angles can be treated also as the unknown figures for the gravity acceleration g, and the absolute values of the rotational angles $\theta_0$ and $\phi_0$ in the static state without defining the value of the gravity acceleration g. Furthermore, the value of g is calculated, and whether the calculation is good or bad is judged in accordance with the variation of the value of this calculated gravity acceleration g. For instance, in case that the calculated value changes largely, it may be allowed also to issue an alarm.

When the handwriting detecting section 243 detects the state of handwriting (Step S202), the rotational angle calculating section 245 calculates the variations $\Delta\theta$, $\Delta\phi$, and $\Delta\psi$ of the rotational angles in the gravity coordinate system of the pen shaft 208, on the basis of the rotational angular velocities calculated by the three gyroscopes 203a, 203b, and 203c (Step S203). Assuming that the rotational angular velocity of the respective axes Xs, Ys, and Zs of the pen shaft coordinates are P, Q, and R, the relationship between the rotational angular velocities P, Q, and R and the rotational angle variations $\Delta\phi$, $\Delta\theta$, and $\Delta\psi$ can be obtained by the following equations (equations 34a, 34b, 34c).

$$\Delta\phi = P + Q\sin\phi\tan\theta + R\cos\phi\tan\theta \qquad (34a)$$

$$\Delta\theta = Q\cos\phi - R\sin\phi \qquad (34b)$$

$$\Delta\psi = Q\sin\phi\sec\theta + R\cos\phi\sec\theta \qquad (34c)$$

The handwriting rotation angle calculating section 246 obtains the rotational angles $\theta$, $\phi$, and $\psi$ of the handwriting pen shaft (Step S204), on the basis of the initial values $\theta_0$, $\phi_0$, and $\psi_0$ of the rotational angle of the pen shaft 208 calculated by the initial angle calculating section 244 and the variations $\Delta\theta$, $\Delta\phi$, and $\Delta\psi$ of the rotational angle of the pen shaft 208 calculated by the rotational angle variation calculating section 245. The coordinates conversion calculating section 247 respectively converts the accelerations Axs, Ays, and Azs in the pen shaft coordinate system detected by the acceleration sensors 202a, 202b, and 202c to the accelerations Axg, Ayg, and Azg in the gravity coordinate system (Step S205), on the basis of the handwriting rotational angle detected by the handwriting rotational angle calculating section 246. Moreover, in order to convert the accelerations Axs, Ays, and Azs in the pen shaft coordinate system to the accelerations Axg, Ayg, and Azg in the gravity coordinate system, the conversion formula already explained before is used.

The movement amount calculating section 248 calculates the movement direction and the movement distance of the pen's tip end 209 (Step S206), on the basis of the acceleration of the pen's tip end 209 converted by the coordinates conversion calculating section 247 (Step S206), and stores the calculated values in the storage section 205 (Step S207). The pen-shaped input apparatus 201 repeats the above-mentioned operations (Steps S203–S207) until detecting the input ending signal, and inputs the figure, etc. (Step S208). In such manner, it may be possible to precisely input the figure, etc., by compensating the influence due to the rotation angle in the gravity coordinate system of the pen-shaped input apparatus. One can also generate the input ending signal on the basis of the acceleration variation. One may also employ the signal from the enable switch, etc.

Figure 24:
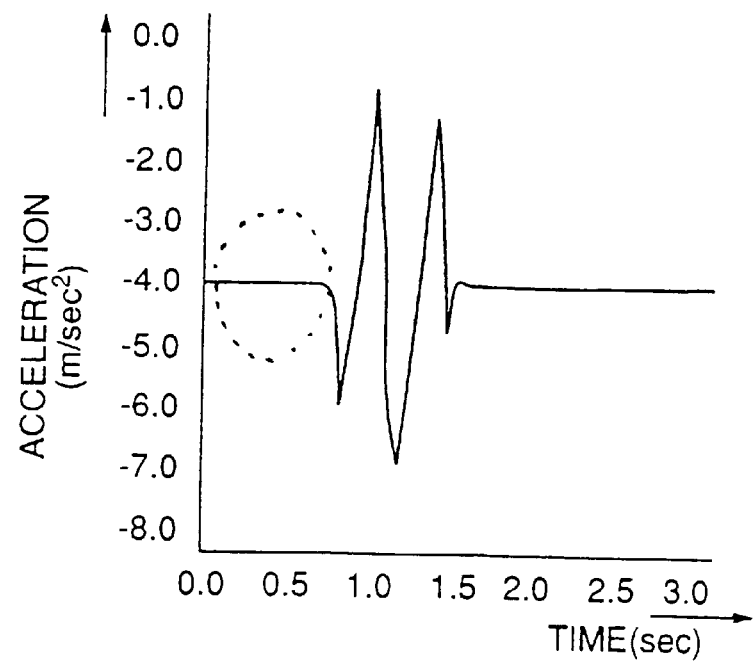
FIG. 24 is a waveform diagram showing the acceleration signal in the case of drawing a circle mark.
Figure 25:
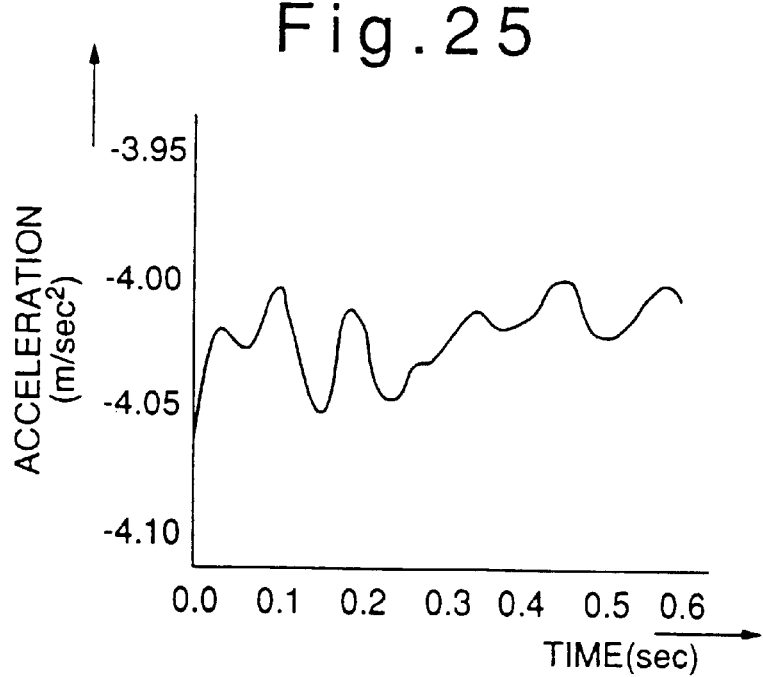
FIG. 25 is a waveform diagram of the acceleration signal in the static state.

Next, taking the case of handwriting in practice into consideration, for instance, the acceleration Axs in the Xs-axis direction is as shown in FIG. 24. Here, the part encircled with a dotted line in FIG. 24 shows the acceleration in an initial state of stopping. If the portion encircled with the dotted line is enlarged, the enlarged portion turns out to be, for instance, as shown in FIG. 25. Namely, the acceleration varies in practice even in the state that the pen's tip end 209 does not move, as shown in FIG. 25.

Figure 26:
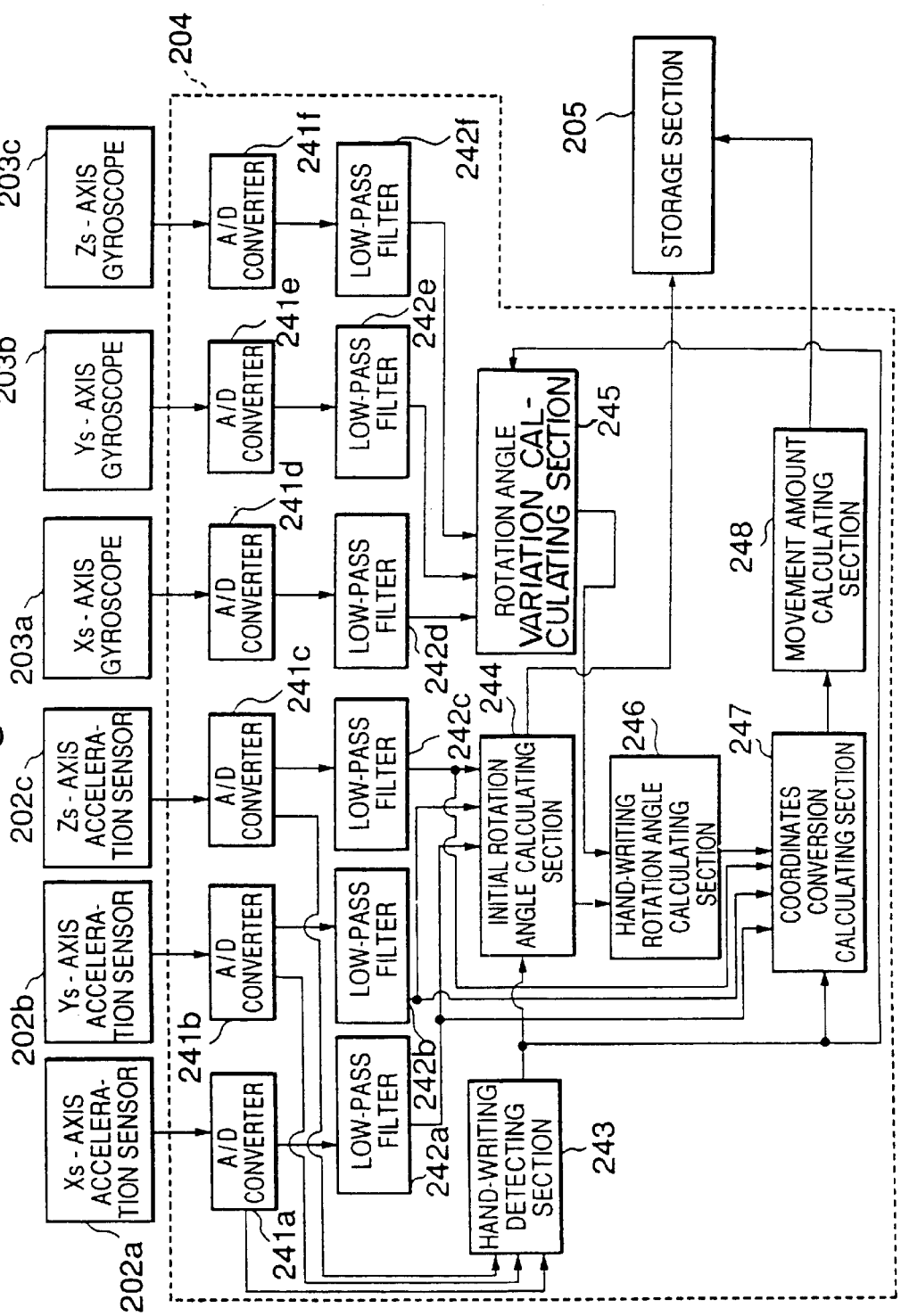
FIG. 26 is a structural view showing an operational calculating section for calculating the initial rotational angle by use of the average value.

This variation of the acceleration is derived from, for instance, the vibration of the hand gripping the pen-shaped input apparatus 201. Consequently, there occur some occasions on which the initial rotational angle is calculated in a state of containing the influence due to the vibration of the hand, etc. For this reason, it may be allowed also that the apparatus is constructed as shown in FIG. 26 for example, and the initial rotational angle calculating section 244a performs several times the calculation of the rotational angle of the pen shaft 208 in the gravity coordinate system (Xg, Yg, and Zg) on the basis of the accelerations detected by the three acceleration sensors 202a, 202b, and 202c in a state of non-handwriting and obtains the initial value of the rotational angle of the pen shaft 208 at the time of the beginning of handwriting by averaging the result of the calculation.

Figure 27:
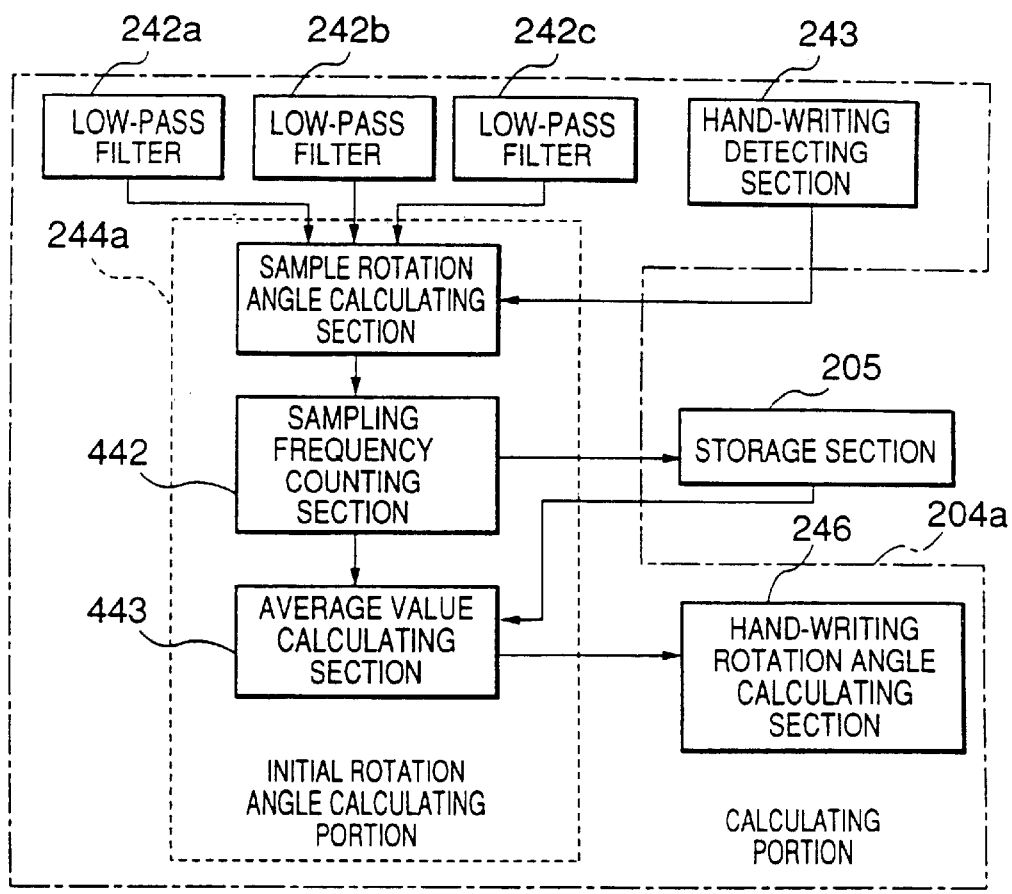
FIG. 27 is a structural view showing an initial rotational angle calculating section for calculating the initial rotational angle by use of the average value.

The initial rotational angle calculating section 244a is provided with, for instance, a sample rotational angle calculating section 441, a sampling frequency counting section 442, and an average value calculating section 443, as shown in FIG. 27.

The sample rotational angle calculating section 441 inputs the signals from the acceleration sensor 202a for the Xs axis, the acceleration sensor 202b for the Ys axis, and the acceleration sensor 202c for the Zs axis when the handwriting detecting section 443 does not input the signal showing the state of handwriting, calculates the rotational angles $\theta_n$, $\phi_n$, and $\psi_n$ in the gravity coordinate system of the pen shaft 208 in a state of non-handwriting, and stores the calculated values in the storage section 205.

The sampling frequency counting section 442 counts the frequency of calculating the rotational angles $\theta_n$, $\phi_n$, and $\psi_n$ by use of the sample rotational angle calculating section 441.

The average value calculating section 443 reads out the rotational angles $\theta_n$, $\phi_n$, and $\psi_n$ calculated by the sample rotational angle calculating section 441 and stored by the storage section 205, when the counting value of the sampling frequency counting section 442 becomes, for instance, three or more, and calculates the average value thereof, and thereby calculates the initial value of the rotational angle of the pen shaft at the time of starting the handwriting.

Figure 28:
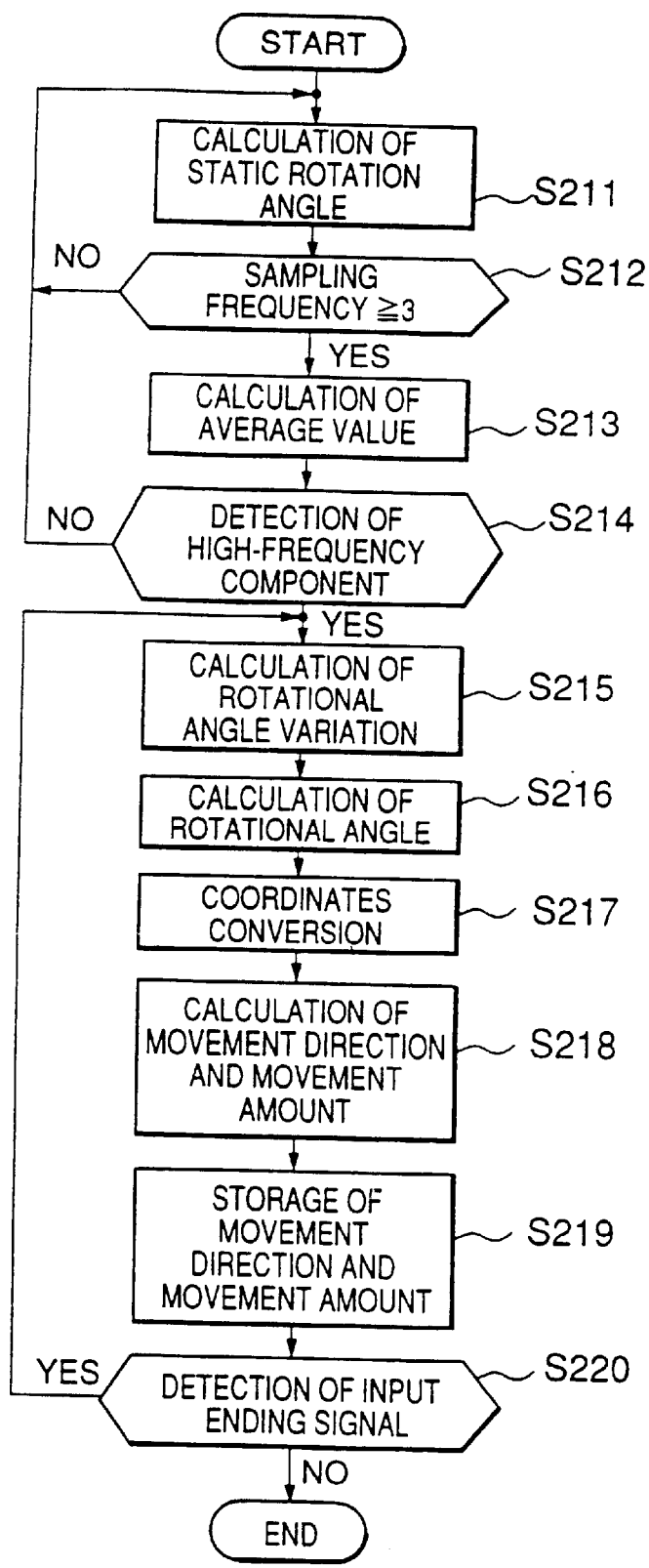
FIG. 28 is a flow chart showing the operation of calculating the initial rotational angle.

The operation of the pen-shaped input apparatus 201a is described hereinafter, referring to the flow chart as shown in FIG. 28.

The initial rotational angle calculating section 244a inputs the signals from the acceleration sensor 202a for the Xs axis, the acceleration sensor 202b for the Ys axis, and the acceleration sensor 202c for the Zs axis when the handwriting detecting section 243 detects the state of non-handwriting, calculates the rotational angles $\theta_a$, $\phi_a$, and $\psi_a$ in the gravity coordinate system of the pen shaft 208 at the time of starting the handwriting in the state of non-handwriting, and stores the calculated values in the storage section 205 (Step S211).

The initial rotational angle calculating section 244a repeats the sampling process, for instance, three or more times and thereby obtains the rotational angles $\theta_a - \theta_n$, $\phi_a - \phi_n$, and $\psi_a - \psi_n$ (Step S212). Thereafter, the same calculates the average values of the obtained rotational angles $\theta_a - \theta_n$, $\phi_a - \phi_n$, and $\psi_a - \psi_n$ and obtains the initial values $\theta_0$, $\phi_0$, and $\psi_0$ of the rotational angle of the pen shaft 208 (Step S213).

In such manner, since the initial values $\theta_0$, $\phi_0$, and $\psi_0$ of the rotational angle of the pen shaft 208 by use of the average value, even in case that one of the plural sampling values, for instance, is affected by the vibration of the hand, etc., the exerted influence thereof can be averaged and made small.

When the rotational angle calculating section 245 has already detected the state of the handwriting by the handwriting detecting section 243 (Step S214), the rotational angle calculating section 245 calculates the variations $\Delta\theta$, $\Delta\phi$, and $\Delta\psi$ of the rotational angle in the gravity coordinate system of the pen shaft 208, on the basis of the rotational angular velocity detected by the three gyroscopes 203a, 203b, and 203c (Step S215).

The handwriting rotational angle calculating section 246 obtains the rotational angles $\theta$, $\phi$, and $\psi$ of the handwriting pen shaft (Step S216), on the basis of the initial values $\theta_0$, $\phi_0$, and $\psi_0$ of the rotational angle of the pen shaft 208 calculated by the initial rotational angle calculating section 244a and the variations $\Delta\theta$, $\Delta\phi$, and $\Delta\psi$ of the rotational angle of the pen shaft 208 calculated by the rotational angle variation calculating section 245.

The coordinates conversion calculating section 247 converts the accelerations Axs, Ays, and Azs of the pen shaft coordinate system detected by the acceleration sensors 202a, 202b, and 202c to the accelerations Axg, Ayg, and Azg in the gravity coordinate system (Step S217), on the basis of the handwriting rotational angle detected by the handwriting rotational angle calculating section 246.

The movement amount calculating section 248 calculates the movement direction and the movement distance of the pen's tip end 209 (Step S218), on the basis of the acceleration of the pen's tip end 209 converted by the coordinates conversion calculating section 247, and stores the calculated values in the storage section 205 (Step S219). The pen-shaped input apparatus 201 repeats the above-mentioned operations (Steps S215–S219) until the input ending signal is detected, and inputs the figure, etc. (Step S220). In such manner, the initial values $\theta_0$, $\phi_0$, and $\psi_0$ of the rotational angle of the pen shaft 208 is calculated precisely, and thereby the figure or the like can be inputted further precisely.

Figure 29:
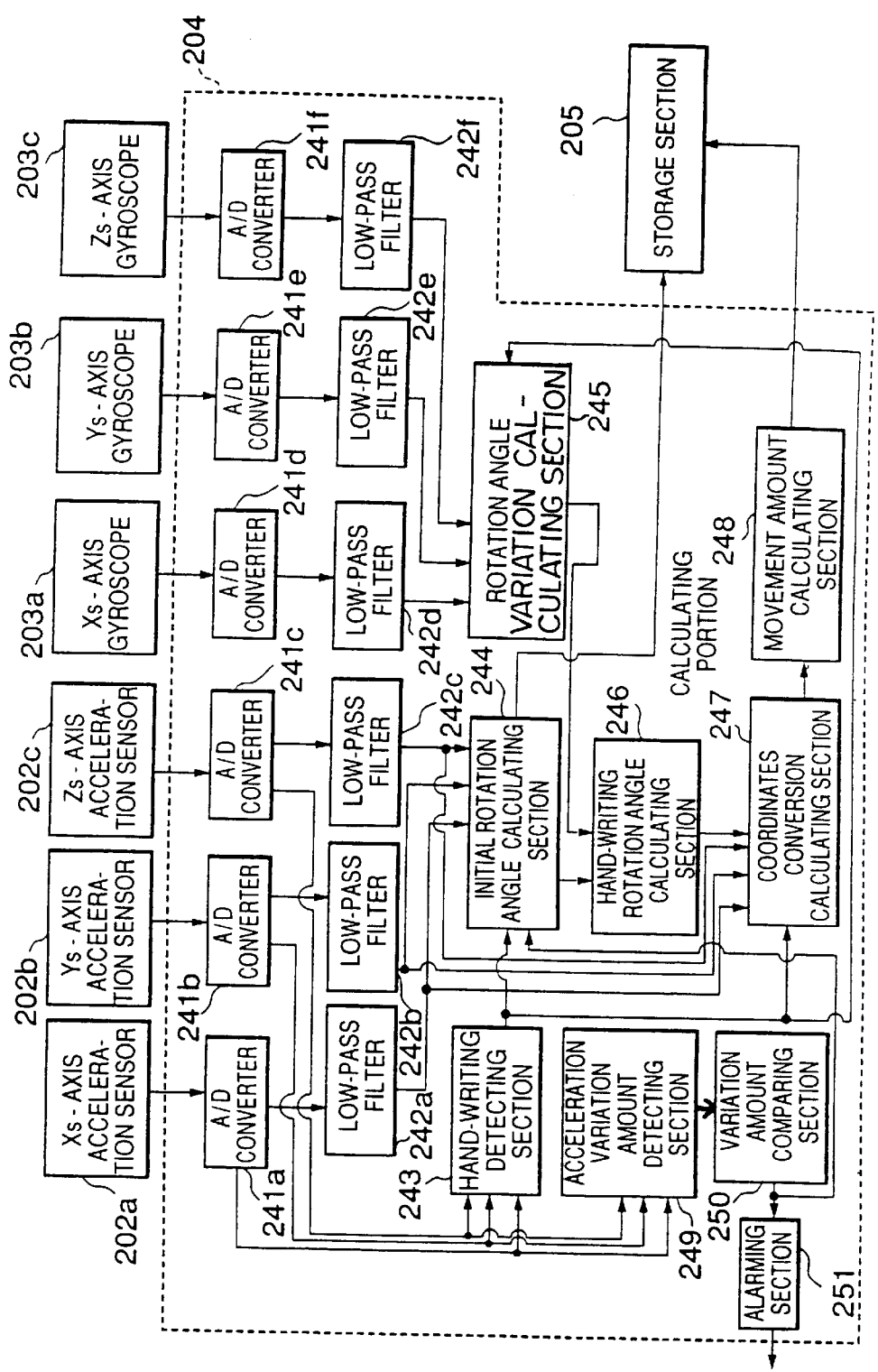
FIG. 29 is a structural view showing an operational calculating section including an alarming section.

Furthermore, it may be allowed also that, in case that the variation value of the acceleration detected by the acceleration sensors 202a, 202b, and 202c exceeds the previously determined threshold value, the acceleration is removed from the accelerations to be sampled and/or the alarm is issued. The example of the construction to implement this feature is shown in FIG. 29.

The acceleration variation amount detecting section 249 respectively detects the variation amounts $(\Delta Axs)/(\Delta t)$, $(\Delta Ays)/(\Delta t)$, and $(\Delta Azs)/(\Delta t)$ of the acceleration Axs in the Xs-axis acceleration, the acceleration Ays in the Ys-axis acceleration, and the acceleration Azs in the Zs-axis acceleration. Here, "t" shows the time.

Figure 30:
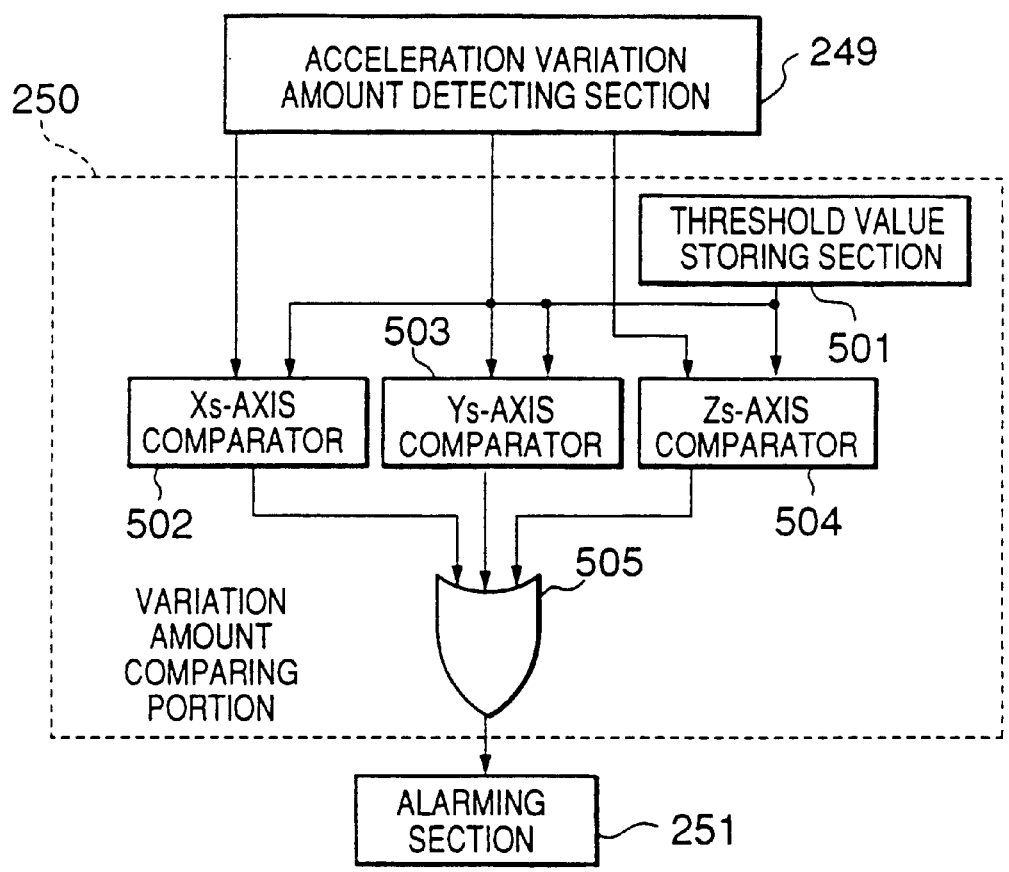
FIG. 30 is a block diagram showing the construction of a variation amount comparing section.
Figure 31:
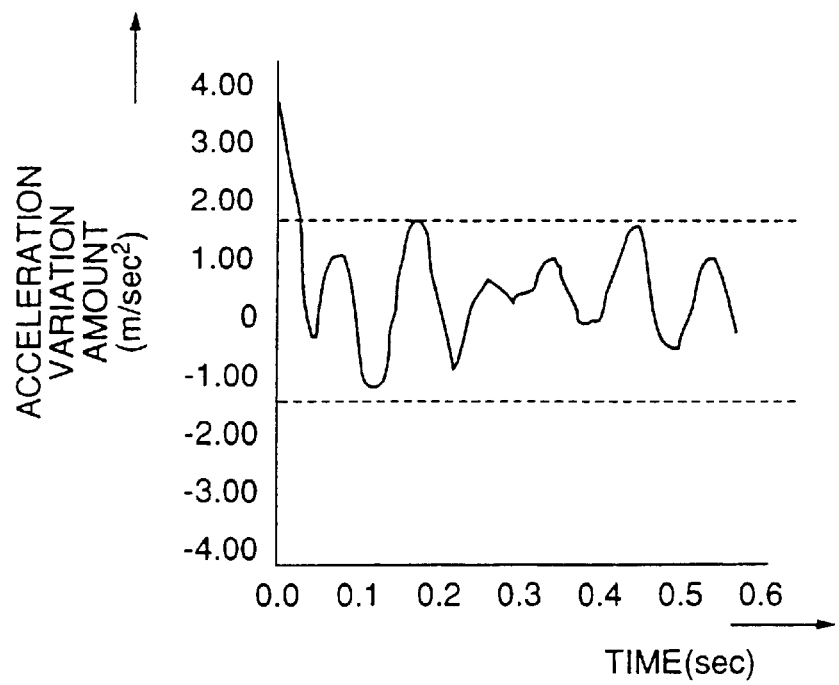
FIG. 31 is a waveform diagram representing the relationship between the variation amount of the acceleration and a threshold value.

The variation amount comparing section 250 comprises, for example, a threshold storing section 501, an Xs-axis comparator, a Ys-axis comparator, a Zs-axis comparator, and an OR gate, as shown in FIG. 30. The threshold storing section 501 stores the previously determined threshold value. The Xs-axis comparator, the Ys-axis comparator, and the Zs-axis comparator compare the respective variation values of the accelerations Axs, Ays, and Azs detected by the acceleration variation amount detecting section 249 with the respective threshold values stored in the threshold storing section 501. The OR gate 505 may be allowed to issue the alarm signal through the alarming section 251, in case that either one or more of the variation amounts of the accelerations Axs, Ays, and Azs exceed(s) the previously determined threshold value(s). For instance,. as shown by the dotted line in FIG. 31, the threshold values are set at $+1.5$ (m/sec$^3$) and at $-1.5$ (m/sec$^3$), and the alarm signal is issued through the alarming section 251 in case that the variation amount $(\Delta A)/(\Delta t)$ of the acceleration A becomes $+1.5$ (m/sec$^3$) or more or in case that the same becomes $-1.5$ (m/sec$^3$) or less. Thereby, the user can know the occurrence of the input error. The above threshold value may be stored in the storage section 205 or it may be stored in the host apparatus. Furthermore, the alarm output from the alarming section 251 is transmitted to the host apparatus through the communicating section 207 and causes the host apparatus to display the error. Or, a lamp is provided on the pen-shaped input apparatus 201c and the error display is performed by lighting the lamp. Alternatively, the error occurrence is notified by use of a buzzer.

Furthermore, when the variation amounts of the accelerations Axs, Ays, and Azs are large, the variation amount comparing section 250 removes the acceleration(s) of large variation amount from the data to be calculated (for the movement amount) and continues the input processing. For instance, in case that the variation amount $(\Delta A)/(\Delta t)$ becomes $+1.5$ (m/sec$^3$) or more or in case that the same becomes $-1.5$ (m/sec$^3$) or less, the variation amount comparing section 250 notifies the above matter to the initial rotational angle calculating section 244b.

During the time period when the initial rotational angle calculating section 244b receives the notification of too large acceleration variation from the variation amount comparing section 250, the section 244b reads off (does not read) the acceleration detected by the acceleration sensors 202a, 202b, and 202c and removes the acceleration at the time of the abnormal input occurrence from the data to be calculated (for the initial rotational angle). Consequently, the movement direction and the movement distance of the pen's tip end 209 can be calculated further precisely.

Figure 32:
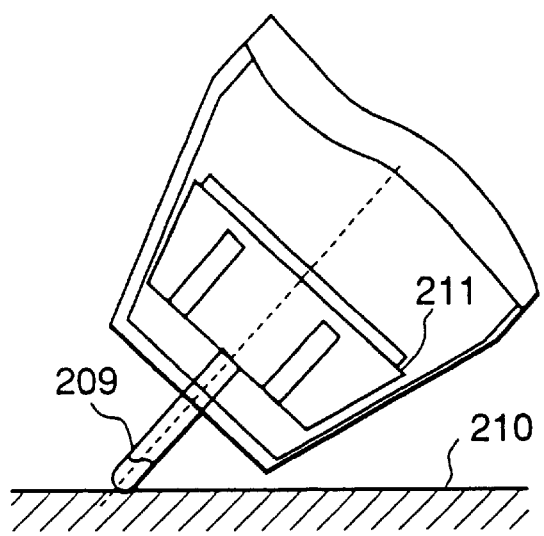
FIG. 32 is a structural view showing the pen-shaped input apparatus including a pressure sensor.

Moreover, although the handwriting detecting section 243 detects the state of handwriting or not on the basis of the accelerations Axs, Ays, and Azs detected by the acceleration sensors 202a, 202b, and 202c in the above-mentioned embodiment, a pressure sensor 211 may be used for detecting the pressure applied to the pen's tip end 209 from the handwriting surface 210 as shown in FIG. 32, or a signal for showing the state of handwriting or not from the enable switch, etc. is input.

And further, although the acceleration detected by the acceleration sensors 202a, 202b, and 202c is read off during the time period when the initial rotational angle calculating section receives the notification of too large an acceleration variation from the variation amount comparing section 250 in the above embodiment, the accelerations from the low-pass filters 242a–242c may be input to the initial rotational angle calculating section 244a through the acceleration abnormal value removing section, and the acceleration abnormal value removing section transmits the acceleration in the range determined by the (two) threshold values and outputs the transmitted acceleration to the initial rotational angle calculating section 244a.

Moreover, the sampling data of the static state rotational angle calculated by the initial rotational angle calculated by the initial rotational angle calculating section 244b and stored in the storage section 205 may be erased.

Furthermore, an element such as LED, etc. may be employed for displaying the time period when the initial rotational angle calculating 244 is calculating the initial rotational angle.

Finally, as an additional explanation, the output of the acceleration sensor at the time of performing the handwriting in practice is described hereinafter in more detail.

Figure 33A:
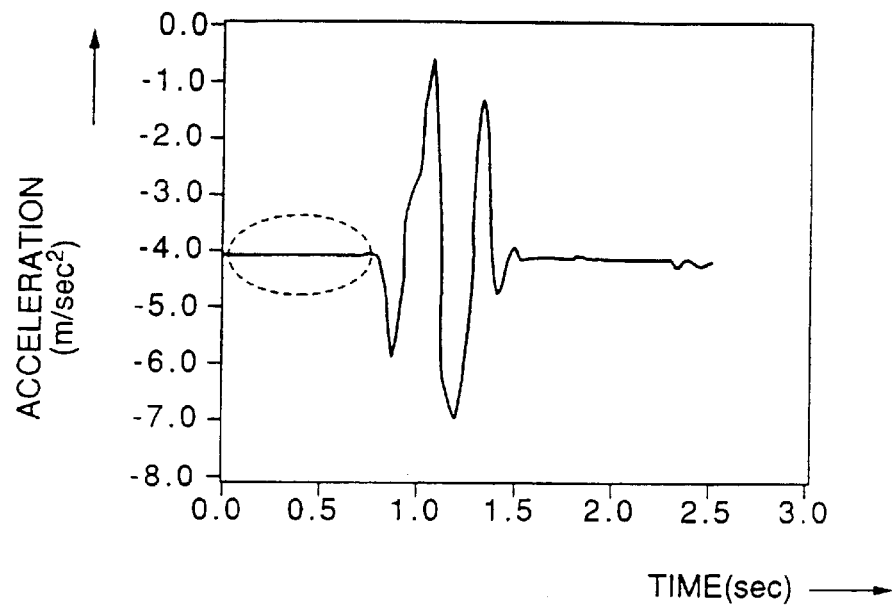
FIG. 33a is a graph showing the variation thereof in a wide range.

FIG. 33a shows the acceleration waveform in the X direction in the case of handwriting the mark "Aõ" by use of the pen-shaped input apparatus. The area encircled with the dotted line represents the acceleration data at the initial static time. Noticing this area, an enlarged waveform is shown in FIG. 33b.

Figure 33B:
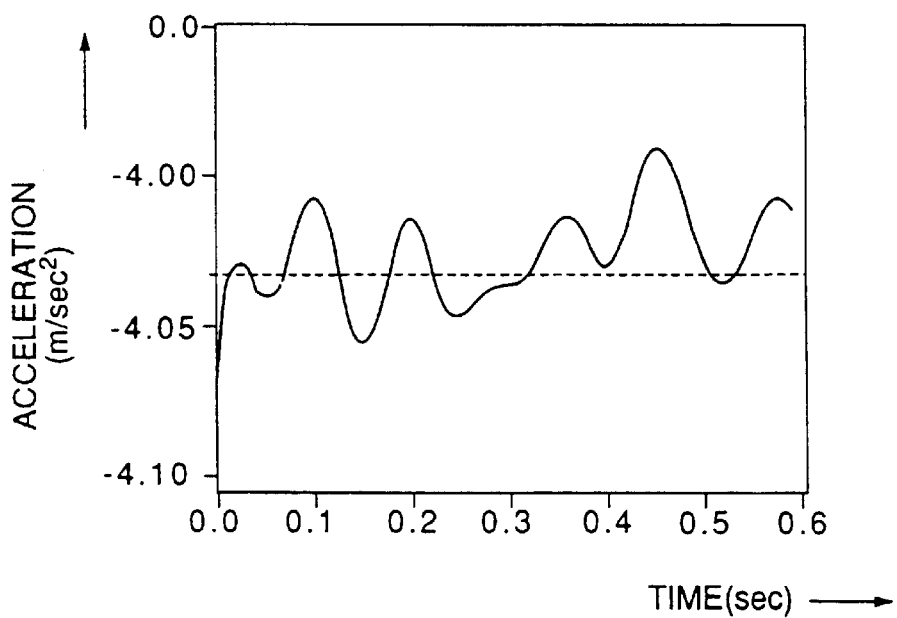

Practically, as shown in FIG. 33b, a variation can be found in the area assumed as the static state. It seems that the above variation is caused, for instance, by the vibration of the hand gripping the pen-shaped input apparatus, or the like. There is a probability that, when the acceleration at an optional one point is taken, the inclination amount in the gravity coordinate system of the pen shaft is obtained on the assumption of the static state, the obtained value becomes the amount including the acceleration caused by the vibration of the hand, etc. Therefore, it causes an error, or undesirably creates a factor for worsening the reproducing property.

In order to solve such defect, the average value of more than at least a certain value (for instance, three) as shown by the dotted line in FIG. 33b is used. Since the frequency of the handwriting acceleration (the acceleration caused by the pen's movement at the time of handwriting) is several Hz as shown in FIG. 33a and FIG. 33b, for instance, the frequency of the acceleration variation caused by the vibration of the hand, etc. is almost 10 Hz, it is difficult to separate such unfavorable component by means of filtering or the like. For this reason, this problem can be solved easily and very efficiently by use of the averaging process. In such method and structure as mentioned above, it is possible to obtain the inclination value in the gravity coordinate system of the pen shaft without being affected by the vibration of the hand or the like.

As is apparent from the foregoing description, since this third embodiment calculates the initial value of the rotational angle of the pen shaft at the beginning of handwriting in the gravity coordinate system, on the basis of the acceleration in the pen shaft coordinate system when the signal showing the non-handwriting state is input, the initial value of the rotational angle of the pen shaft can be obtained precisely and the operation thereof can be done simply.

Furthermore, since the variation of the rotational angle in the pen shaft gravity coordinate system is calculated on the basis of the rotational angular velocity of the pen shaft at the time of inputting the signal showing the state of handwriting, the rotational angle in the gravity coordinate system of the handwriting pen shaft on the basis of the initial value of the rotational angle and the variation of the rotational angle, the acceleration in the pen shaft coordinate system of the pen's tip end is converted to the acceleration in the gravity coordinate system on the basis of the calculated rotational angle in the gravity coordinate system of the handwriting pen shaft, and the movement direction and the movement distance of the pen's tip end on the basis of the converted acceleration, characters, symbols, figures, etc. can be input precisely with a small-sized apparatus.

And further, since whether the pen's tip end is brought into contact with the handwriting surface is judged on the basis of the high-frequency component of the signals from the three acceleration sensors, the beginning of handwriting can be judged precisely.

And further, since the stress applied to the pen's tip end from the handwriting surface is detected and thereby whether the pen's tip end is brought into contact with the handwriting surface is judged, the start of handwriting can be judged even more precisely.

Furthermore, since the calculating treatment of the rotational angle of the pen shaft in the gravity coordinate system is performed several times, and the initial value of the rotational angle of the pen shaft is obtained by averaging the result of the above calculation, the initial value of the rotational angle of the pen shaft can be calculated even more precisely.

Furthermore, since the variation value of the acceleration in the pen shaft coordinate system of the pen's tip end is detected, the detected variation value of the acceleration is compared with the previously determined threshold value, and an alarm signal is issued when the detected variation value of the acceleration exceeds the predetermined threshold value and the variation amount comparing section judges the above state, the possibility of the above error detection occurrence can be notified to the user.

Furthermore, since the acceleration of the large variation value is removed and the initial value of the rotational value of the pen shaft is calculated on the above condition, the movement direction and the movement distance of the pen's tip end can be calculated precisely even where an abnormal input may occur.

The various functional blocks (sections) described above may be implemented in computer hardware or software. When implemented in software a computer processor such as a microprocessor is programmed to carry out the structural functions and operational steps described herein. The software may be stored on a suitable recording medium, e.g. CD ROM, floppy disk, hard drive, etc. and may also be transmitted over a network for downloading and storage and later operation in a computer processor.

What is claimed is:

1. A method for determining the movement of a pen-shaped input device comprising the steps of:
   (a) detecting, with three acceleration sensors, the acceleration of said input device in the x-axis, y-axis and z-axis direction in an input device coordinate system where an axis of the input device is the Z axis,
   (b) detecting, with three gyroscopes, the respective angular velocity around the x-axis, y-axis and z-axis,
   (c) detecting whether said input device is in a writing state;
   (d) calculating an initial value of an inclination angle of said input device in a gravity coordinate system, having a Z axis extending in a gravity acceleration direction, when said input device is not in a writing state, using the outputs of said acceleration sensors,
   (e) calculating a variation in the inclination angle in the gravity coordinate system using the outputs from the three gyroscopes when the input device is in a writing state,
   (f) calculating an inclination angle of the input device in the gravity coordinate system using the calculated initial value of the inclination angle and the calculated inclination angle variation,
   (g) converting acceleration in the input device coordinate system to acceleration in the gravity coordinate system using the inclination angle in the gravity coordinate system calculated in step (f),
   (h) calculating the movement direction and movement distance of a tip end of said input device using the acceleration converted in step (g).

2. The method of claim 1, further comprising the step of:
   (i) compensating the movement distance of said tip end as calculated in step (h) to the movement distance on a writing surface using an inclination formed between said writing surface and said gravity coordinate system.

3. A method as in claim 1, further comprising the steps of:
(i) filtering the output signals from said acceleration sensors and gyroscopes to pass signals having a frequency component associated with a writing operation using said input device; and
(j) determining when said input device begins or ends a writing operation based on the presence or absence of filtered signals having said frequency component.

4. A method as in claim 1, further comprising the step of:
(i) calculating the value of an acceleration variation caused by the inclination angle variation using the variation of the inclination angle in the gravity coordinate system of said input device as detected by the calculation of the inclination angle variation and the mounting locations of said acceleration sensors and
(j) compensating the acceleration output based on the calculated value of acceleration variation,
(k) in the acceleration conversion of step (g). performing acceleration conversion with the compensated acceleration outputs from step (j).

5. A method as in claim 4 wherein step (i) further comprises:
(l) calculating the centrifugal force caused by the inclination angle variation on the basis of the variation velocity of the inclination angle in the gravity coordinate system, said step (i) acceleration variation being calculated on the basis of the calculated centrifugal force.

6. A method as in claim 1, further comprising the step of:
(i) compensating for the difference between the coordinates of said acceleration sensors on said writing surface and the coordinates of the tip end on the basis of the inclination angle in the gravity coordinate system and the mounting position of the acceleration sensors.

7. A method for determining the movement of a tip of a pen-shaped input device comprising the steps of:
(a) detecting an inclination angle of said input device in a coordinate system which has a writing surface as a reference surface;
(b) detecting with three acceleration sensors the acceleration of said input device in an input device coordinate system which has an axis of said input device as the Z axis, the detected acceleration being in the X-axis, Y-axis and Z-axis directions,
(c) converting acceleration in the input device coordinate system detected by the acceleration sensors into acceleration in the coordinate system which has the writing surface as a reference surface, using the inclination angle detected in step (a), and
(d) calculating a movement direction and movement distance at said tip end using the acceleration as converted in step (c).

8. A method for determining the movement of a tip end of a pen-shaped input device comprising the steps of:
(a) detecting, with acceleration sensors, acceleration of said input device in the Xs axis, Ys axis, and Zs axis directions in an input device coordinate system having a longitudinal axis of the input device as the Zs axis,
(b) detecting, with three gyroscopes, the rotational angular velocities of said input device around the Xs, Ys and Zs axes,
(c) calculating an initial value of an inclination angle of said input device in a gravity coordinate system having Xg, Yg and Zg axes, with the Zg axis being oriented in the gravity acceleration direction, using the acceleration detected by said acceleration sensors when said input device is in a non-writing state,
(d) calculating a variation of the inclination angle in the gravity coordinate system using the rotational angle velocities detected by said gyroscopes when said input device is in a writing state,
(e) calculating the inclination angle in the gravity coordinate system of said input device, using the initial value of the inclination angle calculated in step (c) and the inclination angle variation calculated in step (d),
(f) compensating the detected acceleration to more accurately portray acceleration at a tip end of said input device using the mounting position of said acceleration sensors, the rotational angular velocities detected by said three gyroscopes in step (b), the inclination angle variation calculated in step (d), and the inclination angle calculated in step (e),
(g) converting the compensated acceleration obtained in step (f) to acceleration in the gravity coordinate system, using the inclination angle calculated in step (e), and
(h) calculating a movement direction and movement distance using the converted acceleration obtained in step (g).

9. A method as in claim 8, wherein said acceleration sensor for the Xs-axis direction is disposed on the position of Ys=0, said acceleration sensor for the Ys-axis direction is disposed on the position of Xs=0, and said acceleration sensor for the Zs-axis direction is disposed on the Zs axis.

10. A method as in claim 8, wherein said respective acceleration sensors are arranged near the Zs axis.

11. A method as in claim 8, further comprising the steps of:
(i) filtering the output signals from said three acceleration sensors and three gyroscopes to detect, in any of said output signals, a signal which is generated when said input device is in a writing mode and caused by the friction between a tip end of said input device and a writing surface, and
(j) determining that said input device is in a handwriting state when said signal generated by friction is detected, and that said input device is no longer in a handwriting state when said signal generated by friction is not detected for a threshold period of time.

12. A method as in claim 11, further comprising the steps of:
(i) extracting the orbit of the tip end of said input device from the beginning of a handwriting state to the end thereof in accordance with the movement direction and movement distance calculated in step (h), and
(j) transferring an image of the orbit of said tip end extracted in step (i) onto an image writing surface.

13. A method as in claim 12, wherein
step (h) calculates a movement distance in the Xg and Yg directions using the acceleration converted in accordance with step (g), and
step (i) extracts the orbit of the input device's tip end from the beginning to the end of a handwriting state in accordance with the movement distance of the input device's tip end in the Xg and Yg directions.

14. A method for determining the movement of a pen-shaped input device comprising the steps of:
(a) detecting, with three acceleration sensors, the acceleration of said input device in the x-axis, y-axis and z-axis direction in an input device coordinate system where an axis of the input device is the Z axis, (b) detecting, with three gyroscopes, the respective angular velocities around the x-axis, y-axis and z-axis, (c) detecting whether said input device is in a state of handwriting or non-handwriting, (d) calculating an initial value of a rotational angle of a tip end of said input device in a gravity coordinate system Xg, Yg, Zg having the Zg axis in the direction of gravity acceleration when said tip end contacts a writing surface but said input apparatus is in a state of non-handwriting, said initial value of rotational angle being calculated using the acceleration detected in step (a), (e) calculating the variation of the rotational angle in the gravity coordinate system of the input device on the basis of the angular velocities detected in step (b) when said input apparatus is detected as being in the state of handwriting, (f) calculating the rotational angle in the gravity coordinate system of the input device using the initial value of the rotational angle calculated in step (d) and the variation of the rotational angle calculated in step (e), (g) converting the acceleration in the input device coordinate system detected in step (a) into acceleration in the gravity coordinate system on the basis of the rotational angle calculated in step (f), and (h) calculating the movement direction and distance of said tip end on the basis of the acceleration as converted in step (g).

15. A method as in claim 14, wherein
the detection in step (c) is made on the basis of the presence or absence of a signal which indicates a writing operation which is contained in one or more of the output signals from said acceleration sensors.

16. A method as in claim 14, wherein the detection in step (c) is made on the basis of whether or not a pressure sensor senses a stress on said tip end caused by contact of said tip end with a writing surface.

17. A method as in any one of claims 14, 15, and 16 wherein step (d) calculates the rotational angle of the input device in the gravity coordinate system several times when said input device is in a state of non-handwriting, and obtains an initial value of the rotational angle of the input device when the tip end is brought into contact with a writing surface by averaging the results of the calculations.

18. A method as in claim 14 further comprising the steps of:
(i) detecting the variation amount of the detected acceleration when said input device is in a state of non-handwriting,
(j) comparing the variation amount detected in step (i) with a predetermined threshold value, and
(k) issuing an alarm signal when said comparison in step (j) indicates that said variation amount exceeds said threshold.

19. A method as in claim 17 further comprising the steps of:
(i) detecting the variation amount of the detected acceleration when said input device is in a state of non-handwriting,
(j) comparing the variation amount detected in step (i) with a predetermined threshold value, and
(k) issuing an alarm signal when said comparison in step (j) indicates that said variation amount exceeds said threshold.

20. A method as in claim 18 wherein in step (d) the rotational angle of the input device in the gravity coordinate system is calculated several times using the detected acceleration when said input device is in the state of non-handwriting, excluding from calculation any acceleration which produces in step (j) an indication that said threshold has been exceeded.

21. A method as in claim 20 wherein in step (d) the rotational angle of the input device in the gravity coordinate system is calculated several times using the detected acceleration when said input device is in the state of non-handwriting, excluding from calculation any acceleration which produces in step (j) an indication that said threshold has been exceeded.

22. A method for determining the movement of a pen-shaped input device having a tip end comprising the steps of:
(a) detecting, with three acceleration sensors, the acceleration of the input device in an input device coordinate system,
(b) detecting, with three gyroscopes, the angular velocity of said input device about the axes in said input device coordinate system,
(c) determining the movement direction and movement distance of said tip end in a gravity coordinate system based on the accelerations and angular velocities detected in steps (a) and (b).

23. A method as in claim 22, further comprising the step of:
(d) compensating the movement distance of said tip end on the basis of an inclination formed between a writing surface and said gravity coordinate system.

24. A method as in claim 22, further comprising the steps of:
(d) detecting when said input-device is in a state of handwriting and non-handwriting,
(e) calculating an initial inclination angle of said input device relative to said gravity coordinate system when said input device is in a state of non-handwriting,
(f) using said initial inclination angle in the determination of the movement direction and movement distance in step (c).

25. A method as in claim 24, wherein step (d) further comprises the steps of:
(g) filtering the output signals from at least said acceleration sensors for a signal having a characteristic which is associated with the movement of said input device across a writing surface, and
(h) using the presence or absence of said characteristic signal to determine when said input device is in a state of handwriting or non-handwriting.

26. A method as in claim 25, wherein step (g) filters the output signals from said acceleration sensors and gyroscopes.

27. A method as in claim 14 further comprising the step of:
(i) calculating the value of an acceleration variation caused by the inclination angle variation on the basis of the variation of the inclination angle in the gravity coordinate system of the input device calculated in step (e) and compensating the acceleration detected by said acceleration sensors, based on the acceleration variation calculated in step (i),
(j) performing step (g) using the compensated acceleration.

28. A method as in claim 27, wherein step (i) is carried out by the steps of:
(k) calculating centrifugal force on the basis of the variation velocity of the inclination angle in the gravity coordinate system, (l) calculating a value of an acceleration variation caused by the inclination angle variation on the basis of the calculated centrifugal force, and (m) compensating the acceleration detected by the acceleration sensors based on the calculated acceleration variation.

29. A method as in claim 14, further comprising the step of:

(i) compensating the difference between the coordinates of the acceleration sensor on a writing surface and the coordinates of the input device tip end on the basis of the inclination angle in the gravity coordinate system of the input device and the mounting position of the acceleration sensors.

30. A method as in claim 22 wherein step (c) further comprises the steps of:

(d) converting acceleration obtained in step (a) to acceleration in the gravity coordinate system, and (e) using the converted acceleration obtained in step (d) in determining the movement direction and movement distance.

31. A method for determining the movement of a pen-shaped input device having a tip end and a longitudinal axis comprising the steps of:

(a) detecting, with three acceleration sensors, the acceleration of the input device in an input device coordinate system, (b) detecting, with three gyroscopes, the angular velocity of said input device about the axes in said input device coordinate system, (c) calculating an initial value of an inclination angle of said input device in a gravity coordinate system Xg, Yg, Zg having an axis Zg extending in the gravity acceleration direction using the acceleration detected in step (a), (d) calculating a variation of the inclination angle in the gravity coordinate system on the basis of the angular velocities detected in step (b), (e) calculating a handwriting inclination angle in the gravity coordinate system of said input device on the basis of the initial value of the inclination angle calculated in step (c) and the inclination angle variation calculated in step (d), (f) compensating the acceleration obtained from the acceleration sensors in step (a) tip based on the mounting position of the acceleration sensors relative to the tip end, the rotational angular velocities detected by the gyroscopes in step (b), the inclination angle variation calculated in step (d), and the inclination angle of the input device calculated in step (e), (g) converting the acceleration in the input device coordinate system, as compensated in step (f), to accelerations in the gravity coordinate system on the basis of the inclination angle of the input device in the gravity coordinate system calculated in step (e), and (h) calculating the movement direction and movement distance of the tip end of said input device based on the acceleration converted in step (g).

32. A method for-determining the movement of a pen-shaped input device having a tip end and a longitudinal axis comprising the steps of:

(a) detecting acceleration of said input device in an input device coordinate system Xs, Ys, and Zs having the longitudinal axis of said input device as the Zs axis, (b) detecting the rotational angular velocities of said input device around the Xs, Ys and Zs axes, (c) detecting whether said input device is in a state of handwriting or non-handwriting by detecting whether the tip end of said input device is brought into contact with a writing surface, (d) calculating an initial rotation angle of said input device in a gravity coordinate system (Xg, Yg, Zg) having the Zg axis extending in a gravity acceleration direction, when a state of non-handwriting is detected, and on the basis of the acceleration detected in step (a).

33. A method for determining the movement of a pen-shaped input device having a tip end and a longitudinal axis comprising the steps of:

(a) detecting acceleration of said input device in an input device coordinate system (Xs, Ys, Zs) having the longitudinal axis of said input device as the Zs axis, (b) detecting the rotational angular velocities of said input device around the Xs, Ys and Zs axes, (c) detecting a state of handwriting or non-handwriting by detecting whether said tip end is brought into contact with a writing surface, (d) calculating the initial value of the rotation angle of the input device in a gravity coordinate system (Xg, Yg, Zg) having an axis extending in the gravity acceleration direction as the Zg axis when the input device tip end is brought into contact with the writing surface on the basis of the acceleration detected in step (a), and when step (c) detects that said input device is in a state of non-handwriting, (e) calculating the variation of the rotational angle in the gravity coordinate system (Xg, Yg, Zg) of the input device on the basis of the rotational angles detected in step (b) when step (c) detects a state of handwriting, (f) calculating the rotational angle in the gravity coordinate system (Xg, Yg, Zg) of the input device on the basis of the initial value of the rotational angle calculated in step (d) and the variation in rotational angle calculated in step (e).

34. A method for determining the movement of a pen-shaped input device having a tip end and a longitudinal axis comprising the steps of:

(a) detecting acceleration of the input device shaft in a coordinate system (X, Y, Z) having the pen shaft as the Z axis, (b) detecting the angular velocities of the input device around the X, Y and Z axes, (c) determining the movement of said input device, including determining whether said input device is in a state of handwriting or not, said determination of whether said input device is in a state of handwriting or not being determined by the further steps of:

(d) filtering a characteristic frequency component from output signals from the acceleration sensors used in the step (a) detection, and the gyroscopes used in the step (b) detection, said characteristic frequency component being present in at least one of said output signals when said input device is in a state of handwriting, and (e) determining that said input device is in the state of handwriting when said characteristic frequency component is present in any of said filtered output signals.

35. A method as in claim 34, wherein said characteristic frequency component is in the neighborhood of 10 Hz.

36. A method as in claim 34, wherein said characteristic frequency component is caused by the friction between said tip end of said input device and a writing surface.

37. A method as in claim 34, wherein step (e) determines the beginning of a handwriting operation when said characteristic frequency component first appears in one of said output signals, and determines the end of a handwriting operation when said characteristic frequency component is absent from all of said output signals.

38. A method for determining the movement of a en-shaped input device having a tip end and a longitudinal axis comprising the steps of:

(a) detecting, with three acceleration sensors, the acceleration of the input device in an input device coordinate system, (b) detecting, with three gyroscopes, the angular velocity of said input device about the axes in said input device coordinate system, (c) calculating an initial value of the inclination angle of the input device in a gravity coordinate system having an axis extending in the gravity acceleration direction as the Z axis, on the basis of acceleration detected in step (a), when said input device is in a state of non-handwriting, (d) calculating a variation of the inclination angle in the gravity coordinate system on the basis of the angular velocity detected in step (b) when the input device is in a state of handwriting, (e) calculating the inclination angle in the gravity coordinate system of the input device, on the basis of the initial value of the inclination angle calculated in step (c) and the inclination angle variation calculated in step (d), (f) converting the acceleration detected in step (a) to acceleration in the gravity coordinate system on the basis of the inclination angle in the gravity coordinate system calculated in step (e), and (g) calculating a movement direction and movement distance at the tip end of the input device on the basis of the acceleration converted in step (f).

* * * * *